US012058341B1

(12) United States Patent
Fitzgerald et al.

(10) Patent No.: US 12,058,341 B1
(45) Date of Patent: Aug. 6, 2024

(54) FREQUENCY COMPONENT SELECTION FOR IMAGE COMPRESSION

(71) Applicant: Immersive Robotics Pty Ltd, Fortitude Valley (AU)

(72) Inventors: Daniel Liam Fitzgerald, Queensland (AU); Timothy Simon Lucas, Queensland (AU); Jonathan Mark Povey, Queensland (AU)

(73) Assignee: Immersive Robotics Pty Ltd., Fortitude Valley (AU)

( * ) Notice: Subject to any disclaimer, the term of this patent is extended or adjusted under 35 U.S.C. 154(b) by 0 days.

(21) Appl. No.: 17/990,382

(22) Filed: Nov. 18, 2022

Related U.S. Application Data

(63) Continuation of application No. 16/766,104, filed as application No. PCT/AU2018/051239 on Nov. 20, 2018, now Pat. No. 11,553,187.

(60) Provisional application No. 62/589,407, filed on Nov. 21, 2017.

(30) Foreign Application Priority Data

Sep. 7, 2018 (AU) .............................. 2018903345

(51) Int. Cl.
*H04N 19/146* (2014.01)
*H04N 19/132* (2014.01)
*H04N 19/18* (2014.01)

(52) U.S. Cl.
CPC ......... *H04N 19/146* (2014.11); *H04N 19/132* (2014.11); *H04N 19/18* (2014.11)

(58) Field of Classification Search
CPC ..... H04N 19/146; H04N 19/132; H04N 19/18
See application file for complete search history.

(56) References Cited

U.S. PATENT DOCUMENTS

| 4,504,263 A | 5/1985 | Steuer et al. |
| 5,325,125 A | 6/1994 | Naimpally |
| 5,559,557 A | 9/1996 | Kato |
| 5,703,793 A | 12/1997 | Wise et al. |
| 5,909,250 A | 6/1999 | Hardiman |

(Continued)

FOREIGN PATENT DOCUMENTS

| CA | 2798300 | 6/2014 |
| CN | 1675929 | 9/2005 |

(Continued)

OTHER PUBLICATIONS

Taylor, Clark N.; et al. "Adaptive Image Compression for Wireless Multimedia Communication," University of California San Diego. 5 Pages.

(Continued)

*Primary Examiner* — Tracy Y. Li

(57) ABSTRACT

A method of compressing image data representing one or more images, the method including obtaining pixel data from the image data, the pixel data representing an pixel array within the one or more images, applying a transformation to the pixel data to determine a set of frequency coefficients indicative of frequency coefficients of the pixel array, encoding a selected subset of the set of frequency coefficients, generating an index indicative of the encoded frequency coefficients and generating compressed image data using the encoded frequency coefficients and the index.

17 Claims, 27 Drawing Sheets

(56) References Cited

U.S. PATENT DOCUMENTS

| | | | |
|---|---|---|---|
| 5,963,673 | A | 10/1999 | Kodama |
| 6,078,349 | A | 6/2000 | Molloy |
| 6,091,777 | A | 7/2000 | Guetz |
| 6,101,284 | A | 8/2000 | Matsubara |
| 6,233,590 | B1 | 5/2001 | Shaw |
| 6,249,614 | B1 | 6/2001 | Kolesnik et al. |
| 6,252,989 | B1 | 6/2001 | Geisler |
| 6,259,991 | B1 | 7/2001 | Nysen |
| 6,310,962 | B1 | 10/2001 | Chung |
| 6,353,685 | B1 | 3/2002 | Wu |
| 7,027,655 | B2 | 4/2006 | Keeney |
| 7,583,982 | B2 | 9/2009 | Olsen et al. |
| 7,689,047 | B2 | 3/2010 | Bahar |
| 7,692,642 | B2 | 4/2010 | Wyatt |
| 7,734,105 | B2 | 6/2010 | Strom |
| 7,904,117 | B2 | 3/2011 | Doan |
| 8,098,941 | B2 | 1/2012 | Moussavi |
| 8,184,069 | B1 | 5/2012 | Rhodes |
| 8,366,552 | B2 | 2/2013 | Perlman |
| 8,369,324 | B1 | 2/2013 | Breight et al. |
| 8,374,242 | B1 | 2/2013 | Lewis |
| 8,416,847 | B2 | 4/2013 | Roman |
| 8,457,026 | B1 | 6/2013 | Ho |
| 8,787,454 | B1 | 7/2014 | Chechik |
| 8,965,140 | B1 | 2/2015 | Xu et al. |
| 9,281,559 | B2 | 3/2016 | Ransom et al. |
| 9,367,499 | B2 | 6/2016 | Yun |
| 9,596,053 | B1 | 5/2017 | Marupaduga et al. |
| 9,648,346 | B2 | 5/2017 | Zhang |
| 9,665,332 | B2 | 5/2017 | Otsuka |
| 9,811,874 | B2 | 11/2017 | Narayanan |
| 10,155,160 | B2 | 12/2018 | van der Laan |
| 10,224,758 | B2 | 3/2019 | Leabman |
| 10,237,577 | B2 | 3/2019 | Jeong et al. |
| 10,243,414 | B1 | 3/2019 | Leabman |
| 10,523,914 | B1 | 12/2019 | Philips et al. |
| 10,657,674 | B2 | 5/2020 | Fitzgerald |
| 11,153,604 | B2 | 10/2021 | Fitzgerald |
| 2001/0007575 | A1 | 7/2001 | Mori |
| 2002/0090140 | A1 | 7/2002 | Thirsk |
| 2002/0154693 | A1 | 10/2002 | Demos |
| 2003/0138150 | A1 | 7/2003 | Srinivasan |
| 2005/0018911 | A1 | 1/2005 | Deever |
| 2005/0152450 | A1* | 7/2005 | Ueno .................... H04N 19/149 348/700 |
| 2006/0195464 | A1 | 8/2006 | Guo |
| 2007/0037528 | A1 | 2/2007 | Doan |
| 2007/0263938 | A1 | 11/2007 | Lee |
| 2008/0055318 | A1 | 3/2008 | Glen |
| 2008/0211901 | A1 | 9/2008 | Civanlar |
| 2008/0266410 | A1 | 10/2008 | Fukuhara et al. |
| 2009/0016631 | A1 | 1/2009 | Naito |
| 2009/0033588 | A1 | 2/2009 | Kajita |
| 2010/0093282 | A1 | 4/2010 | Martikkala |
| 2010/0124279 | A1 | 5/2010 | Reddy |
| 2011/0038556 | A1 | 2/2011 | Mathe |
| 2011/0235706 | A1 | 9/2011 | Demircin |
| 2012/0121012 | A1 | 5/2012 | Shiodera |
| 2012/0206452 | A1 | 8/2012 | Geisner |
| 2012/0275718 | A1 | 11/2012 | Takamori |
| 2012/0314026 | A1 | 12/2012 | Chen |
| 2013/0040682 | A1 | 2/2013 | Chang |
| 2013/0215961 | A1 | 8/2013 | Nakagawa et al. |
| 2014/0022125 | A1 | 1/2014 | Zhu |
| 2014/0118398 | A1 | 5/2014 | Hall |
| 2014/0128032 | A1 | 5/2014 | Muthukumar |
| 2014/0184475 | A1 | 7/2014 | Tantos |
| 2014/0218236 | A1 | 8/2014 | Sadeghi |
| 2014/0241428 | A1 | 8/2014 | Sato |
| 2014/0348438 | A1* | 11/2014 | Yang .................... H04N 19/18 382/248 |
| 2014/0357993 | A1 | 12/2014 | Hiriyannaiah |
| 2015/0031296 | A1 | 1/2015 | Holman |
| 2015/0071359 | A1* | 3/2015 | Guo .................... H04N 19/91 375/240.18 |
| 2015/0103183 | A1 | 4/2015 | Abbott |
| 2015/0172545 | A1 | 6/2015 | Szabo |
| 2015/0237351 | A1 | 8/2015 | Lee |
| 2015/0279103 | A1 | 10/2015 | Naegle |
| 2016/0119646 | A1 | 4/2016 | Eslami |
| 2016/0127490 | A1 | 5/2016 | Li |
| 2016/0248995 | A1 | 8/2016 | Mullins |
| 2016/0259032 | A1 | 9/2016 | Hehn et al. |
| 2016/0267884 | A1 | 9/2016 | Binstock |
| 2016/0357367 | A1 | 12/2016 | Foster |
| 2016/0360209 | A1 | 12/2016 | Gosling |
| 2016/0380692 | A1 | 12/2016 | Jalali |
| 2016/0381398 | A1 | 12/2016 | Saxena |
| 2017/0006290 | A1 | 1/2017 | Osawa |
| 2017/0051171 | A1 | 2/2017 | Adamic et al. |
| 2017/0053450 | A1 | 2/2017 | Rodriguez et al. |
| 2017/0060678 | A1 | 3/2017 | Jeganathan et al. |
| 2017/0069227 | A1 | 3/2017 | Dialameh |
| 2017/0072483 | A1 | 3/2017 | Gamble |
| 2017/0072484 | A1 | 3/2017 | Baratta |
| 2017/0075416 | A1 | 3/2017 | Armstrong |
| 2017/0085462 | A1 | 3/2017 | Zhou et al. |
| 2017/0085872 | A1 | 3/2017 | Perron |
| 2017/0098231 | A1 | 4/2017 | Dietrich |
| 2017/0103571 | A1 | 4/2017 | Beaurepaire |
| 2017/0142444 | A1* | 5/2017 | Henry .................... H04N 19/61 |
| 2017/0150147 | A1 | 5/2017 | Forsyth |
| 2017/0194706 | A1 | 6/2017 | Lee et al. |
| 2017/0191429 | A1 | 7/2017 | Tylutki et al. |
| 2017/0207971 | A1 | 7/2017 | Kripalani et al. |
| 2017/0221182 | A1 | 8/2017 | Cawley |
| 2017/0236252 | A1 | 8/2017 | Nguyen |
| 2017/0280145 | A1 | 9/2017 | Kubota |
| 2017/0285735 | A1 | 10/2017 | Young |
| 2017/0286735 | A1 | 10/2017 | Young |
| 2017/0324951 | A1 | 11/2017 | Raveendran |
| 2017/0352322 | A1 | 12/2017 | Spence |
| 2018/0054241 | A1 | 2/2018 | Pi |
| 2018/0055332 | A1 | 3/2018 | Lee et al. |
| 2018/0082904 | A1 | 3/2018 | Basker et al. |
| 2018/0089091 | A1 | 3/2018 | Akenine-Moller |
| 2018/0093177 | A1 | 4/2018 | Tokubo |
| 2018/0095529 | A1 | 4/2018 | Tokubo |
| 2018/0114082 | A1 | 4/2018 | Choi |
| 2018/0132192 | A1 | 5/2018 | Yang et al. |
| 2018/0146198 | A1 | 5/2018 | Atluru |
| 2018/0211287 | A1 | 7/2018 | Bryon et al. |
| 2018/0224841 | A1 | 8/2018 | Tani et al. |
| 2018/0224842 | A1 | 8/2018 | Ichimura |
| 2018/0229458 | A1 | 8/2018 | Thallner et al. |
| 2018/0229462 | A1 | 8/2018 | Shimada et al. |
| 2018/0268571 | A1 | 9/2018 | Park et al. |
| 2018/0324438 | A1 | 11/2018 | Kwak |
| 2018/0357809 | A1 | 12/2018 | Lawless |
| 2019/0019315 | A1 | 1/2019 | Bastani |
| 2019/0025760 | A1 | 1/2019 | Ashrafi et al. |
| 2019/0033068 | A1 | 1/2019 | Tsurumi |
| 2019/0089984 | A1* | 3/2019 | He .................... H04N 19/61 |
| 2019/0122436 | A1 | 4/2019 | Bashkirov |
| 2019/0141324 | A1* | 5/2019 | Bjorklund ............ H04N 19/176 |
| 2019/0110053 | A1 | 8/2019 | Varia et al. |
| 2019/0378305 | A1 | 12/2019 | Fitzgerald et al. |
| 2019/0379428 | A1 | 12/2019 | Lucas |
| 2020/0042263 | A1 | 2/2020 | Iyer et al. |
| 2020/0053393 | A1 | 2/2020 | Niamut et al. |
| 2020/0081524 | A1 | 3/2020 | Schmidt |
| 2020/0128274 | A1* | 4/2020 | Rosewarne .......... H04N 21/236 |

FOREIGN PATENT DOCUMENTS

| | | |
|---|---|---|
| CN | 103096075 | 5/2013 |
| CN | 103188491 | 7/2013 |
| CN | 106688229 | 5/2017 |
| EP | 1720356 | 5/2005 |
| EP | 1892965 | 2/2008 |
| EP | 3013053 | 4/2016 |
| EP | 3313144 | 4/2018 |
| EP | 3336685 | 9/2018 |
| GB | 2450422 | 12/2008 |

(56) References Cited

FOREIGN PATENT DOCUMENTS

| | | |
|---|---|---|
| GB | 2478583 | 9/2011 |
| GB | 2480825 | 12/2011 |
| GB | 2484736 | 4/2012 |
| GB | 2485613 | 5/2012 |
| GB | 2485977 | 6/2012 |
| GB | 2486411 | 6/2012 |
| GB | 2486412 | 6/2012 |
| GB | 2486431 | 6/2012 |
| GB | 2486434 | 6/2012 |
| GB | 2486457 | 6/2012 |
| GB | 2488094 | 8/2012 |
| GB | 2538797 | 11/2016 |
| JP | 2011508995 | 3/2011 |
| JP | 2012521268 | 9/2012 |
| JP | 2019041394 | 3/2019 |
| KR | 20160109066 | 9/2016 |
| TW | I334716 | 12/2010 |
| WO | 2004014077 | 2/2004 |
| WO | 2005083558 | 9/2005 |
| WO | 2007020408 | 2/2007 |
| WO | 2009007693 | 1/2009 |
| WO | 2009013499 | 1/2009 |
| WO | 2009073824 | 6/2009 |
| WO | 2010138124 | 2/2010 |
| WO | 2010111100 | 9/2010 |
| WO | 2010114512 | 10/2010 |
| WO | 2010136781 | 12/2010 |
| WO | 2010144096 | 12/2010 |
| WO | 2011022014 | 2/2011 |
| WO | 2012022838 | 2/2012 |
| WO | 2012056198 | 5/2012 |
| WO | 2012066292 | 5/2012 |
| WO | 2012177378 | 12/2012 |
| WO | 2014096791 | 6/2014 |
| WO | 2014177869 | 11/2014 |
| WO | 2014207439 | 12/2014 |
| WO | 2015079215 | 6/2015 |
| WO | 2015092356 | 6/2015 |
| WO | 2015150727 | 10/2015 |
| WO | 2015180663 | 12/2015 |
| WO | 2016016607 | 2/2016 |
| WO | 2016071670 | 5/2016 |
| WO | 2016097594 | 6/2016 |
| WO | 2016097689 | 6/2016 |
| WO | 2016110679 | 7/2016 |
| WO | 2016135441 | 9/2016 |
| WO | 2016142713 | 9/2016 |
| WO | 2016146992 | 9/2016 |
| WO | 2016151291 | 9/2016 |
| WO | 2016154801 | 10/2016 |
| WO | 2016174392 | 11/2016 |
| WO | 2016189294 | 12/2016 |
| WO | 2017021687 | 2/2017 |
| WO | 2017051171 | 3/2017 |
| WO | 2017060678 | 4/2017 |
| WO | 2017072483 | 5/2017 |
| WO | 2017072484 | 5/2017 |
| WO | 2017085462 | 5/2017 |
| WO | 2017098231 | 6/2017 |
| WO | 2017103571 | 6/2017 |
| WO | 2017191429 | 11/2017 |
| WO | 2017207971 | 12/2017 |
| WO | 2017214671 | 12/2017 |
| WO | 2018046892 | 3/2018 |
| WO | 2018055332 | 3/2018 |
| WO | 2018082904 | 5/2018 |
| WO | 2018145153 | 8/2018 |
| WO | 2018145154 | 8/2018 |
| WO | 2018200993 | 11/2018 |
| WO | 2018211287 | 11/2018 |
| WO | 2018223179 | 12/2018 |
| WO | 2018224841 | 12/2018 |
| WO | 2018224842 | 12/2018 |
| WO | 2018229458 | 12/2018 |
| WO | 2018229462 | 12/2018 |
| WO | 2019025760 | 2/2019 |
| WO | 2019100108 | 5/2019 |
| WO | 2019100109 | 5/2019 |

OTHER PUBLICATIONS

Anderson, et al. "Piecewise Fourier Transformation for Picture Bandwidth Compression," IEEE Transactions on Communication Technology, vol. COM-19, No. 2, Apr. 1971. 8 pages.

Examination Report from related European application No. 18880508.9, dated Mar. 3, 2023. 3 pages.

Gonzalez, et al. "Digital Image Processing," Pearson Prentice Hall. 36 pages.

Examination Report from related Taiwanese application No. 107141136. 7 pages.

Decision of Rejection from related Taiwanese application No. 107141137. 4 pages.

Gonzalez, et al. "Digital Image Processing," Pearson Education International. Third Edition. 976 pages.

International Search Report for related PCT application No. PCT/AU2018/050090, 5 pages.

Eurpoean Search Report for related EP application No. 18881879.3, 10 pages.

Funt, et al. "Strategies for Foveated Compression and Transmission," Simon Fraser University, Vancouver. 4 pages.

Examination Opinions for Taiwan Patent Application No. 106119982 mailed on Feb. 3, 2021, 99 pages.

Extended European Search Report for European Application No. 18880508.9 dated Feb. 25, 2021, 8 pages.

International Search Report and Written Opinion for Application No. PCT/AU2020/051115 mailed on Nov. 17, 2020, 12 pages.

Farid, et al. "Adaptive Wavelet Eye-Gaze Based Video Compression" School of Computer Science, Queen's University Belfast. 9 pages.

Yao J., et al., "A Novel Color Image Compression Algorithm using the Human Visual Contrast Sensitivity Characteristics," Photonic Sensors, 2017, vol. 7 (1), pp. 72-81.

European Search Report and Written Opinion for Application No. PCT/AU2017/050594 mailed on Jan. 28, 2020, 9 pages.

European Search Report for Application No. PCT/AU2018/050534 mailed on Oct. 26, 2020, 9 pages.

Australian Search Information Statement No. PCT/AU2018/051237 mailed on Jan. 30, 2019, 8 pages.

European Search Report for Application No. PCT/AU2017/050594 mailed on Jan. 28, 2020, 12 pages.

International Search Report and Written Opinion for Application No. PCT/AU2018/051239, mailed on Feb. 4, 2019, 15 pages.

Examination report for related Australian application No. 2018217434, dated Mar. 24, 2022, 3 pages.

Office action for related Taiwanese application No. 107116357, Nov. 19, 2021, 6 pages.

International Preliminary Report on Patentability for International application No. PCT/2018/050091, dated Feb. 7, 2018, 5 pages.

Extended European Search Report for International Patent Application No. PCT/2018/050090, dated Sep. 24, 2020, 19 pages.

Examination Report No. 1 for standard patent application for Australian Patent No. 2018217434, dated Mar. 24, 2022, 3 pages.

* cited by examiner

FREQUENCY COMPONENT SELECTION FOR IMAGE COMPRESSION

This application is a continuation of U.S. application Ser. No. 16/766,104, filed May 21, 2020, which is a national stage of PCT application PCT/AU2018/051239, filed Nov. 20, 2018, which claims priority to U.S. provisional application 62/589,407, filed Nov. 21, 2017. All of these applications are incorporated by reference herein in their entirety.

BACKGROUND OF THE INVENTION

The present invention relates to a method and apparatus for compressing or decompressing image data, and in one particular example for compressing or decompressing image data to allow for transmission of the image data with a reduced bandwidth and low latency.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In virtual, augmented and mixed reality systems, it is typical to provide a wearable display device, such as a Head Mounted Display (HMD), which is displays information to a wearer based on the relative spatial position and/or orientation of the display device. Such systems operate by generating images based on information regarding the pose (position and orientation) of the display device, so that as the display device moves, the images are updated to reflect the new pose of the display device.

In order to avoid motion sickness, it is important that the time difference between collection of the pose information and creation of the corresponding image is minimised, particularly in circumstances where the display device is moving rapidly. This, coupled with the need to generate high resolution images so that these appear as lifelike as possible, means that significant processing hardware is required. As a result, high end existing systems typically require a static desktop computer with a high bandwidth and low latency connection to the display device. Consequently, current systems such as the HTC Vive™, Oculus Rift™ and Playstation VR™ require a wired connection between the computer and the HMD, which is inconvenient.

Whilst mobile solutions are available, such as the Gear VR™, which incorporates a mobile phone to perform the processing and display of images within the HMD itself, the processing ability is limited, meaning the content that can be displayed is restricted, particularly in terms of the image resolution and quality.

It is known to compress image data so as to reduce the data volume. This is useful in many applications, such as reduce the storage capacity required to store the image data, or to reduce bandwidth requirements associated with transmission of the image data.

JPEG uses a lossy form of compression based on the discrete cosine transform (DCT). This mathematical operation converts each frame/field of the video source from the spatial (2D) domain into the frequency domain (a.k.a. transform domain). A perceptual model based loosely on the human psychovisual system discards high-frequency information, i.e. sharp transitions in intensity, and colour hue. In the transform domain information is reduced through quantization. The quantized coefficients are then sequenced and losslessly packed into an output bitstream.

However, such approaches often only achieve a limited amount of compression and require significant processing time, making these unsuitable for use in low latency applications, such as virtual or augmented reality, telepresence or the like.

A further problem encountered with traditional compression schemes is that of banding. Specifically, traditional discrete cosine transform compression schemes retain lower frequency components as these tend to have a greater impact on the resulting quality of the uncompressed image. However, as images vary, especially in the case of digital reality application, this is not always the most effective approach, and can lead to image artefacts such as banding. Specifically, colour banding tends to be a problem of inaccurate colour presentation arising from a loss in information, resulting in stepwise changes in the frequency between adjacent parts of an image.

SUMMARY OF THE PRESENT INVENTION

In one broad form an aspect of the present invention seeks to provide a method of compressing image data representing one or more images, the method including: obtaining pixel data from the image data, the pixel data representing a pixel array within the one or more images; applying a transformation to the pixel data to determine a set of frequency coefficients indicative of frequency coefficients of the pixel array; encoding a selected subset of the set of frequency coefficients, the subset being selected to preferentially encode frequency coefficients having a higher magnitude; and, generating an index indicative of the encoded frequency coefficients; and, generating compressed image data using the encoded frequency coefficients and the index.

In one embodiment the method includes: selecting frequency coefficients having n bits, where n is an integer initially set to a maximum number of bits; and, selecting frequency coefficients having progressively decreasing values of n bits.

In one embodiment the method includes selecting frequency coefficients having progressively smaller numbers of bits until one or more encoding parameters are met.

In one embodiment the one or more encoding parameters include at least one threshold and wherein the method includes encoding frequency coefficients until at least one of: a number of encoded frequency coefficients reaches a coefficient number threshold; a number of bits of the encoded frequency coefficients reaches a bit threshold; and, a total number of bits of the encoded frequency coefficients reaches a bit total threshold.

In one embodiment the method includes selecting frequency coefficients to achieve a target degree of compression.

In one embodiment the method includes selecting frequency coefficients based on at least one of: display data received from a display device, the display data being at least partially indicative of at least one of: operation of the display device; use of the display device; and, communications link data indicative of operation of a wireless communications link; configuration data at least partially indicative of a configuration of a display device; and, content data at least partially indicative of the digital reality content associated with the one or more images.

In one embodiment the display data is indicative of at least one of: pose data indicative of a display device pose relative to the environment; movement data indicative of a display device movement relative to the environment; input commands provided by a user; gaze data indicative of a user gaze; and, physiological data indicative of a physiological attribute of the user.

In one embodiment the communications link data is indicative of at least one of: wireless communications link error metrics; wireless communications link quality of service; wireless communications link bandwidth; and, wireless communications link latency.

In one embodiment the configuration data is indicative of at least one of: a display resolution; a display refresh rate; a display field of view; and, display lens attributes.

In one embodiment the content data includes at least one of: pixel array content; image content; content of different parts of the image; an opacity of different parts of the image; areas of interest within the image; locations of interest within the image; one or more cues associated with the image; and, one or more display objects within the image.

In one embodiment the method includes differentially compressing the image data so that different parts of the image are compressed using a different degree of compression.

In one embodiment the method includes: determining a position of the pixel array within the one or more images; and selecting the subset of the set of frequency coefficients at least partially in accordance the determined position so that a degree of compression depends on the determined position of the pixel array.

In one embodiment the method includes compressing the pixel data so that the degree of compression is based on the pixel array position and at least one of: a user gaze; and, a display device configuration.

In one embodiment the position of the pixel array is determined relative to a defined position and the defined position is at least one of: a measured point of gaze of the user; an expected point of gaze of the user; offset from a measured point of gaze of the user; offset from an expected point of gaze of the user; determined at least partially in accordance with gaze data indicative of a point of gaze of the user, the gaze data being obtained from a gaze tracking system; and, based on characteristics of the display device.

In one embodiment the method includes compressing the pixel data so that the degree of compression at least one of: is based on a distance from the defined point; is based on a direction relative to the defined point; increases further from the defined point; and, provides foveated compression.

In one embodiment the method includes, for frequency coefficients having a set number of bits, selecting frequency coefficients corresponding to lower frequencies before frequency coefficients corresponding to higher frequencies.

In one embodiment the index is indicative of: a number of bits of each encoded frequency coefficient; and, a location, the location being at least one of: a location of each encoded frequency coefficient in a defined sequence; and, a location of each encoded frequency coefficient within the coefficient matrix.

In one embodiment the defined sequence is at least one of: a zig-zag traversal of a coefficient matrix; and, an ordered list.

In one embodiment the method includes generating the index by: specifying a number of bits n; for each of the encoded frequency coefficients having the specified number of bits n, specifying the location of the encoded frequency coefficient; and, repeating steps a) and b) for progressively decreasing numbers of bits n.

In one embodiment the method includes: determining an index code indicative of the index; and, generating the compressed image data using the index code.

In one embodiment the index is indicative of a value for each frequency coefficient.

In one embodiment the encoding of a frequency coefficient is performed at least one of: without scaling; and, without lossy encoding.

In one embodiment the method includes, for frequency coefficients having n bits, encoding the frequency coefficient using n−1 bits by removing a first bit.

In one embodiment the method includes encoding at least some of the frequency coefficients using a bit encoding scheme to thereby generate a set of encoded frequency coefficients, wherein the bit encoding scheme defines the number of bits used to encode the frequency coefficients, and wherein the frequency coefficients are selectively encoded so that at least some of the encoded frequency coefficients have a reduced number of bits.

In one embodiment the bit encoding scheme uses a reduced number of bits to encode at least one of: smaller frequency coefficients corresponding to higher frequencies; and, at least some of the frequency coefficients corresponding to higher frequencies.

In one embodiment the method includes applying a scaling factor to at least some of the frequency coefficients so that scaled frequency coefficients are encoded.

In one embodiment the image data defines a plurality of channels, and wherein the method includes selectively encoding frequency coefficients for each channel in parallel.

In one embodiment the pixel data defines RGB channels, and wherein the method includes: converting the RGB channels into YCbCr channels; and, transforming the YCbCr channels to generate respective frequency coefficients, and wherein the converting and transforming steps are performed using a minimum bit size.

In one embodiment the method includes selectively encoding more frequency coefficients for the Y channel than the Cb or Cr channels.

In one embodiment the transformation is a 2-D discrete cosine transformation.

In one embodiment the method is used for at least one of: compressing digital reality data; transmitting digital reality data; and, wirelessly transmitting digital reality data.

In one embodiment the method includes: determining a target degree of compression; selecting a bit encoding scheme at least in part in accordance with the target degree of compression; and, encoding the set of frequency coefficients in accordance with the bit encoding scheme and wherein the index is indicative of the selected bit encoding scheme.

In one embodiment the method includes: encoding a number of pixel arrays using the selected bit encoding scheme; and, selecting a next bit encoding scheme based on compression of the number of pixel arrays.

In one embodiment the method includes selecting the bit encoding scheme using at least one of: a cumulative bit total for a number of previous pixel arrays; a target bit rate; a position of the pixel array within the one or more images; display data received from a display device, the display data being at least partially indicative of at least one of: operation of the display device; use of the display device; and, communications link data indicative of operation of a wireless communications link; configuration data at least partially indicative of a configuration of a display device; content data at least partially indicative of the digital reality content associated with the one or more images.

In one embodiment the method includes: determining a cumulative bit total for a number of previous pixel arrays; if the cumulative bit total exceeds a cumulative bit total threshold: determining a degree of compression for the number of previous pixel arrays; and, selecting the bit encoding scheme using the degree of compression and the target degree of compression.

In one embodiment the bit encoding scheme encodes the frequency coefficients by at least one of: encoding a subset of frequency coefficients; and, scaling the frequency coefficients with a scaling factor and encoding the scaled frequency coefficients.

In one embodiment the method includes: identifying a highest magnitude frequency coefficient; calculating a minimum scaling factor required to reduce the highest magnitude frequency coefficient to a target number of bits; and, scaling the frequency coefficients using at least one of: the minimum scaling factor; and, a scaling factor larger than the minimum scaling factor.

In one embodiment the method includes: selecting one of a number of bit encoding schemes, wherein each bit encoding schemes defines: available scaling factors; and, a bit threshold, wherein frequency coefficients are selectively encoded in accordance with the bit threshold. scaling frequency coefficients using an available scaling factor that is at least a minimum scaling factor; and, encoding scaled frequency coefficients in accordance with the bit threshold by at least one of: encoding scaled frequency coefficients having more bits than the bit threshold; and, discarding scaled frequency coefficients having less bits that the bit threshold.

In one embodiment each bit encoding schemes defines at least one of: a respective bit threshold for different colour channels; a respective bit threshold for luminance and chrominance channels; and, a higher bit threshold for chrominance channels than the luminance channel.

In one embodiment the bit encoding scheme defines a bit threshold for each of chrominance and luminance colour channels, and wherein the method includes, for each colour channel: applying the transformation to the pixel data; calculating a minimum scaling factor; selecting the scaling factor; scaling the frequency coefficients; and, encoding the subset of the scaled frequency coefficients.

In one embodiment the method includes selecting a bit encoding scheme from an ordered list of bit encoding schemes, the list being ordered to provide progressively increasing compression.

In one embodiment the bit encoding schemes provide progressively increasing compression by at least one of: progressively increasing the magnitude of the available scaling factors; reducing a lowest available scaling factor; and, progressively increasing the bit threshold.

In one embodiment the available scaling factor is at least one of: 1; 2; 4; and, 8.

In one embodiment the bit threshold is at least one of: 0; 1; 2; 3; 4; 5; and, 6.

In one embodiment the frequency coefficients include a DC component, and wherein the DC component is at least one of: retained without compression; retained without scaling; and, retained using a native number of bits.

In one broad form an aspect of the present invention seeks to provide a system for compressing image data representing one or more images, the system including one or more encoder processing devices that: obtain pixel data from the image data, the pixel data representing an pixel array within the one or more images; apply a transformation to the pixel data to determine a set of frequency coefficients indicative of frequency coefficients of the pixel array; encoding a selected subset of the set of frequency coefficients, the subset being selected to preferentially encode frequency coefficients having a higher magnitude; and, generate an index indicative of the encoded frequency coefficients; and, generate compressed image data using the encoded frequency coefficients and the index.

In one embodiment the system includes: an encoder input buffer that receives the image data; and, an encoder output buffer that stores compressed image data.

In one embodiment the system includes an encoder input buffer that: buffers image data corresponding to a next m−1 rows of pixels of the image; buffers image data for a next m pixels of the next row of pixels, allowing the at least one encoder processing device to obtain pixel data for a next m×m block of pixels from the buffered image data; repeats step b) until pixel data has been obtained from all of the m rows of pixels; and, repeats steps a) and b) until pixel data has been obtained from each row of pixels of the image.

In one embodiment the system includes an encoder transmitter that transmits the image data from the encoder output buffer.

In one embodiment the one or more encoder processing devices include: a suitably programmed field programmable gate array; an Application-Specific Integrated Circuit; and, a Graphics Processing Unit.

In one embodiment the pixel data defines a plurality of channels, and wherein the system includes: a respective processing device for each channel; and, a parallel processing device for processing each channel in parallel.

In one embodiment the system includes an encoder in wireless communication with a decoder allowing image data to be transferred between the encoder and decoder as compressed image data.

In one embodiment the decoder is at least one of coupled to and part of a wearable display device.

In one embodiment the encoder and decoder communicate to exchange at least one of: compressed image data; movement data indicative of movement of a display device; control data that is used at least in part to control the display device; input data indicative of user input commands; gaze data indicative of a point of gaze of an observer; and, sensor data from sensors associated with a wearable display device.

In one broad form an aspect of the present invention seeks to provide a method of decompressing compressed image data representing one or more images, the method including: obtaining compressed image data including encoded frequency coefficients and an index indicative of the encoded frequency coefficients; decoding the encoded frequency coefficients to obtain a subset of frequency coefficients; generating a set of frequency coefficients using the subset of frequency coefficients and the index; and, applying an inverse transformation to the set of frequency coefficients to determine pixel data representing a pixel array within the one or more images.

In one embodiment the index is indicative of: a number of bits of each encoded frequency coefficient; and, a location, the location being at least one of: a location of each encoded frequency coefficient in a defined sequence; and, a location of each encoded frequency coefficients within the coefficient matrix.

In one embodiment the defined sequence is at least one of: a zig-zag traversal of a coefficient matrix; and, an ordered list.

In one embodiment the method includes, using the decoded frequency coefficients and the index to reconstruct at least one of: a set of frequency coefficients; a defined sequence of frequency coefficients; and, a coefficient matrix.

In one embodiment the method includes: decoding each encoded frequency coefficient; determining the location of each frequency coefficient; adding the decoded frequency coefficient into at least one of the defined sequence and coefficient matrix in accordance with the location; and, adding null values into empty locations in at least one of the defined sequence and coefficient matrix.

In one embodiment the method includes: determining an index code from the compressed image data; and, determining the index from the index code.

In one embodiment decoding each encoded frequency coefficient is performed at least one of: without scaling; and, without lossy decoding.

In one embodiment the method includes, for encoded frequency coefficients having n−1 bits, creating a frequency coefficient using n bits by adding a first bit.

In one embodiment the method includes decoding at least some of the encoded frequency coefficients in accordance with a bit encoding scheme to thereby generate a set of frequency coefficients, wherein at least one frequency coefficient is generated so that the set of encoded frequency coefficients is smaller than the set of frequency coefficients.

In one embodiment the bit encoding scheme uses a reduced number of bits to encode at least one of: smaller frequency coefficients corresponding to higher frequencies; and, at least some of the frequency coefficients corresponding to higher frequencies.

In one embodiment the method includes applying a scaling factor to at least some of the frequency coefficients so that scaled frequency coefficients are transformed.

In one embodiment at least one of: the same scaling factor is applied to each frequency coefficient; and, the scaling factor is used to increase a magnitude of each frequency coefficient.

In one embodiment the image data defines a plurality of channels, and wherein the method includes selectively decoding encoded frequency coefficients for each channel in parallel.

In one embodiment the compressed image data defines YCbCr channels, and wherein the method includes: performing an inverse transform of the YCbCr channels; and, converting the transformed YCbCr channels into RGB channels and wherein the converting and transforming steps are performed using a minimum bit size.

In one embodiment the method includes generating more frequency coefficients for the Cb or Cr channels than the Y channel.

In one embodiment the inverse transformation is an inverse 2-D discrete cosine transformation.

In one embodiment the method is used for at least one of: decompressing digital reality data; receiving digital reality data; and, wirelessly receiving digital reality data.

In one embodiment the index is indicative of a selected bit encoding scheme and wherein the method includes using the bit encoding scheme to generate a set of frequency coefficients by at least one of: decoding the encoded frequency coefficients to obtain a subset of frequency coefficients; and, applying the scaling factor to the set of frequency coefficients.

In one embodiment the method includes: determining from the compressed image data, pixel values for pixels in a pixel array within the one or more images; modifying the pixel values using a modifier array representing modifier values for each pixel in the pixel array; and, quantising modified pixel values to generate pixel data indicative of the pixel array in in the image.

In one embodiment the method includes selecting a modifier array in accordance with at least one of: a position of the pixel array in the one or more images; display data at least partially indicative of at least one of: operation of a display device; use of the display device; and, communications link data indicative of operation of a wireless communications link; configuration data at least partially indicative of a configuration of a display device; and, content data at least partially indicative of the digital reality content associated with the one or more images.

In one embodiment the modifier array is different for pixel arrays at different positions within the image.

In one embodiment the modifier array is identical for pixel arrays in the same position in different images.

In one embodiment the modifier values are pseudorandom values.

In one broad form an aspect of the present invention seeks to provide a system for decompressing compressed image data representing one or more images, the system including one or more electronic decoder processing devices that: obtain compressed image data including encoded frequency coefficients and an index indicative of the encoded frequency coefficients; decode the encoded frequency coefficients to obtain a subset of frequency coefficients; generate a set of frequency coefficients using the subset of frequency coefficients and the index; and, apply an inverse transformation to the set of frequency coefficients to determine pixel data representing a pixel array within the one or more images.

In one embodiment the system includes: a decoder input buffer that receives the compressed image data; and, a decoder output buffer that stores the image data.

In one embodiment the system includes a decoder transceiver that receives the compressed image data and provides the compressed image data to the input buffer.

In one embodiment the at least one decoder processing device includes a suitably programmed FPGA.

In one embodiment the compressed image data defines a plurality of channels, and wherein the system includes a respective processing device for each of the channels.

In one embodiment the system includes a decoder in wireless communication with an encoder allowing image data to be transferred between the encoder and decoder as compressed image data.

In one embodiment the encoder is at least one of coupled to and part of a suitably programmed computer system.

In one embodiment the decoder is at least one of coupled to and part of a wearable display device.

In one embodiment the decoder and encoder communicate to exchange at least one of: compressed image data; movement data indicative of movement of a display device; control data that is used at least in part to control the display device; input data indicative of user input commands; gaze data indicative of a point of gaze of an observer; and, sensor data from sensors associated with a wearable display device.

In one broad form an aspect of the present invention seeks to provide a method of displaying images forming part of a digital reality stream, the method including, for each image to be displayed: in one or more encoder processing devices: obtaining pixel data from the image data, the pixel data representing a pixel array within the one or more images; applying a transformation to the pixel data to determine a set of frequency coefficients indicative of frequency coefficients of the pixel array; encoding a selected subset of the set of frequency coefficients, the subset being selected to preferentially encode frequency coefficients having a higher magnitude; and, generating compressed image data using the encoded frequency coefficients. wirelessly transmitting the compressed image data to a display device using a wireless communications link; and, in one or more decoder processing devices associated with the display device: obtaining the compressed image data decoding the encoded frequency coefficients to obtain the subset of frequency coefficients; generating a set of frequency coefficients using the subset of frequency coefficients; and, applying an inverse transformation to the set of frequency coefficients to determine pixel data representing the pixel array.

In one broad form an aspect of the present invention seeks to provide a system for displaying images forming part of a digital reality stream, the system including: one or more encoder processing devices that: obtain pixel data from the image data, the pixel data representing a pixel array within the one or more images; apply a transformation to the pixel data to determine a set of frequency coefficients indicative of frequency coefficients of the pixel array; encode a selected subset of the set of frequency coefficients, the subset being selected to preferentially encode frequency coefficients having a higher magnitude; and, generate compressed image data using the encoded frequency coefficients. a wireless communications link that wirelessly transmits the compressed image data; and, one or more decoder processing devices associated with a display device that: obtain the compressed image data decode the encoded frequency coefficients to obtain the subset of frequency coefficients; generate a set of frequency coefficients using the subset of frequency coefficients; and, apply an inverse transformation to the set of frequency coefficients to determine pixel data representing the pixel array.

In one broad form an aspect of the present invention seeks to provide a method of decompressing compressed image data representing one or more images, the method including: obtaining compressed image data; determining from the compressed image data, pixel values for pixels in a pixel array within the one or more images; modifying the pixel values using a modifier array representing modifier values for each pixel in the pixel array; and, quantising modified pixel values to generate pixel data indicative of the pixel array in the image.

In one embodiment the method includes selecting a modifier array in accordance with at least one of: a position of the pixel array in the one or more images; display data at least partially indicative of at least one of: operation of a display device; use of the display device; and, communications link data indicative of operation of a wireless communications link; configuration data at least partially indicative of a configuration of a display device; and, content data at least partially indicative of the digital reality content associated with the one or more images.

In one embodiment the modifier array is different for pixel arrays at different positions within the image.

In one embodiment the modifier array is identical for pixel arrays in the same position in different images.

In one embodiment the modifier values are pseudorandom values.

In one broad form an aspect of the present invention seeks to provide a system for decompressing compressed image data representing one or more images, the system including one or more processing devices that: obtain compressed image data; determine from the compressed image data, pixel values for pixels in a pixel array within the one or more images; modify the pixel values using a modifier array representing modifier values for each pixel in the pixel array; and, quantise modified pixel values to generate pixel data indicative of the pixel array in in the image.

In one broad form an aspect of the present invention seeks to provide a method of compressing image data representing one or more images, the method including: obtaining pixel data from the image data, the pixel data representing a pixel array within the one or more images; determining a target degree of compression; applying a transformation to the pixel data to determine a set of frequency coefficients indicative of frequency coefficients of the pixel array; selecting a bit encoding scheme at least in part in accordance with the target degree of compression; encoding the set of frequency coefficients in accordance with the bit encoding scheme to generate encoded frequency coefficients, wherein the bit encoding scheme encodes the frequency coefficients by at least one of: encoding a subset of frequency coefficients, the subset being selected to preferentially encode frequency coefficients having a higher magnitude; and, scaling the frequency coefficients with a scaling factor and encoding the scaled frequency coefficients; and, generating an index indicative of at least one of: the selected bit encoding scheme; the scaling factor; and, the encoded frequency coefficients; generating compressed image data using the encoded frequency coefficients and the index.

In one embodiment the method includes: encoding a number of pixel arrays using the selected bit encoding scheme; and, selecting a next bit encoding scheme based on compression of the number of pixel arrays.

In one embodiment the method includes selecting the bit encoding scheme using at least one of: a cumulative bit total for a number of previous pixel arrays; a target bit rate; a position of the pixel array within the one or more images; display data received from a display device, the display data being at least partially indicative of at least one of: operation of the display device; use of the display device; and, communications link data indicative of operation of a wireless communications link; configuration data at least partially indicative of a configuration of a display device; content data at least partially indicative of the digital reality content associated with the one or more images.

In one embodiment the method includes: determining a cumulative bit total for a number of previous pixel arrays; if the cumulative bit total exceeds a cumulative bit total threshold: determining a degree of compression for the number of previous pixel arrays; and, selecting the bit encoding scheme using the degree of compression and the target degree of compression.

In one embodiment the method includes: identifying a highest magnitude frequency coefficient; calculating a minimum scaling factor required to reduce the highest magnitude frequency coefficient to a target number of bits; and, scaling the frequency coefficients using at least one of: the minimum scaling factor; and, a scaling factor larger than the minimum scaling factor.

In one embodiment the method includes selecting one of a number of bit encoding schemes, wherein each bit encoding schemes defines: available scaling factors; and, a bit threshold, wherein frequency coefficients are selectively encoded in accordance with the bit threshold.

In one embodiment the method includes at least one of: encoding frequency coefficients having more bits than the bit threshold; and, discarding frequency coefficients having less bits that the bit threshold.

In one embodiment each bit encoding schemes defines at least one of: a respective bit threshold for different colour channels; a respective bit threshold for luminance and chrominance channels; and, a higher bit threshold for chrominance channels than the luminance channel.

In one embodiment the method includes selecting a bit encoding scheme from an ordered list of bit encoding schemes, the list being ordered to provide progressively increasing compression.

In one embodiment the bit encoding schemes provide progressively increasing compression by at least one of: progressively increasing the magnitude of the available scaling factors; reducing a lowest available scaling factor; and, progressively increasing the bit threshold.

In one embodiment the scaling factor is at least one of: 1; 2; 4; and, 8.

In one embodiment the bit threshold is at least one of: 0; 1; 2; 3; 4; 5; and, 6.

In one embodiment the frequency coefficients include a DC component, and wherein the DC component is at least one of: retained without compression; retained without scaling; and, retained using a native number of bits.

In one embodiment the pixel data defines RGB channels, and wherein the method includes: converting the RGB channels into YCbCr channels; and, transforming the YCbCr channels to generate respective frequency coefficients, and wherein the converting and transforming steps are performed using a minimum bit size.

In one embodiment the method includes: selecting a bit encoding scheme defining; available scaling factors; and, a bit threshold; applying the transformation to the pixel data to determine the set of frequency coefficients; calculating a minimum scaling factor required to reduce the highest magnitude frequency coefficient to a target number of bits; selecting a scaling factor based on the available scaling factors and the minimum scaling factor; scaling the frequency coefficients with the selected scaling factor; and, encoding a subset of the scaled frequency coefficients in accordance with the bit threshold.

In one embodiment the bit encoding scheme defines a bit threshold for each of chrominance and luminance colour channels, and wherein the method includes, for each colour channel: applying the transformation to the pixel data; calculating a minimum scaling factor; selecting the scaling factor; scaling the frequency coefficients; and, encoding the subset of the scaled frequency coefficients.

In one broad form an aspect of the present invention seeks to provide a system for compressing image data representing one or more images, the system including one or more encoder processing devices that: obtain pixel data from the image data, the pixel data representing a pixel array within the one or more images; determine an array target for the pixel array; apply a transformation to the pixel data to determine a set of frequency coefficients indicative of frequency coefficients of the pixel array; select a bit encoding scheme at least in part in accordance with the array target; encode the set of frequency coefficients in accordance with the bit encoding scheme to generate encoded frequency coefficients, wherein the bit encoding scheme encodes the frequency coefficients by at least one of: encoding a subset of frequency coefficients, the subset being selected to preferentially encode frequency coefficients having a higher magnitude; and, scaling the frequency coefficients with a scaling factor and encoding the scaled frequency coefficients; and, generate an index indicative of at least one of: the selected bit encoding scheme; the scaling factor; and, the encoded frequency coefficients; generate compressed image data using the encoded frequency coefficients and the index.

In one broad form an aspect of the present invention seeks to provide a method of decompressing compressed image data representing one or more images, the method including: obtaining compressed image data including encoded frequency coefficients and an index indicative of a selected bit encoding scheme and at least one of: a scaling factor; and, the encoded frequency coefficients; using the index to determine the selected bit encoding scheme; using the bit encoding scheme to generate a set of frequency coefficients by at least one of: decoding the encoded frequency coefficients to obtain a subset of frequency coefficients and generating a set of frequency coefficients using the subset of frequency coefficients and the index; and, applying the scaling factor to the encoded frequency coefficients to generate the frequency coefficients; and, applying an inverse transformation to the set of frequency coefficients to determine pixel data representing a pixel array within the one or more images.

In one embodiment the method includes: decoding the encoded frequency coefficients to obtain a subset of frequency coefficients; and, applying the scaling factor to the subset of frequency coefficients.

In one broad form an aspect of the present invention seeks to provide a system for decompressing compressed image data representing one or more images, the system including one or more decoder processing devices that: obtain compressed image data including encoded frequency coefficients and an index indicative of a selected bit encoding scheme and at least one of: a scaling factor; and, the encoded frequency coefficients; use the index to determine the selected bit encoding scheme; use the bit encoding scheme to generate a set of frequency coefficients by at least one of: decoding the encoded frequency coefficients to obtain a subset of frequency coefficients and generating a set of frequency coefficients using the subset of frequency coefficients and the index; and, applying the scaling factor to the encoded frequency coefficients to generate the frequency coefficients; and, apply an inverse transformation to the set of frequency coefficients to determine pixel data representing a pixel array within the one or more images.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples of embodiments of the present invention will now be described with reference to the accompanying drawings, in which: —

FIG. 7A is an example of a pixel array;

FIG. 7B is an example of a compressed pixel array based on the pixel array of FIG. 7A; and, FIG. 7C is an example of the decompressed pixel array based on the pixel array of FIG. 7A;

FIG. 8A is an example of a pixel array;

FIG. 8B is an example of a compressed pixel array based on the pixel array of FIG. 8A;

FIG. 8C is an example of a modifier array;

FIG. 8D is an example of a modified compressed pixel array based on the pixel array of FIG. 8A;

FIG. 8E is an example of a decompressed pixel array based on the pixel array of FIG. 8A;

FIG. 9A shows a sequence of four pixel arrays spanning a boundary.

FIG. 9B shows a compressed array.

FIG. 9C shows a stark boundary as a result of a decompression approach.

FIG. 9A shows a sequence of four pixel arrays spanning a boundary.

FIG. 9B shows a compressed array.

FIG. 9C shows a stark boundary.

FIG. 9D is an example of decompressed pixel array based on modified compressed pixel arrays;

DETAILED DESCRIPTION OF THE PREFERRED EMBODIMENTS

Figure 1A:
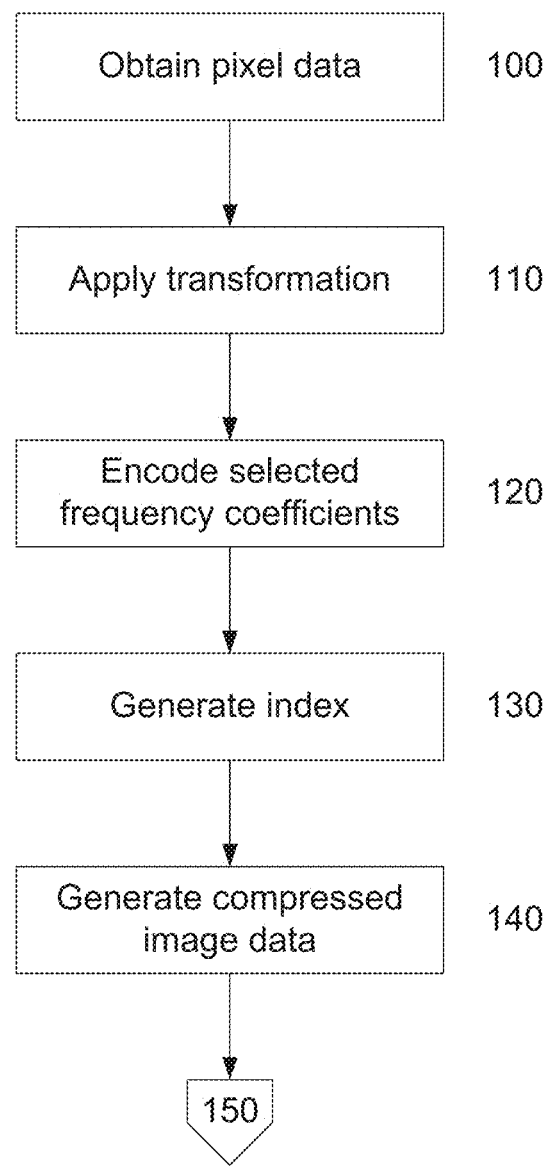
FIGS. 1A and 1B are a flow chart of an example of a method for compressing and subsequently decompressing image data.

An example of a method for compressing and subsequently decompressing image data will now be described with reference to FIGS. 1A and 1B.

For the purpose of illustration, it is assumed that the process is performed at least in part using one or more electronic processing devices. In one example, respective processing devices are used for compressing and decompressing the image data, allowing compressed image data to be transferred between the two processing devices, although this is not essential and alternatively the same processing device can be used for compressing and decompressing the image data.

The processing devices could form part of respective processing systems, such as computer systems, computer servers, client devices, including mobile phones, portable computers, display devices, such as wearable or head mounted displays, or alternatively could be in the form of independent modules, coupled to such devices.

The image data typically represents one or more images, and in one example, represents a sequence of images to be displayed on a respective display device. As will be apparent from the following description, in one particular example, the image data is a sequence of images forming part of a digital content stream adapted to be displayed remotely to a source, such as in virtual, augmented or mixed reality graphics applications in which images are displayed on a wearable display, and/or in telepresence applications, in which images are displayed from a remote controllable system, such as a drone mounted camera, or the like. However, it will be appreciated that whilst the techniques described herein are particularly useful for digital reality applications, this is not intended to be limiting, and the techniques could be used for any content stream, such as a video stream, computer graphics, or the like.

In this example, at step 100 pixel data is obtained from image data, with the pixel data representing a pixel array within the one or more images. The pixel data can be obtained in any appropriate manner, depending on the format of the image data. In one example, this is achieved simply by selecting a particular sequence of bytes from within the image data. The pixel array typically corresponds to a set number of pixels, such as an 8×8 block of pixels from within one of the images, although other arrays of pixels could be used.

At step 110, a transformation is applied to the pixel data to determine a set of frequency coefficients indicative of frequency components of the pixel array. The transformation is therefore typically a frequency transformation, such as a Fourier transform, or the like and in one example is a 2D DCT (Discrete Cosine Transform). The transformation could be applied in any suitable manner, for example using known transformation techniques, but in one example is performed in a highly parallel manner, thereby reducing the processing time.

At step 120, a selected subset of the set of frequency coefficients are encoded. In this regard, the frequency coefficients that are encoded are a subset that is selected so as to maximise the effectiveness of the frequency information that is encoded, for example by selecting the frequency coefficients having the highest magnitude and which therefore contribute most to the quality of decompressed images. The manner in which the selection is performed will vary depending on the preferred implementation, but in one example this involves selecting frequency coefficients having progressively smaller magnitudes, and hence can be defined by progressively smaller numbers of bits, until some limit is reached. However, this is not essential and other selection approaches can be used. The frequency coefficients can be encoded in any suitable way, which can vary depending on the preferred implementation, and in one example, could include using the original bit representation of the frequency coefficient, or performing some other form of lossless encoding, as will be described in more detail below.

At step 130 an index is created which is indicative of the frequency coefficients that are encoded. The index is used to identify the frequency coefficients so that these can be used to regenerate the image in a subsequent decompression step. This is required as different frequency coefficients will have different magnitudes for each pixel array, so that the frequency coefficients that are encoded will vary between each pixel array, and hence this information needs to be communicated to a decoder for use in decompression.

The index can be of any appropriate form and could identify the frequency coefficients in any appropriate manner, such as by identifying a location of the coefficients, for example within a coefficient matrix. The index may be provided separately to the frequency coefficients, for example by providing the index, followed by a string of encoded frequency coefficients or could include the encoded frequency coefficients within the index, as will be described in more detail below.

Once encoding has been performed and the index created, compressed image data can be generated at step 140, with the compressed image data including the encoded frequency coefficients and being provided together with the index. For example, this can be performed by creating a byte stream including sequences of the encoded frequency coefficients, optionally with additional information, so as flags or other markers, to identify the start of a new image, or the like.

Accordingly, the above described process allows compressed image data to be created by encoding selected frequency coefficients, and using an index in order to identify the frequency coefficients that have been encoded. By allowing the frequency coefficients to be selected arbitrarily, for example, based on their magnitude, this can result in a higher image quality when the image is subsequently decompressed.

In this regard, traditional approaches focus on encoding frequency coefficients corresponding to lower frequencies, on the basis that these typically contribute most to the image quality. In this instance, by encoding the same frequency coefficients each time encoding is performed, this facilies the decoding process, but conversely means the encoding performed is not optimised to each pixel array, leading to the artefacts such as banding.

In contrast, in the current approach, frequency coefficients can be selected to optimise the resulting image, for example by encoding the largest magnitude coefficients, which in turn provide the greatest contribution to the appearance of the resulting image. The largest magnitude frequency coefficients are not limited to those of the lowest frequencies, meaning that larger high frequency coefficients could also be encoded. In this instance decompression of the image is facilitated by the inclusion of the index in compressed image data, meaning the frequency coefficients selected can vary for each pixel block, allowing the compression to be optimised for each pixel block and/or image, whilst minimising the impact on image quality.

In this regard, at step 150 compressed image data is obtained, with the encoded frequency coefficients being decoded at step 160 to create a subset of frequency coefficients. It will be appreciated that the manner in which this is performed will vary depending on the nature of the encoding performed.

Following this, at step 170, the index is used to generate a full set of frequency coefficients, typically by defining un-encoded frequency coefficients with a null value. Following this an inverse transformation can be applied to the set of frequency coefficients at step 180 to determine pixel data representing a pixel array within the one or more images. In particular, this is typically in the form of an inverse frequency transformation, such as an inverse Fourier transform, 2D DCT, or the like.

Accordingly, the above described process allows image data to be encoded by encoding a selected subset of frequency coefficients and identify the encoded frequency coefficients using an index, which can then be used when decompressing the encoded frequency coefficients. This approach is inherently adaptive, meaning the frequency coefficients selected will vary depending on the content of the pixel array being encoded, thereby ensuring the compression is optimised for the content, allowing this to maximise the amount of compression that can be achieved, whilst minimising the impact on image quality.

In addition to the above described advantages, the scheme can be implemented in a highly parallel manner, which in turn enables the process to be performed rapidly, thereby reducing latency, which is important in many applications, such as virtual reality applications, in which images are created in response to movement of a display device and must be transmitted rapidly to the display device for display.

A number of further features will now be described.

In one example, the method includes selecting frequency coefficients having n bits, where n is an integer initially set to a maximum number of bits and then selecting frequency coefficients having progressively decreasing values of n bits. This is performed to encode frequency coefficients having a bigger magnitude, and hence a larger number of bits, in preference to those having a smaller magnitude and hence smaller number of bits, which in turn have less impact on image quality.

Typically the process of selecting progressively smaller numbers of bits is performed until encoding parameters are met, thereby selecting the subset of frequency coefficients that are encoded. For example this can be performed to ensure sufficient frequency coefficients are encoded to maintain a desired image quality, whilst minimising the overall volume of image data that is transmitted. The encoding parameters can be defined in any one of a number of ways, and can embody fixed rules, or dynamic rules allowing pixel arrays to be adaptively encoded depending on the image content, available transmission requirements, desired degrees of compression, or the like.

The encoding parameter(s) typically includes one or more thresholds, with the method including encoding coefficients until a threshold is met. This can include encoding frequency coefficients until a number of encoded frequency coefficients reaches a coefficient number threshold, until a number of bits of the encoded frequency coefficients reaches a bit threshold, or until a total number of bits of the encoded frequency coefficients reaches a bit total threshold. Thus, this allows a set number of coefficients to be encoded, or allows a set number of bits to be encoded, which in turn allows different numbers of coefficients to be encoded depending on the magnitude of the coefficients.

In one example, frequency coefficients are selected to achieve a target degree of compression. For example, in the event that aggressive compression is required, this can be performed by encoding only a few high magnitude frequency coefficients, whereas if less aggressive compression is required, this could involve encoding a greater number of coefficients.

The desired compression and hence the frequency coefficients selected can be determined taking into account a range of different factors. This can include using display data that is at least partially indicative of operation of the display device and/or use of the display device, communications link data indicative of operation of the wireless communications link, configuration data at least partially indicative of a configuration of the display device and content data at least partially indicative of the digital reality content.

The display data can define a current display device pose and/or movement, which can be used to assess redundancy compared to previous images, or a user gaze which can assess which areas of the image are being focused on by the user, and hence which require greater image quality and less compression. Similarly the content data can be used to determine areas of interest within the image, for example based on visual content, and/or other contextual cues, such as audible cues, again allowing areas requiring greater image quality to be ascertained. The configuration data typically defines parts of the image that are either out of the field of view of the display device, and hence not displayed, and/or are in region of the image that is not displayed as well, and hence can use more aggressive compression without a perceived reduction in image quality. Finally, the communications link data can be used to control an overall degree of compression used, based on current bandwidth and/or latency, ensuring the compressed image data can be transmitted in a timely fashion.

Thus, the method can include selecting encoding parameters, such as a threshold, based on one or more operational parameters relating to operation of the hardware and/or image parameters relating to the image. The operational parameters can includes any one or more of a transmission bandwidth of a communications link used to transmit the compressed image data, a transmission quality of service of a communications link used to transmit the compressed image data, movement of a display device, image display requirements, a target display resolution, or the like. Similarly the image parameters can include any one or more of a channel being processed, a position of the pixel array within the one or more images, a position of the pixel array within the one or more images relative to a point of gaze of an observer of the one or more images, or the like. As a further alternative, error metrics indicative of errors in the decompressed images and/or transmission of data can be used in order to control the degree of compression used.

It will be appreciated that these arrangements can be used to adjust the degree of compression dynamically, for example by changing the thresholds based on current error values, the content of the pixel array, or the like. For example, if compression artefacts exceed a set amount, the degree of compression can be reduced by adjusting the thresholds, whilst if available transmission bandwidth falls, compression can be increased. This ability to dynamically adjust the compression helps optimise the compression to obtain the best possible image quality for the current circumstances.

For example, the relative quality of some parts of an image may not be as important as other parts. In the case of virtual reality, peripheral parts of an image are often not actually displayed to a user due to image distortion of the display lenses. Consequently, such parts of the image could be encoded with an effective zero quality, thereby vastly reducing the amount of compressed image data without any loss in image quality of the viewable image.

Similarly, in a virtual reality application, analysis can be performed of which part of an image an observer is viewing, for example using eye tracking technologies or similar, and then encoding parts of the image nearer the point of gaze with a higher quality. In this regard, an observer's perception in peripheral regions will typically be reduced, so that a reduction in image quality is typically less noticeable. Consequently, by encoding the image with a higher quality nearer the observer's point of gaze, this allows an image with an overall lesser quality to be perceived by the observer as having an equivalent quality. In this regard, it will be appreciated that as long as transmission time for the whole image is maintained, it doesn't matter if pixel arrays near the centre of view contain more bits and take longer to transmit, as this can be accommodated by reducing the number of bits transmitted near peripheries of the image.

Thus, in one example, the method includes differentially compressing the image data so that different parts of the image are compressed using a different degree of compression, which in turn allows the overall degree of compression to be maximised without a perceived reduction in image quality.

In one example, the process is achieved by determining a position of the pixel array within the one or more images and then selecting the subset of frequency coefficients is selected based on the position, so that the extent to which the pixel data is compressed depends on the determined position of the pixel array.

In one example, the position is determined relative to a defined position, which can be at least partially indicative of a point of gaze of the user. Thus, the defined position can be based on an actual measured point of gaze, or an expected or predicted point of gaze of the user, determined for example by assuming the user is staring at an approximate centre of the image, or based on the content, such as a point of focus within the image, movement of the headset, or the like. Additionally, the defined point can be offset from the point of gaze, for example positioning this below the point of gaze to take account of the fact that individuals tend to focus slightly below the point of gaze to avoid colliding with obstacles when walking.

Thus, this provides a mechanism for compressing and subsequently decompressing the image, with the compression being controlled based on the location of a pixel array. Specifically this allows a degree of compression to be selected based on the position of the pixel array, so that, less compression can be used in a region proximate a point of gaze, whilst greater compression is used further from the point of gaze, for example in the users peripheral field of view. This in effect provides foveated compression, allowing greater overall compression to be achieved, without a perceptible loss in quality, by increasing the compression in the user's peripheral field of view where a reduced quality of image is less noticeable. Alternatively, this could be based on characteristics of the display device, for example by varying the degree of compression away from a centre of the display device lens.

In one example, the degree of compression can be based on a distance from the defined point, for example progressively decreasing further from the point of gaze, but can also be based on a direction relative to the defined point, so that compression is greater above or below the defined point. It will be appreciated that this allows a respective degree of compression to be used in regions having any arbitrary shape positioned relative to the point of gaze, and that this could be configured depending on the particular circumstances and/or nature of the content being compressed. For example, this allows an elliptical, ovoid, or heart shaped region surrounding the defined point to have a reduced amount of compression compared to peripheral regions, to thereby maximise the image quality in regions where the user's perception of any compression artefacts will be greater.

It will be appreciated from the above that each pixel array is encoded differently due to the inherent difference in the distribution of frequencies within the pixel array, and in particular based on the particular frequency coefficients that have the greatest magnitude for that respective pixel array. Additionally, the encoding can be performed dynamically by adjusting the encoding parameters, and in particular the thresholds used to control the process, allowing this to take into account external factors, such as the required degree of compression, gaze of the user, or the like, thereby further increasing or decreasing the degree of compression as required.

In one example, the method includes, for frequency coefficients having a set number of bits, selecting frequency coefficients corresponding to lower frequencies before frequency coefficients corresponding to higher frequencies. Thus, for example, if there is a restriction on the total number of bits to be encoded, this might mean that only two of four six bit frequency coefficients are encoded, in which case those with a lower frequency are typically preferentially selected as those tend to have a greater impact on image quality. However, it will be appreciated that this is not essential and other approaches could be used.

The index is typically indicative of a number of bits of each encoded frequency coefficient and a location of the frequency coefficient either in a defined sequence or within the coefficient matrix. For example, the index could identify the frequency coefficient based on a coordinate position within the matrix, or simply based on a relative position in an ordered list of coefficients or a zig-zag traversal of a coefficient matrix. By identifying the frequency coefficient based on a location, this minimises the number of bits required to identify the coefficient, whilst ensuring this can be correctly identified upon decoding.

In this case, the number of bits could be specified once for multiple frequency coefficients, allowing the index to be constructed iteratively, for example by specifying a number of bits n, and then listing a location for each of the encoded frequency coefficients having that specified number of bits n. This would then be repeated for progressively decreasing numbers of bits n, until the index is complete, for example when the encoding parameters are met. It will also be appreciated that an index could be constructed for all frequency coefficients, with only some of these then being encoded and provided with a corresponding part of the index as part of the compressed image data.

Whilst the index can specify the above information each time it is transferred, it will be appreciated that some indexes might be repeated, for example if particular pixel arrays in an image are substantially identical. In this instance, the index could be substituted for a code, for example referring to the index of a previous pixel block, in which case the method can include determining an index code indicative of the index and generating the compressed image data using the index code.

In one example, the index is indicative of a value for each frequency coefficient, although this is not essential, and alternatively the index can be stored separately from the encoded frequency coefficients, for example by providing these as part of separate data structures.

The frequency coefficients can be encoded in any appropriate manner, and this could include encoding the frequency coefficient as the original bit sequence (i.e. without change), encoding the frequency coefficients without scaling and/or without lossy encoding. In one particular example, as the number of bits required to encode the value are known, then the first bit must be a "1" value (it being inherent that if it were "0" a smaller number of bits could be used), meaning this can value be omitted, so that frequency coefficients having n bits, are encoded using n−1 bits by removing a first bit.

However, it will be appreciated that other forms of encoding could be used, such as using a bit encoding scheme in which some of the encoded frequency coefficients have a reduced number of bits. This could be achieved, for example by scaling and/or omitting greater numbers of bits.

Thus, applying a scaling factor to at least some of the frequency coefficients can be used to reduce the frequency coefficient magnitude and hence the number of bits to be encoded. A similar scaling factor can then be applied when decompression is performed, thereby scaling the respective frequency coefficients back to their original magnitude. During this process, rounding is typically performed so that the scaled frequency coefficient is an integer value, or has a limited number of significant figures, thereby minimising the number of bits used to encode the coefficients. It will be appreciated that when this is performed, there is a resulting reduction in accuracy of the recreated frequency coefficients, but that the effect of this on the resulting image quality is negligible.

Additionally, a smaller number of bits can be used to encode frequency coefficients having a smaller magnitude, for example by simply reducing the number of bits used. Whilst this again results in a reduction of accuracy, this is minimal when compared to the accuracy obtain by ensuring the higher magnitude frequency coefficients are accurately encoded.

It will also be appreciated that different encoding schemes could be used for different pixel arrays, for example by selecting one of a plurality of encoding schemes and encoding the pixel data using the selected encoding scheme. This allows different encoding schemes to be selected based on factors, such as a required degree of compression. So, for example, some pixel arrays could be encoded without scaling, whereas others might use scaling for any frequency coefficients having less than 5 bits. Again, the encoding scheme used could be specified as part of the index to facilitate decoding.

In one example, the image data defines a plurality of channels, with the method including selectively encoding frequency coefficients for each channel. By encoding different channels individually, this allows different channels to be encoded differently, for example using different bit encoding schemes, or discarding different frequency coefficients. Additionally, encoding channels independently allows channels to be encoded in parallel, which can significantly assist in reducing the time taken to perform encoding and hence reduce encoding latency.

In one example, the pixel data defines RGB channels, and the method includes converting the RGB channels into luminance and chrominance channels YCbCr and transforming the YCbCr channels. In this regard, luminance and chrominance channels are perceived differently by the human eye, allowing chrominance channels to be encoded using a greater degree of compression and hence a reduce quality compared to the luminance channel, without a resulting loss in perceived quality. Thus, in this example, the method can include selectively encoding more frequency coefficients for the Y channel than the Cb or Cr channels, and similarly can include selectively encoding frequency coefficients for the Y channel with more bits than for the Cb and Cr channels.

In a further example, where the pixel data defines RGB channels, the method can includes converting the RGB channels into YCbCr channels and generating the compressed image data by encoding the CbCr channels and using the Y channel. This, in effect in this example, the Y channel is effectively unencoded, meaning the entire information contained within the luminance channel is retained. This can be particularly useful in some encoding scenarios, for example when encoding pixel arrays showing a gradient, as this can help preserve the colour variations and hence improve image quality, whilst resulting in only a minor decrease in compression.

In general, when converting the RGB channels into YCbCr channels, and additionally when subsequently transforming the YCbCr channels to generate respective frequency coefficients, the converting and transforming steps are performed using a minimum bit size. Specifically, each coefficient is encoded using a number of bits higher than the original native number of bits, so that there is no loss of detail during the step of calculating the frequency coefficients. For example, 8 bit RGB coefficients could be treated as 10 bit coefficients when converting to YCbCr and then subsequently calculating frequency coefficients, to avoid a loss of information during this process. It will be appreciated as the frequency coefficients are subsequently encoded and/or scaled this will not increase the overall magnitude of the compressed data, but avoids loss of information when encoding, and hence can result in improved image quality and particularly reduced banding.

However, it will be appreciated that this is not essential and processing could alternatively be performed in the RGB channels, in which case colour conversion is not necessarily required. This also typically avoids a loss of precision and results in improved image quality.

As mentioned above, the different channels can be encoded in parallel. In this case, the method of generating compressed image data typically includes performing parallel to serial byte encoding, so that the frequency coefficients are serialised into a byte stream, which can then undergo byte encoding.

In this regard, byte encoding can be used to provide an additional lossless compression step. This typically involves code substitution, which is performed by parsing a sequence of bytes forming part of the compressed image data, identifying a sub-sequence including a number of identical bytes and substituting the sub-sequence for a code indicative of a value of the identical bytes and a number of identical bytes in the sub-sequence. In one example, when sub-sequence of identical bytes includes three or more bytes, the code includes two bytes, although it will be appreciated that other suitable coding schemes could be used.

Whilst such code substitution, often referred to as run length encoding, could be performed on any sequence of bytes, in one example, the sequence of bytes is the bit stream formed from the encoded frequency coefficients. In this regard, it is typical for many of the encoded frequency coefficients to have a zero value, meaning that when the bit stream formed from the encoded frequency coefficients is analysed as a sequence of bytes, it is frequent for there to be multiple zero value bytes in sequence. Accordingly, by substituting these for a code, this allows the number of bytes to be reduced.

Whilst the image data can be obtained from any source, in one example, the method includes obtaining the pixel data from a video feed, such as a sequence of images for display. In another example, the method is used as part of a digital reality system, and in one particular example for wirelessly transmitting digital reality content, such as augmented reality, virtual reality, mixed reality, telepresence, or the like.

In one example, the above described compression scheme is implemented in order to perform dynamic compression of individual pixel arrays based on a target degree of compression.

In particular, in this example the target degree of compression, together with information regarding the degree of compression achieved for previous pixel arrays is used to determine a degree of compression that should be used for one or more future pixel arrays. In particular, this is used to select a bit encoding scheme, which is then used to encode the frequency coefficients at least in part utilising the approach described above, so that frequency coefficients having a higher magnitude can be preferentially encoded, although this is not essential. In this case the index is then generated to be indicative of the selected bit encoding scheme, therefore allowing corresponding decoding to be performed.

In this approach, a different bit encoding scheme can be selected depending on the magnitude of the frequency coefficients and the degree of compression required. This allows the compression to be dynamically adjusted for groups of one or more pixel arrays so that the pixel arrays in the group are optimally encoded, whilst ensuring a desired target compression is obtained across an entire image.

Further features of this approach will be described in more detail below.

In one example, the method can be used for displaying image data in a wearable digital reality headset by receiving the compressed image data from a computing device via at least one of a communication network and a wireless communications link. This could include transferring compressed images wirelessly from a computer or other similar device, or could include transferring compressed images from a cloud based computing environment to a local device, such a headset mounted smart phone, allowing creation of images to be performed using cloud computing. Examples of suitable connections, include a hardwired gigabit internet, streaming to mobile phones, for example via mobile communications networks, such as 3G, 4G or 5G networks, transmitting via a wired connection to a tethered HMD, or via a wireless connection to an untethered HMD, or the like.

It will also be appreciated that the above described system can be used in order to facilitate decompression of compressed image data.

For example, the system can use an index of the form described above together with the decoded frequency coefficients to reconstruct a set of frequency coefficients, a defined sequence of frequency coefficients and/or a coefficient matrix. In one example, this process involves decoding each encoded frequency coefficients, determining the location of each frequency coefficient, adding the decoded frequency coefficient into the defined sequence or coefficient matrix and adding null values into empty locations in at least one of the defined sequence and coefficient matrix.

In one example, where the index has been transmitted as a code, the method includes determining an index code from the compressed image data and determining the index from the index code.

Typically the method includes decoding each encoded frequency coefficient without scaling and/or without lossy decoding, with the manner in which this is performed varying depending on the manner in which the frequency coefficient was encoded.

In one particular example, the frequency coefficients are encoded by simply omitting the first bit (as this is always set to a value of "1"), in which case the method includes, for encoded frequency coefficients having n−1 bits, creating a frequency coefficient using n bits by adding a first bit.

However, additionally and/or alternatively, a bit encoding scheme can be used based on the bit encoding scheme used when encoding the frequency coefficients. For example, this could include regenerating some missing frequency coefficients corresponding to smaller frequency coefficients, typically as null values, allowing a subsequent inverse transform to be applied, as will be described in more detail below. The method can also include applying a scaling factor to at least some of the frequency coefficients so that scaled frequency coefficients are transformed.

As previously described the image data typically defines a plurality of channels, with encoded frequency coefficients being selectively decoded for each channel independently. The channels typically include YCbCr channels, with the method including performing an inverse transform of the YCbCr channels and converting the transformed YCbCr channels into RGB channels. Typically, the inverse transformation is an inverse 2-D discrete cosine transformation, although other suitable transforms could be used. It will also be appreciated that if the Y channel has not been encoded, as described above, the method can include decoding the CbCr channels and then converting the decoded CbCr channels and the Y channel into RGB channels. As in the example of compressing the image data, the method typically includes generating more frequency coefficients for the Cb or Cr channels than the Y channel.

The method can also include decoding channels in parallel, in which case compressed image data can be at least partially decoded by serial to parallel byte decoding, effectively segmenting the incoming byte stream into individual bit encoded frequency coefficients, which are then decoded in parallel.

In the event that lossless encoding is also performed, the method typically includes identifying a code within a sequence of bytes and substituting the code for a sub-sequence including a number of identical bytes. In this case, the code is typically indicative of a value of the identical bytes and a number of identical bytes in the sub-sequence. Again, the sub-sequence typically includes three or more bytes and the code includes two bytes, although other suitable arrangements could be used. Typically this process is performed on the compressed image data, with this being used to generate the bit stream, which is then used in creating the encoded frequency coefficients.

The decompressed data may also undergo further processing, such as using a deblocking filter, which is used for smoothing the sharp edges which can form between macroblocks when block coding techniques or the like used. This in turn can allow an increased degree of compression to be used, whilst avoiding a corresponding reduction in image quality.

In a further example, the pixel data undergoes further modification in order to help reduce banding. In this regard, compression can remove higher frequency components from the coefficient matrix, which can result in uniform bands of colour within images. To reduce this effect, pixel values can be modified to break up the uniformity of such regions.

In one example, this is achieved by determining pixel values for pixels in a pixel array within the one or more images from the compressed image data. The pixel values are then modified using a modifier array representing modifier values for each pixel in the pixel array, before the modified pixel values are quantised to generate pixel data indicative of the pixel array in in the image.

The modifier array can be selected in accordance a position of the pixel array in the one or more images, display data, communications link data, configuration data and/or content data, which can help optimise the modification performed. For example, the modification could be maximised where uniform blocks of pixels are likely to arise, or in regions where resulting banding would be perceived by the user.

In one example, the modifier array is different for pixel arrays at different positions within the image, thereby helping reduce the introduction of additional artefacts, whilst the modifier array is typically identical for pixel arrays in the same position in different images, thereby ensuring consistency between images.

Whilst any values could be used, in one example the modifier values are pseudorandom values.

Figure 1B:
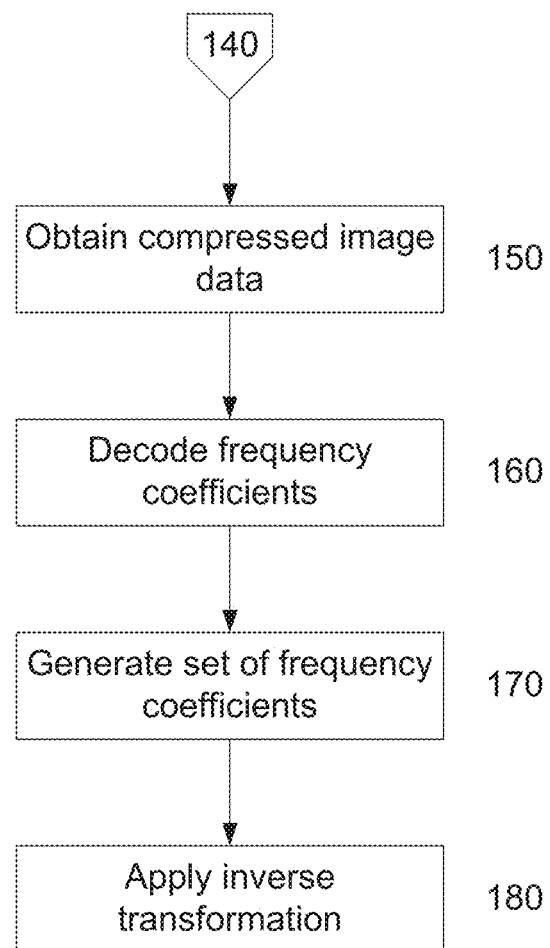

The use of a modifier can also be used with any compression technique and is not limited for use with the approach described in FIGS. 1A and 1B. Thus it will be appreciated this approach can provide an alternative aspect of the invention.

In a further example, the above described method is performed by a respective hardware configuration. For example, compressing image data can be performed by an encoder including an electronic encoder processing device that obtains pixel data from the image data, performs a frequency transformation, selectively encodes at least some of the frequency coefficients, generates an index indicative of the encoded frequency coefficients and generates compressed image data using the encoded frequency coefficients and the index.

Similarly decompressing the compressed image data can be performed using a decoder including an electronic decoder processing device that obtains compressed image data, determines a set of encoded frequency coefficients from the compressed image data, performs bit decoding of the encoded frequency coefficients, generates a set of frequency coefficients using the subset of frequency coefficients and the index and applies an inverse transformation to the set of frequency coefficients to determine pixel data representing an pixel array within the one or more images.

Figure 2A:
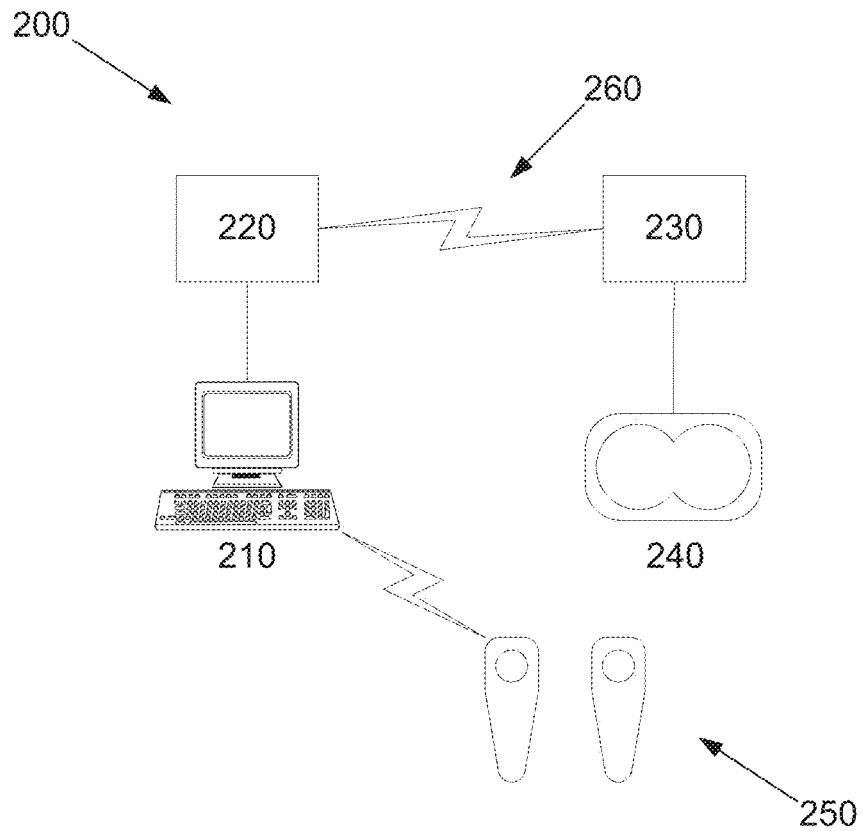
FIG. 2A is a schematic diagram of a first example of an apparatus for displaying images on a wearable device.

In one example, the apparatus includes an encoder and decoder in wireless communication, allowing image data to be transferred between the encoder and decoder as compressed image data. In one particular example, this can be utilised in order to provide wireless communication between a wearable display device, such as an HMD and/or a portable device such as a mobile phone, and a processing system, and in one example a cloud based processing system. An example of this will now be described with reference to FIG. 2A.

In this example, a processing system 210, such as a suitably programmed computer system, gaming console, or the like, is adapted to generate content for display on an HMD 240. The processing system 210 typically achieves this by receiving sensor data from the HMD regarding the pose of the HMD, and optionally input data from one or more separate controller 250. The processing system 210 then generates content based on the sensor and/or input data, typically in the form of video data, which can be output from a video card or the like. The video data is transferred to an encoder 220, which encodes the video data by compressing the image data, before wirelessly transferring the compressed image data to the decoder 230, via a wireless communications link 260. The decoder 230 decodes the compressed image data, and provides the resulting video data to the HMD for display.

It will be appreciated that this arrangement allows for existing computer systems, gaming consoles or the like and HMDs 210, 240, to be connected via a wireless connection 260, thereby obviating the need for a wired connection between the processing system 210 and HMD 240. Thus, for example, a user could wear an HMD and associated decoder, and then connect the encoder to their computer system or gaming console, allowing a wireless HMD arrangement to be provided. This can be used to convert traditional tethered headsets into a wireless arrangement.

Figure 2B:
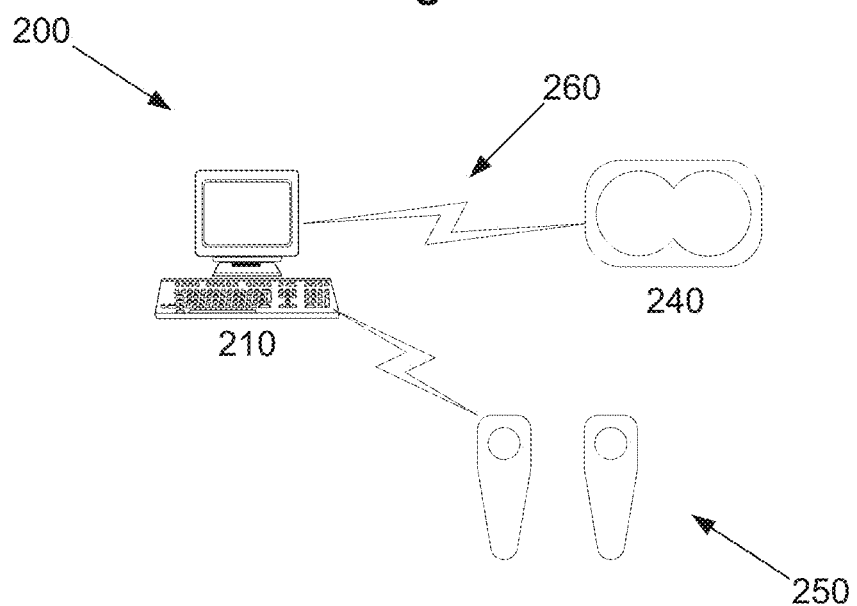
FIG. 2B is a schematic diagram of a second example of an apparatus for displaying images on a wearable device.

However, this is not essential, and alternatively, the processing system 210 and HMD 240 can be configured to include integrated encoder and decoder hardware, allowing these to communicate via a direct wireless connection 260, as shown in FIG. 2B. For example, the encoder could be provided in a computer system used for generating content, whilst the decoder could be integrated in a smart phone, for example in a Snapdragon 820 Hexagon DSP or similar, allowing the smart phone to receive and decode content streamed wirelessly from the computer system. In one example, this allows the computer system to stream over a local wireless connection, but in another example this could be used to provide content via a mobile phone network or similar from a cloud based digital reality engine.

Figure 3:
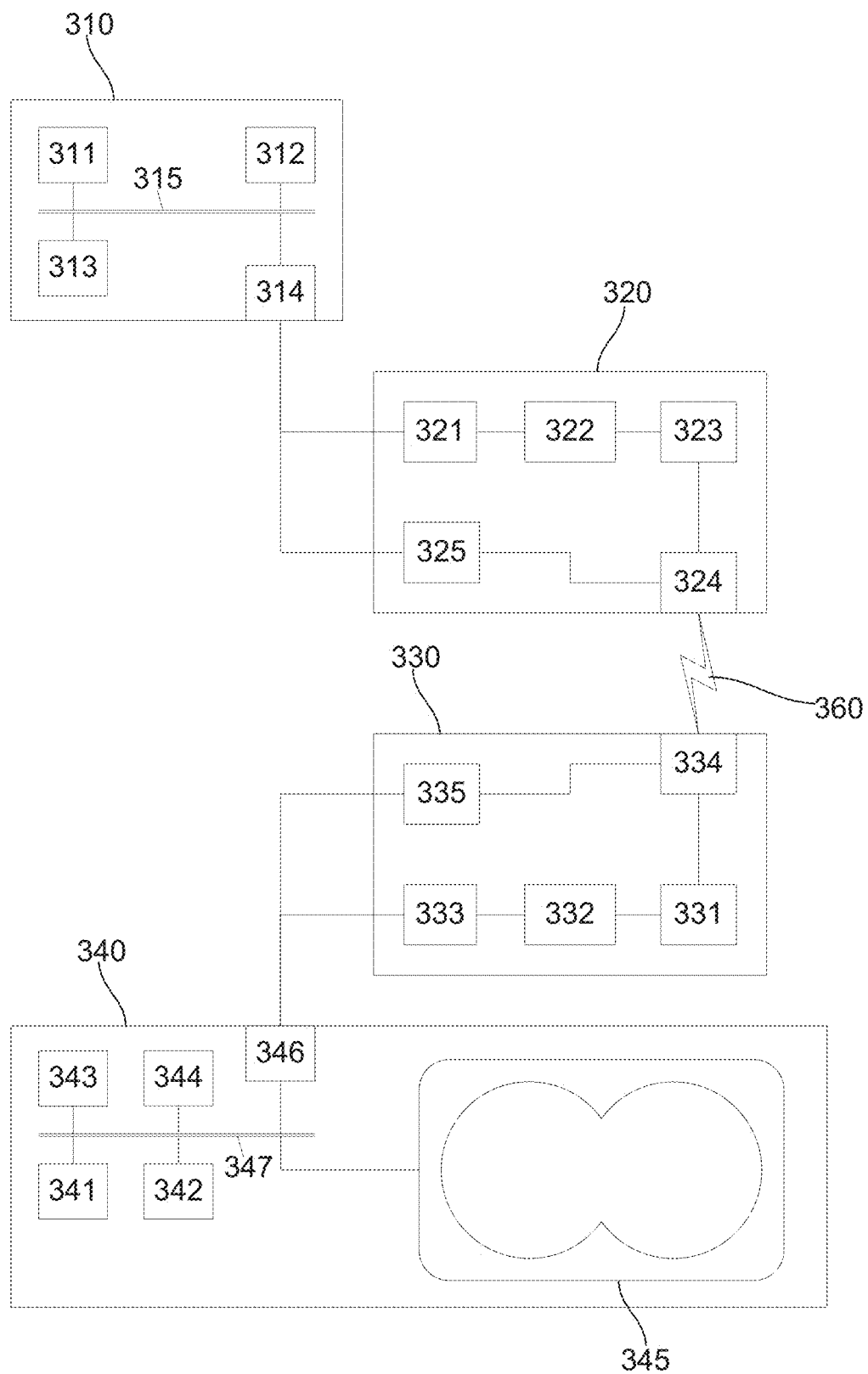
FIG. 3 is a schematic diagram of a specific example of a virtual reality system incorporating apparatus for compressing and decompressing image data.
Figure 4A:
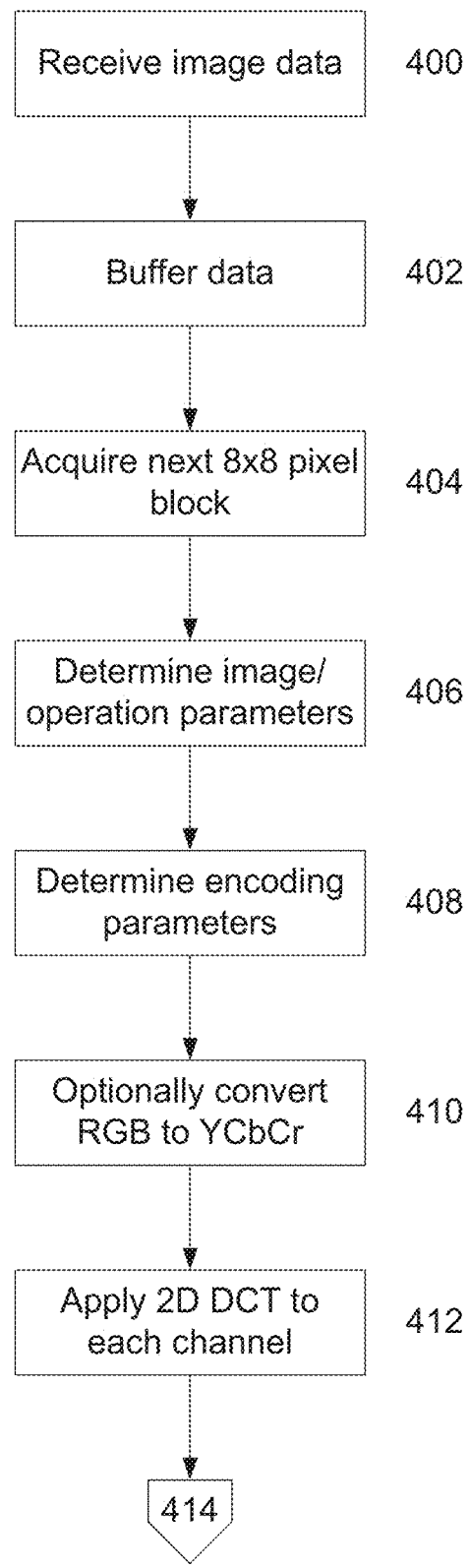
FIGS. 4A to 4D are a flow chart of a specific example of a method for compressing and subsequently decompressing image data.
Figure 4B:
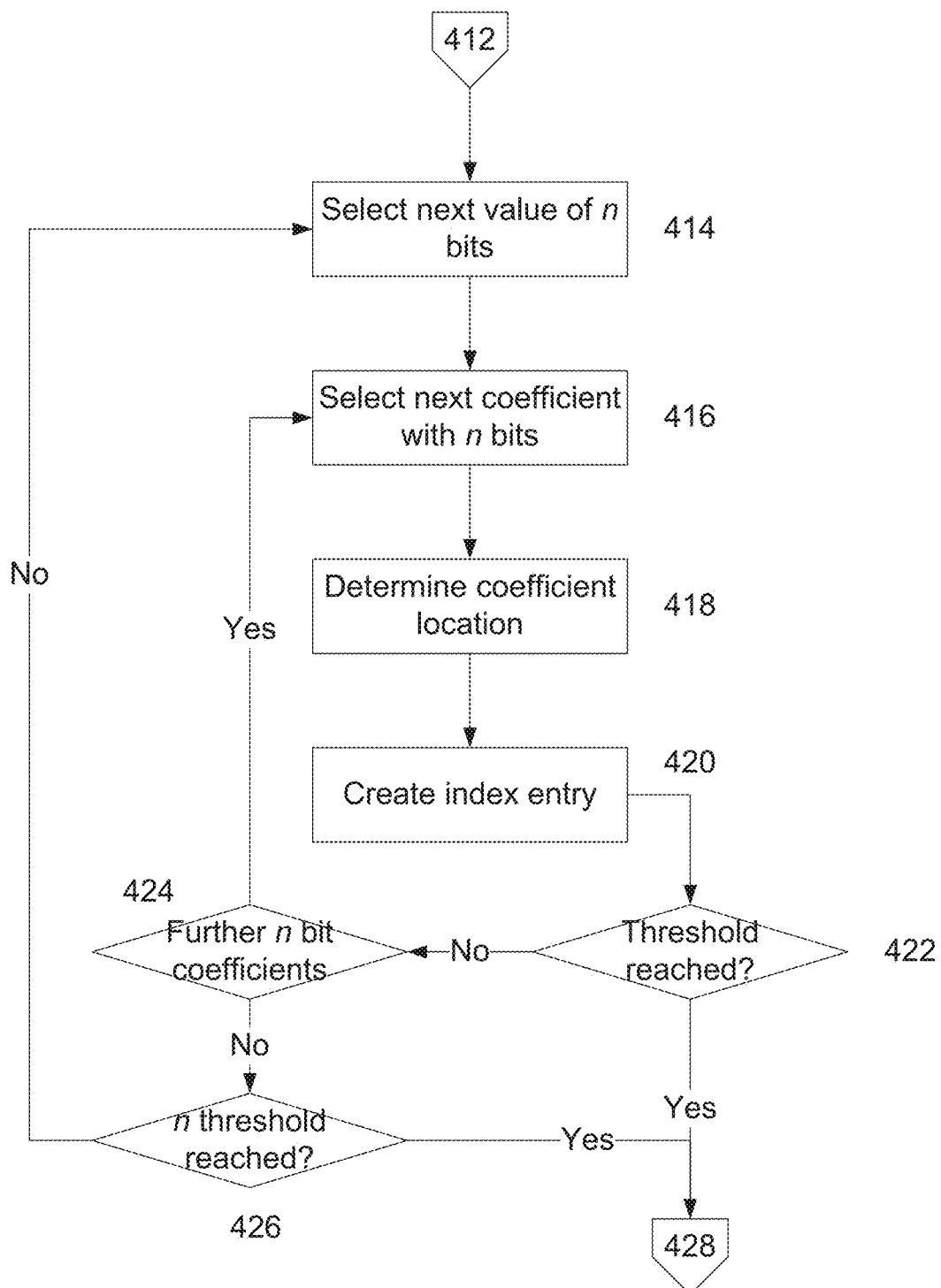
Figure 4C:
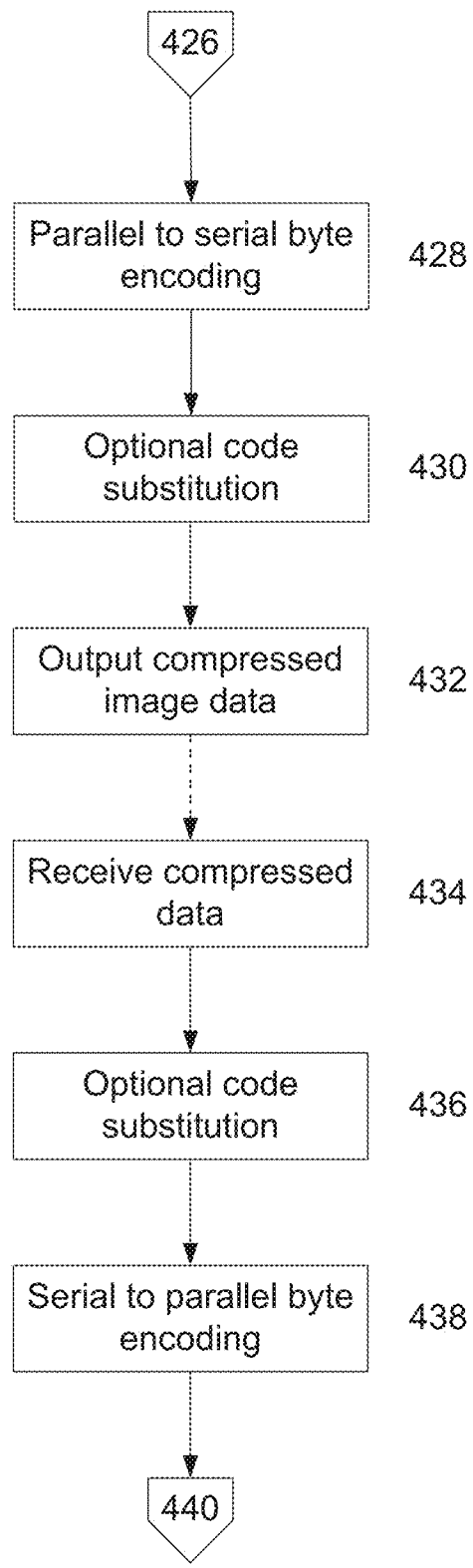
Figure 4D:
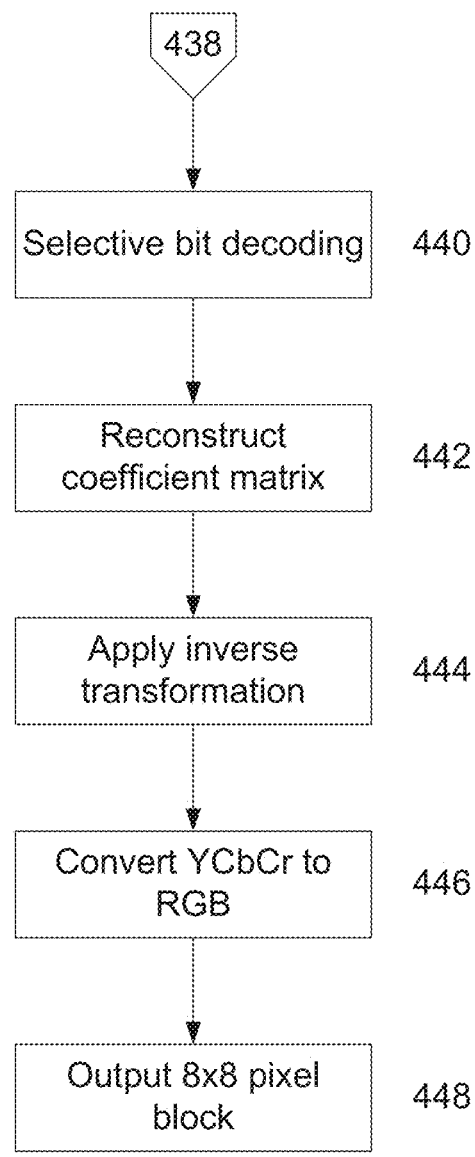

An example of the hardware configuration will now be described in more detail with reference to FIG. 3.

This example will be illustrated with respect to a separate hardware encoder and decoder, but it will be appreciated that this is not essential and the same techniques could be used in conjunction with integrated hardware. Furthermore, whilst reference to made to virtual reality applications, again this is not essential and the techniques could be used to apply to any circumstance in which image data is to be transferred, and in particular when image data is to be transferred using a limited bandwidth, whilst maintaining an acceptable image quality and desired latency, such as in virtual reality, augmented reality or telepresence applications.

In this example, the apparatus 300 again includes a processing system 310, encoder 320, decoder 330 and a display device 340, in the form of an HMD or similar. Each of these coefficients will now be described in more detail.

In this example, the processing system 310 includes at least one microprocessor 311, a memory 312, an optional input/output device 313, such as a keyboard and/or display, and an external interface 314, interconnected via a bus 315 as shown. The external interface 314 can be utilised for connecting the processing system 310 to peripheral devices, such as communications networks, storage devices, peripherals, or the like. Although a single external interface 314 is shown, this is for the purpose of example only, and in practice multiple interfaces using various methods (eg. Ethernet, serial, USB, wireless or the like) may be provided. In this particular example, the external interface includes at least a data connection, such as USB, and video connection, such as DisplayPort, HMDI, Thunderbolt, or the like.

In use, the microprocessor 311 executes instructions in the form of applications software stored in the memory 312 to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed PC, or the like. In one particular example, the processing system 310 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), an Application-Specific Integrated Circuit (ASIC), a system on a chip (SoC), a Graphics Processing Unit (GPU), Digital Signal Processing (DSP), or any other electronic device, system or arrangement.

Furthermore, whilst the processing system 310 is shown as a single entity, it will be appreciated that in practice the processing system 310 could be formed from multiple physical devices, which can optionally be distributed over a number of geographically separate locations, for example as part of a cloud based environment.

The encoder 320 typically includes an encoder input buffer 321, coupled in turn to an encoder processing device 322, an encoder output buffer 323, and a transceiver 324. A separate data buffer 325 can be provided coupled to the transceiver 324.

In use, image data, and in one particular example, video data is received and temporarily stored in the input buffer 321, before being passed to the encoder processing device 322 for compression. In this regard, the encoder input buffer typically buffers image data corresponding to a next m−1 rows of pixels of the image and a next m pixels of the next row of pixels, thereby obtaining pixel data for a next m×m block of pixels. Thus, it will be appreciated from this that the process does not require that an entire image is buffered, but rather only requires that m−1 rows of pixels and a further m pixels from the next row are buffered before processing starts. Once this has been done a next m pixels are buffered, with this being repeated until pixel data from the first m rows of pixels has been obtained and is being encoded. This process is then repeated for subsequent rows of pixels in the image, until pixel data is acquired for the entire image, at which point a next image is processed in a similar manner. The value of m is generally an integer and can be set depending on factors, such as selection rules, a required degree of compression, a position of the pixel array or the like. In one example m=8, in which case the process includes buffering seven rows of pixels of the image, and then a next eight pixels of the next row of pixels, so that the encoder processing device 322 obtains pixel data for a next 8×8 block of pixels from the buffered image data before it commences encoding.

As a result of this approach, the encoder input buffer need never store more than seven rows and eight pixels of image data, reducing memory requirements. Additionally, as pixel data is acquired, this can be immediately processed using the encoding process, even before the next eight pixels of image data are buffered. This has two major impacts, namely reduces processing times, in turn leading to significant reductions in latency, as well as reducing overall memory requirements.

The resulting compressed image data is then stored in the encoder output buffer 323, for example by sequentially reading in encoded bits, to thereby perform parallel to serial byte encoding, before being transferred to the decoder 330, via the transceiver 324. The transceiver 324 is also adapted to transfer other data, such as a sensor data received from the HMD 340, via the encoder data buffer 325.

The buffers 321, 323, 325 can be of any appropriate form of temporary storage, depending on the preferred implementation, and in one example can include high-performance FIFO (First-In-First-Out) field memory chips, or the like. The input buffer is typically connected to an HDMI port, display port output, or any other suitable video source, whilst the data buffer 335 is connected to a USB port, thereby allowing equivalent connection to the computer system.

The transceiver 324 can be of any appropriate form, but in one example allows for short range radio based communication 360 between the encoder and decoder, for example via a point to point direct WiFi™ connection, 60 GHz wireless technology, or the like.

The processing device 322 can be any device capable of performing the compression process described herein. The processing device 322 could include a generic processing device operating in accordance with software instructions stored in memory. However, in one example, in order to ensure a suitably quick compression time, the processing device includes custom hardware configured to perform the compression process. This could include, firmware optionally associated with implementing logic such as an FPGA (Field Programmable Gate Array), a Graphics Processing Unit (GPU), an Application-Specific Integrated Circuit (ASIC), a system on a chip (SoC), digital signal processor (DSP), or any other electronic device, system or arrangement. In a preferred example, the encoder processing device 322 is configured to perform parallel processing of individual channels, of each DCT and parallel encoding of the individual frequency coefficients. Thus, whilst a single encoder processing device 322 is shown, in practice, a respective encoder processing device 322 could be provided for encoding each of the channels in parallel, or alternatively a GPU or other similar parallel processing architecture could be used. In the event that a channel, such as the Y channel, is not encoded, then the encoder processing device may simply introduce a delay in transmitting the respective data to the encoder output buffer 323, ensuring this is still synchronised with the encoded CbCr channels.

In the above described example, the encoder 320 and processing system 310 are described as discrete physical entities, but it will be appreciated that in practice this is not necessarily the case, and in one example the functionality of the encoder is implemented within hardware within the processing system 310, such as in a GPU or the like.

The decoder 330 typically includes a transceiver 334 coupled to a decoder input buffer 331, in turn coupled to a decoder processing device 332 and a decoder output buffer 333. A separate data buffer 335 can also be provided coupled to the transceiver 334.

In use, compressed image data is received from the encoder 320 via the transceiver 334, and temporarily stored in the input buffer 331, before being passed to the decoder processing device 332 for decompression. The resulting image data is then stored in the decoder output buffer 333, before being transferred to the display device 340. The transceiver 324 is also adapted to transfer other data, such as a sensor data received from the display device 340, via the decoder data buffer 335.

The buffers 331, 333, 335 can be of any appropriate form of temporary storage, depending on the preferred implementation, and in one example can include high-performance FIFO (First-In-First-Out) field memory chips, or the like. The output buffer is typically connected to an HDMI port, whilst the data buffer 335 is connected to a USB port, thereby allowing equivalent connection to the display device.

The transceiver 334 can be of any appropriate form, but in one example allows for short range radio based communication 360 between the encoder and decoder, for example via a point to point direct WiFi™ connection, 60 GHz wireless technology, or the like.

The processing device 332 could include a generic processing device operating in accordance with software instructions stored in memory. However, in one example, in order to ensure a suitably low decompression time, the processing device includes custom hardware configured to perform the decompression process. This could include, firmware optionally associated with implementing logic such as an FPGA (Field Programmable Gate Array), a Graphics Processing Unit (GPU), an Application-Specific Integrated Circuit (ASIC), a system on a chip (SoC), digital signal processor (DSP), or any other electronic device, system or arrangement. In a preferred example, the decoder processing device 332 is configured to perform parallel processing of individual channels, of each DCT and parallel encoding of the individual frequency coefficients. Again, whilst a single decoder processing device 332 is shown, in practice, a respective encoder processing device 332 could be provided for encoding each of the channels in parallel, or alternatively a GPU or other similar parallel processing architecture could be used. In the event that a channel, such as the Y channel, is not encoded, then the decoder processing device may simply introduce a delay in transmitting the respective data to the decoder output buffer 333, ensuring this is still synchronised with the CbCr channels.

The display device 340 includes at least one microprocessor 341, a memory 342, an optional input/output device 343, such as a keypad or input buttons, one or more sensors 344, a display 345, and an external interface 346, interconnected via a bus 347 as shown.

The display device 340 can be in the form of HMD, and is therefore provided in an appropriate housing, allowing this to be worn by the user, and including associated lenses, allowing the display to be viewed, as will be appreciated by persons skilled in the art.

In this example, the external interface 347 is adapted for normally connecting the display device to the processing system 310 via a wired connection. Although a single external interface 347 is shown, this is for the purpose of example only, and in practice multiple interfaces using various methods (eg. Ethernet, serial, USB, wireless or the like) may be provided. In this particular example, the external interface would typically include at least a data connection, such as USB, and video connection, such as DisplayPort, HMDI, Thunderbolt, or the like.

In use, the microprocessor 341 executes instructions in the form of applications software stored in the memory 342 to allow the required processes to be performed. The applications software may include one or more software modules, and may be executed in a suitable execution environment, such as an operating system environment, or the like. Accordingly, it will be appreciated that the processing device could be any electronic processing device such as a microprocessor, microchip processor, logic gate configuration, firmware optionally associated with implementing logic such as an FPGA (Field Programmable Gate Array), a Graphics Processing Unit (GPU), an Application-Specific Integrated Circuit (ASIC), a system on a chip (SoC), digital signal processor (DSP), or any other electronic device, system or arrangement.

The sensors 344 are generally used for sensing an orientation and/or position of the display device 340, and could include inertial sensors, accelerometers or the like. Additional sensors, such as light or proximity sensors could be provided to determine whether the display device is currently being worn, whilst eye tracking sensors could be used to provide an indication of a point of gaze of a user.

In the above described example, the decoder 330 and display device 340 are described as discrete physical entities, but it will be appreciated that in practice this is not necessarily the case, and in one example the functionality of the decoder can implemented within hardware within the display device 340.

In one example, the display device could therefore be an existing commercial display device, such as an HTC Vive™, Oculus Rift™ or Playstation VR™ headset, although it will be appreciated that this is not essential and any suitable arrangement could be used. For example, the display device could be in the form of a mobile phone or other similar display device incorporated into a wearable headset, with the digital reality content being generated and provided from a remote computer, such as a cloud based system, via one or more wireless networks.

An example of the operation of the image compression/decompression process will now be described in more detail.

For the purpose of this example, it is assumed that the processing systems 310 is executing applications software that generates content that is displayed on the display device 340, with the content being displayed dynamically based on sensor data from sensors 345 onboard the display device 340, and optionally other sensors, such as handheld controllers or position detection systems (not shown), as will be appreciated by persons skilled in the art.

Actions performed by the processing system 310 being performed by the processor 311 in accordance with instructions stored as applications software in the memory 312 and/or input commands received from a user via the I/O device 313, or other peripherals (not shown). Actions performed by the display device 340 are performed by the processor 341 in accordance with instructions stored as applications software in the memory 342.

The encoder 320 and decoder 340 act as interfaces between the processing system 310 and display device 340, allowing image data to be compressed, transmitted wirelessly, and then decompressed before being displayed on the display device 340, whilst also allowing sensor data or other input command data to be transferred back to the processing system. Actions performed by the encoder 320 and decoder 330 are typically performed by the respective processing device 322, 332, based on defined programming, and in one example a custom hardware configuration and/or instructions in embedded firmware.

However, it will be appreciated that the above described configuration assumed for the purpose of the following examples is not essential, and numerous other configurations may be used. For example, the functionality of the encoder and decoder could be inbuilt within the processing system 310 and display device 340 directly. Additionally, the compression techniques can be applied in a wide range of other scenarios, including compressing and decompressing images on one or more computer systems, without requiring the use of the separate display device. Nevertheless, the above arrangement is particularly beneficial for virtual or augmented reality applications, telepresence applications, or the like.

The process of a method of compressing and subsequently decompressing image data will now be described in more details with reference to FIGS. 4A to 4D.

In this example, the encoder 320 receives image data representing one or more of a sequence of images, from the processing system 310, and temporarily stores this in the encoder input buffer 321 at steps 400 and 402. The image data is analysed, for example by parsing the data to identify flags within the data that delimit headers, identify the start of an image, or the like, allowing pixel data corresponding a next block of 8×8 pixels from the image data to be acquired at step 404. In this regard, when buffering the data, the encoder requires an initial 8×8 block of pixels from the image in order to commence processing. Accordingly, the encoder input buffer 321 is populated with the first seven lines of pixels of an image, as well as the first eight pixels of the eighth line of pixels, before processing can commence. As the next eight pixels are received, the next 8×8 block can be processed, with this being repeated until all pixels in the first eight rows of the image have been processed. Following this a next group of eight rows can be processed in a similar manner.

At step 406, one or more image and/or operational parameters are determined. These parameters are used to determine the degree of compression that should be used, and can be used to control other aspects of the compression process, such as whether colour space conversion or scaling are to be used. The nature of the image and operational parameters will vary depending on the preferred implementation, and it will also be appreciated that the terms are only used for ease of illustration and are not intended to be limiting.

In one example, the image parameters include a position of the pixel array within the one or more images. The position can be an absolute position within the image, so that for example pixel arrays near an edge of the image may require less detail, in which case greater compression can be performed. Additionally, and/or alternatively, the position can be determined relative to a defined position, which is at least partially indicative of a point of gaze of the user. The defined position can be based on an actual measured point of gaze, with information regarding this being received from suitable sensors in the wearable display device 340, or an expected or predicted point of gaze of the user, determined for example by assuming the user is staring at an approximate centre of the image, or based on the content, such as a point of focus within the image, movement of the headset, or the like. Additionally, the defined point can be offset from the point of gaze, for example positioning this below the point of gaze to take account of the fact that individuals tend to focus slightly below the point of gaze to avoid colliding with obstacles when walking. This can be used to minimise the degree of compression in regions near the point of gaze, whilst increasing compression further away from the point of gaze, where the user's perception of the image quality is lower.

The operational parameters can include aspects of the operation of the display device and/or transmission system, such as an available bandwidth or rate of movement of the headset. In this case, the level of compression performed can depend on the available bandwidth, with image quality being reduced as bandwidth drops, to ensure successful transmission of the image data, whilst in the case of headset movement, a more rapid rate of movement typically requires less image detail but a higher frame rate, which could in turn be achieved by increasing the degree of compression. It will be appreciated that such operational parameters can be determined in a wide variety of ways depending on the nature and the parameters and the particular implementation. This could include determining parameters from the headset or other display, including information regarding movement derived from in-built or external sensors, details of transmission bandwidth determined from a transmission system or the like.

At step 408, one or more encoding parameters are determined using the operational and/or image parameters, with the encoding parameter defining how the encoding process is performed, such as the need to perform colour conversion and/or particular threshold level values. The encoding parameters can be determined in any suitable manner, such as using the image and/or operational parameters to retrieve the encoding parameters from a look-up table, or similar. In this regard, the look-up table would typically be pre-configured and define the relevant values that are to be used for different scenarios. For example, this would typically define different thresholds values for different pixel block locations in the image, and then may define further offsets to be applied to the threshold values based on operational parameters, such as the available bandwidth.

The pixel data is typically in the form of multi-channel RGB data, and may optionally be converted to YCbCr luminance and chrominance channels by the processing device 322 at step 410, depending on the process defined by the encoding parameters. However, this is not essential, and more typically if it is desired to maintain as much image quality as possible, the pixel data is maintained in RGB format.

At step 412 a 2D DCT is applied to each of the channels, to thereby transform the channels into the frequency domain. This process can be performed using known techniques, and in a preferred example is performed by the processing device 322 in a highly parallel fashion to thereby reduce processing times. The result of the transformation process on each channel is an 8×8 matrix, having 64 frequency coefficients, representing the magnitude of different frequency coefficients in the respective image channel.

Figures 5A, 5B:
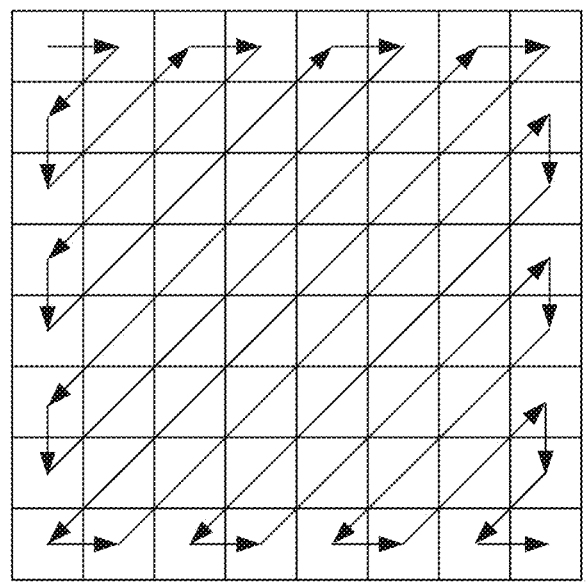
FIG. 5A is a schematic diagram of an example of a coefficient matrix.
FIG. 5B is a schematic diagram of an example of a traversal path of the coefficient matrix of FIG. 5A.

At step 414 a next value of bits n is selected. The value of bits is typically set at the maximum number of bits that is required to define the values of the frequency coefficients, which could include 8, 9 10, 11 or 12 bits, or more, depending on the particular circumstances. In the example of FIG. 5A a matrix is shown including a number of frequency coefficients having values that can be defined by different numbers of bits, including 0 to 8 bits, denoted by $C_0$ to $C_8$.

At step 416, the coefficient matrix is traversed, for example using the zig-zag traversal path shown in FIG. 5B, until a first 8 bit coefficient $C_8$ is reached. At this point, the location of the frequency coefficient is determined, either based on a number between 0 and 63, representing the distance traversed along the path, or using two values between 0 and 7 representing a row and column of the matrix. It will be appreciated that in each case, the location can be expressed using 6 bits.

Figure 5C:
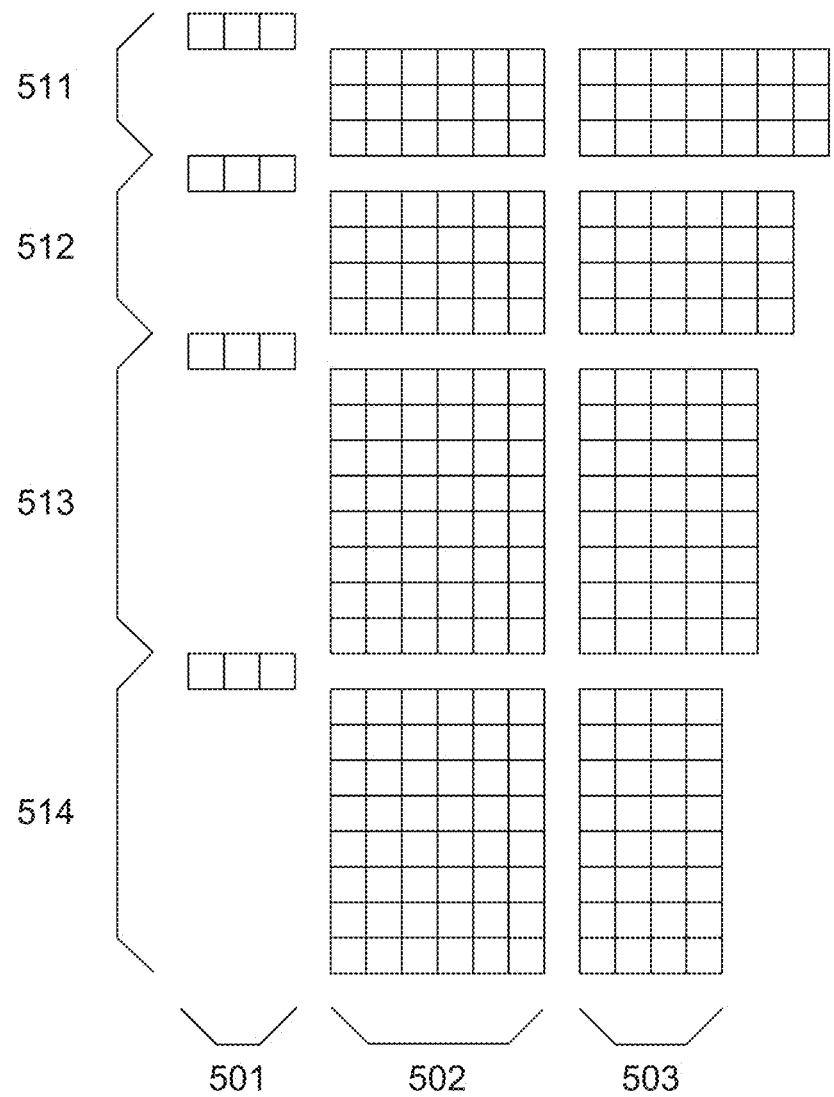
FIG. 5C is a schematic diagram of an example of a bit structure of an index for the coefficient matrix of FIG. 5A; and, FIG. 6 is a graph illustrating an example of the compression error obtained for different frequency component selections.

At step 420, the index entry is created, with an example of this being shown schematically in FIG. 5C.

In this example, the index includes a column 501 including entries defining a current number of bits n, a second column 502 representing a location and a third column 503 representing the value of the frequency coefficient. Whilst the value of the frequency coefficient is included in the index in this example, it will be appreciated that this is not essential, and alternatively the index and frequency values could be provided in separate data structures.

As part of this process, the frequency coefficient typically undergo encoding. In this regard, the first frequency coefficient is shown with 7 bits, as the first bit can be omitted on the basis that this must be a value "1", otherwise the frequency coefficient would be a 7 bit value. It will also be appreciated however that other coding schemes could be employed to further reduce the number of bits, for example by scaling or the like, and these processes will not be described in further detail.

At step 422 it is determined if a threshold is reached. The threshold could be a bit threshold defining the total number of bits that can be encoded for the respective pixel array, allowing the total magnitude of compressed image data being generated to be tightly controlled. Alternatively, the threshold could be a number of frequency coefficients, meaning a set number of coefficients are encoded.

Assuming the total bit threshold is not reached, the process moves on to step 424, with the processing device determining if there are further 8 bit coefficients Cs. If so, the process returns to step 416 to select a next frequency coefficient, allowing this to be added to the index using the above process. For the example shown in FIG. 5C, it will be appreciated that this loop is repeated three times until each of the 8 bit coefficients $C_8$ have been indexed, as shown by the row group 511.

Once all frequency coefficients of the given length are encoded, the process moves on to step 426, to determine if a threshold for the value of n has been reached, and if not, the process returns to step 414 to select a next value of n, before repeating steps 416 to 424 for that value of n. This continues until either the total bit threshold of n threshold values are reached. In the example of FIG. 5C, a value of 4 is set as the n threshold, resulting in the index structure shown, with row groups 512, 513, 514 for 7, 6 and 5 bit groups respectively.

It will therefore be appreciated that using the above defined process, the coefficient matrix is recursively searched for successive decreasing values of the number of bits n until a limit is reached. The number of resulting bits for the index and frequency coefficients will depend on the actual values of the frequency coefficients, which will vary dramatically for different pixel arrays. Examples of the total number of bits required for different n threshold values are shown in Table 1 below. To encode 64 8-bit words would normally require 512 bits, so in this instance, it is apparent that as long as nothing smaller than 4 bit frequency coefficients are encoded then there will be a reduction in the number of bits that need to be encoded.

TABLE 1

| n Threshold | No. bits |
|---|---|
| 8 | 42 |
| 7 | 93 |
| 6 | 184 |
| 5 | 267 |
| 4 | 451 |
| 3 | 510 |
| 2 | 561 |
| 1 | 660 |

Figure 6:
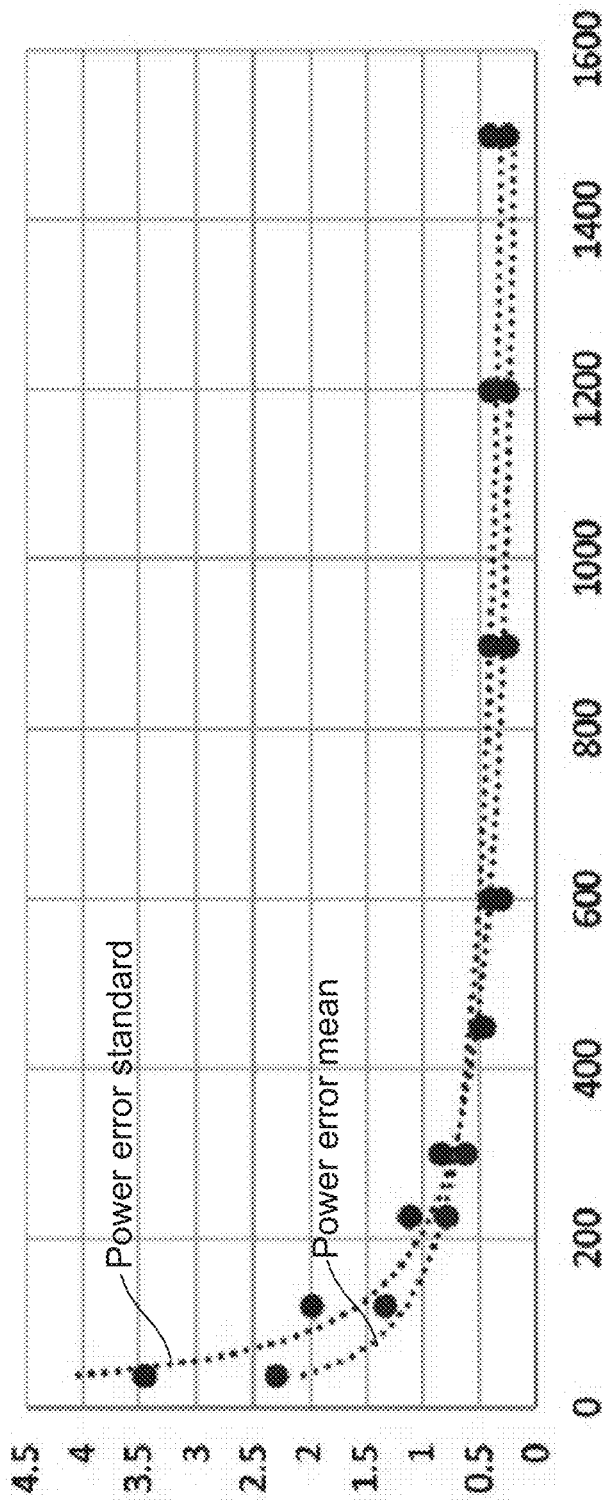

In practice, most coefficient matrices have a much greater number of frequency coefficient with small values, and hence reductions in the number of bits are far greater, meaning that in practice greater compression can be achieved. A graph illustrating the magnitude of the compression error is shown in FIG. 6. In particular, this graph shows the average number of bits encoded per frequency coefficient in the coefficient matrix vs the mean error and the standard error. This highlights that there is a smooth transition in image quality as the number of bits retained is changed, making it easy to adaptively alter the degree of compression performed whilst understanding the impact this will have on the resulting image quality. In one example, the method is implemented to provide an index and encoded frequency coefficients having between 13-512 bits for each block.

It will also be appreciated that the degree of compression obtained is relatively higher for when higher bit frequency coefficients, such as 10 or 12 bit magnitude frequency coefficients are present in the matrix, meaning benefits are generally greater for higher quality images.

Irrespective of the relative degree of compression obtained, a further important factor is that the most important frequency coefficients, and particularly those with the highest magnitude are retained, thereby minimising the impact on the resulting image quality.

In the above example, the indexing process is halted once the subset of frequency coefficients to be encoded has been identified. However, it will be appreciated that this is not essential, and alternatively the entire coefficient matrix could be traversed for all frequency coefficient magnitudes, effectively creating an index of all frequency coefficients. In this instance the thresholds could be applied after the index is created so that only a selected subset of frequency coefficients are incorporated into the compressed image data. It will be appreciated that this has the same end result, and this will not therefore be described in further detail.

Once the encoding has been performed, the index and the encoded subset of frequency coefficients can be concatenated into a bit stream at step 428 by performing parallel to serial byte encoding, in particular by combining the index and frequency coefficients for each of the three channels.

At step 430, additional encoding can be performed by parsing the bytes to identify sub-sequences of identical bytes, which are then substituted for a code so as to perform code substitution encoding. Specifically, this approach is used to identify sub-sequences of three or more identical bytes, which can then be substituted for a code without any loss of information. In particular, for most images there are strings of zeros in the resulting encoded frequency coefficients, where the scaled coefficients have rounded to zero. Accordingly, these can be substituted by a code, which can be identified by the decoder, allowing the decoder to reinsert the sub-sequence of identical bytes.

Whilst the code could of any suitable form, in one example the code includes a header identifying that the particular byte is a code, and information corresponding to the value of and number of identical bytes. In a preferred arrangement a 2 byte code is combined using a Boolean OR operation with the number of zeros in a row (1-8). In one example, the number of zeros is represented as N−1, so that the numbers of 0-7 are ORed with the 2 byte code so that these only take up 3 bits of the second byte. For example, the code used can be (1111 1111; 1111 1000) with the second byte OR'ed with 0-7 depending on the number of zeros. It will be appreciated that similar approaches could be used for different values.

This approach works well as the encoding rarely results in consecutive numbers greater than or equal in value to 248, so the decoding algorithm can simply search for one byte having a value of 255 and a subsequent byte having a value greater than or equal to 248, identifying this as a code as opposed to encoded frequency coefficients. This code is then replaced by bytes corresponding to the data with the number of a sequence of zeros represented by the last 3 bits of the second byte. This can lead to a further 19-25% reduction in data after the bit encoding stage based on testing to date.

Having performed code substitution, compressed image data can be output at step 432. Specifically, the compressed image data is typically stored in the output buffer 323 until sufficient data is present, at which time a data packet is created and transmitted to the encoder by the transceiver 324.

At step 434 the decoder 330 receives the compressed data via the transceiver 334, storing this in the decoder input buffer 331. The data is parsed at to identify codes within the data, as described above, with these being substituted with sub-sequences of repeated identical bytes at step 436, before serial to parallel byte encoding is performed at step 438 in order to reconstruct the index and frequency coefficients for each of the three colour channels.

At step 440, selective bit decoding is performed, specifically to decode each of the encoded frequency coefficients. It will be appreciated that in its simplest form this simply involves adding a "1" bit to the start of each of the encoded frequency coefficients. The decoded frequency coefficients are then inserted into a frequency coefficient matrix based on the location identified in the index. For any empty spaces in the matrix these are then populated by null values, before an inverse 2D DCT transform is applied at step 444. If necessary the transformed matrix for each YCbCr channel is converted into RGB channels at step 446, allowing an 8×8 pixel block to be output at step 448, allowing this to be rendered by the display device 340.

Accordingly, the above described process allows significant reduction in the amount of image data required to encode each 8×8 block of pixels, and hence overall images. In particular, this is achieved by selectively encoding frequency coefficients having the largest magnitude, preferentially encoding these and transmitting them together with an index to allow the coefficient matrix to be regenerated. This vastly increases the flexibility of the encoding that can be performed, and in particular optimising the compression that is performed on a block by block basis.

The optimisation is performed automatically based on the content of the block, in particular selecting frequency coefficients based on the magnitude of the frequency coefficients, meaning the more important frequency coefficients are chosen by default. Additionally, selection of the number of frequency coefficients, or number of bits that are encoded can be used to control a magnitude of the resulting compression. This allows compression to be performed taking into account the position of the block in the image, as well as operational parameters of the display and/or transmission system. This enables foveated compression to be performed, as well as optimising compression based on the current operation of the hardware, for example optimising the compression based on an available transmission bandwidth.

Accordingly the above described arrangement provides an efficient DCT dynamic bit encoding and indexing scheme, which is particularly suited for applications such as streaming high quality video free of banding, for example for use in digital reality applications, such as virtual reality and augmented/mixed reality applications.

Traditional DCT compression, such as JPEG compression, operates by retaining lower frequency coefficients in the frequency coefficient matrix, discarding higher frequency coefficients at a particular level, irrespective of the magnitude of those frequency coefficients. Further compression can be achieved by scaling coefficients at the expense of a reduction in precision. Such approaches tend to be sub-optimal in digital reality applications, in which images are dynamic with much varying content. In particular, such compression approaches tend to result in banding issues.

Accordingly, the above described approach avoids this by seeking to maintain the precision of the DCT coefficients specifically by retaining larger values in the DCT matrix, which play a more important role in the quality of the final image and optionally seeks to provide further improvements by minimising the loss of precision caused by colour space conversion (for example from RGB to YCbCr and back to RGB).

In this regard, as it is not possible to know in advance the location of the larger magnitude coefficients, the largest magnitude coefficients are identified, with an index being generated to identify the location of these coefficients in the matrix. The index can be transferred as part of the compressed image data, and used to reconstruct the matrix during decompression, avoiding the loss of larger magnitude components. This is in contrast to traditional approaches that have focused on retaining lower frequency coefficients and discarding higher frequency coefficients, which can in turn result in loss of higher magnitude frequency coefficients.

Particularly in the context of banding, the above described approach avoids the loss of higher magnitude coefficients, reducing the banding effects, with further improvements being achieved by avoiding the loss of precision from a colour conversion step. Whilst avoiding a colour conversion step is optional it is presented for completeness, and generally its inclusion will depend on the particular implementation and whether colour conversion is mandatory or not. For example, many image processing systems have an RGB↔YCbCr conversion process so the colour conversion step may be required. Additionally the conversion to alternate colour spaces can aid in compression, allowing chrominance channels to be compressed more than the luminance channel, so if further compression is required, that can be beneficial. However, converting to the alternate colour space can result in a loss in precision depending on the representation of the converted pixels (eg: if converted 8 bit to 8 bit integers) and can result in some visible banding for the user and so colour space conversion is typically not preferred.

In order to retain the larger magnitude frequency coefficients, the system adopts a prioritisation and indexing framework where the most important coefficients are sent through first followed by less and less important coefficients, with the number of coefficients transmitted being controlled based on factors, such as the required degree of compression, available bandwidth, or the like. This approach therefore allows the number of bits per pixel array to be increased or decreased depending on the application and the result is the most important values being sent through for the least number of bits. This has important benefits for different application examples described in this document.

The approach typically involves starting with highest bit valued numbers (for example 8 bit numbers), searching for these values in the coefficient matrix starting from level 1 through the entire table, typically following a zig zag pattern. For each frequency coefficient the number is encoded and indexing bits created to denote the location of the frequency coefficient. As part of this process, as each identified frequency component has a defined number of bits, a significant bit can be removed to save bits, for example encoding 8 bit numbers as 7 bits including the sign. After all highest bit numbers are encoded, this process can be repeated for lower bit value numbers in turn, ie: 7, 6, 5, 4, 3, 2, encoding all numbers in the table without losing any precision.

The below lists pseudo code for one possible implementation.

Loop (Repeat for each bit numbers 8 down to 2 bit); 7 loops: N=8 down to 2
  a. Find numbers+/−<($2^N$) and >=($2^{(N-1)}$) (find all N bit numbers in DCT matrix) in coefficients 2-64 (all levels)
    i. For this perform a comparison on the vector and set a resulting vector to 0 or 1 depending on whether the value exists or not (Valid table vector)
    ii. As above the AC coefficients are +/− so checks are performed without the sign bit and then include that bit in the representation
    iii. May be useful to store signed bit as a separate vector
  b. Get number of values (represented as M−1) [6 bits]
    i. If no values found append [0] (1 bit) to output and move to next loop iteration
  c. Generate an index (0-63) [6 bits] define position in vector according to following order of coefficients:
    i. Perform zig-zag traversal to list the coefficients in vector form thereby creating a table used for lookup that can support indexing of all signed numbers
    ii. Take the vector and starting at the SECOND value (first AC coefficient) and create a 63 value long number (int 16 type)
  d. Data:
    i. Store data as (VALUE−1) [size N−2 bits]
    ii. Note: data is removed from top ($1^{st}$) bit as it always has the top bit set
    iii. Note: for 2 bit numbers there is no data bit sent, only the sign bit which can then create+/−1 value on the decode side
  e. Packetize data
    i. [1 (data found)] [num values−1 (6 bits)] [first index (6 bits)] [first sign bit (1 bit)] [first data (N−2 bits—6, 5, 4, 3, 2, 1 bits)] . . . [last valid index (6 bits)] [last sign bit (1 bit)][last data (N−2 bits—6, 5, 4, 3, 2, 1)]
  f. Repeat for number bit values 8 down to 2

After encoding the most significant frequency components can be transmitted, whilst varying numbers of less significant frequency components can be discarded to obtain a significant degree of compression. It will be appreciated that this allows the number of frequency components transmitted to be adjusted depending on the compression ratio to be achieved.

It will also be appreciated that a variety of methods can be used for the above and for subsequent packetization of the bits being sent through the communications medium.

In particular, the above allows for either fixed or dynamic bit encoding schemes to be implemented. The fixed case uses pre-defined rules to provide an output of the number of bits to send per pixel array, with bits outside this range being discarded. An example of this involves retaining a fixed number of bits per pixel array based on the distance of the pixel array away from a user's eye position. This can be used to provide foveated compression.

In contrast dynamic encoding uses information about the bit encoding process, with each pixel array being represented by how many bits are needed to fully represent the pixel array, for example depending on the complexity of the pixel array content. In this instance, each pixel array can be dynamically encoded so that more complex pixel arrays are given more bit allocation than other pixel arrays.

An example of the use of a modifier array to reduce banding will now be described in more detail. For the purpose of illustration, the following example will discuss effects on a single image, although it will be appreciated that this can apply to single discrete image or images forming a frame of a motion video which is to undergo lossy compression and decompression for e.g. the purpose of transmitting the compressed video at lower data rate than the raw video. Furthermore, the example will be given with respect to blocks of 4×4 pixels for simplicity of documentation, but the method can be applied to any block size.

In the case of a typical display which represents pixels with N bits per colour component, the value of a colour component can change only in discrete steps of $\frac{1}{2}^N$ of the full range. This discrete change of value is noticeable by the human eye as a visible step or band when two areas of colour are viewed side-by-side in a single image.

In areas of an image that contain a slow colour fade over a large area, the steps between discrete pixel values result in the appearance to the eye of visual bands of colour, known as banding artefacts.

To avoid the appearance of banding artefacts, the transition from one pixel value to another is often dithered, breaking up the sharp edge of transition from one value to another. This results in an image which has reduced visible banding artefacts at the expense of increased noise, with the result being higher perceived visual quality overall.

However, lossy image compression and decompression typically results in the loss of high frequency information, meaning small differences between adjacent pixel values are lost. In block-based compression schemes where a small square region of an image is considered, small differences between pixels may be lost resulting in the entire block being decoded as having the same value for all pixels. This has the effect of undoing or averaging out the dithered noise which was added to the source image, resulting in the reappearance of banding artefacts. In addition the pixel value changes tend to be aligned to block boundaries resulting in visible block artefacts as well as banding artefacts.

To avoid such areas from being noticeable in images, the current approach uses a modified to adjust pixel values, which in turn causes some pixels in a block to be set to a slightly higher or lower value to recreate a dithering effect and break up the apparent visual boundary. In one example, this is achieved by adding pseudorandom noise to the image data while it is being decompressed, before the output pixel values are quantised to their final representation, although it will be appreciated that any suitable modification could be used.

The modifier array is typically a fixed pattern across the image, which is different for different blocks, but the same across the image for each frame of video. In practice, this can be implemented using a Linear Feedback Shift Register, initialised with the screen coordinates of the block being decoded. The output of this shift register may be used to look up values in a ROM to adjust the statistical distribution of the pseudorandom values added to the pixels being decoded.

Figures 7A, 7B, 7C, 8A, 8B, 8C, 8D, 8E:
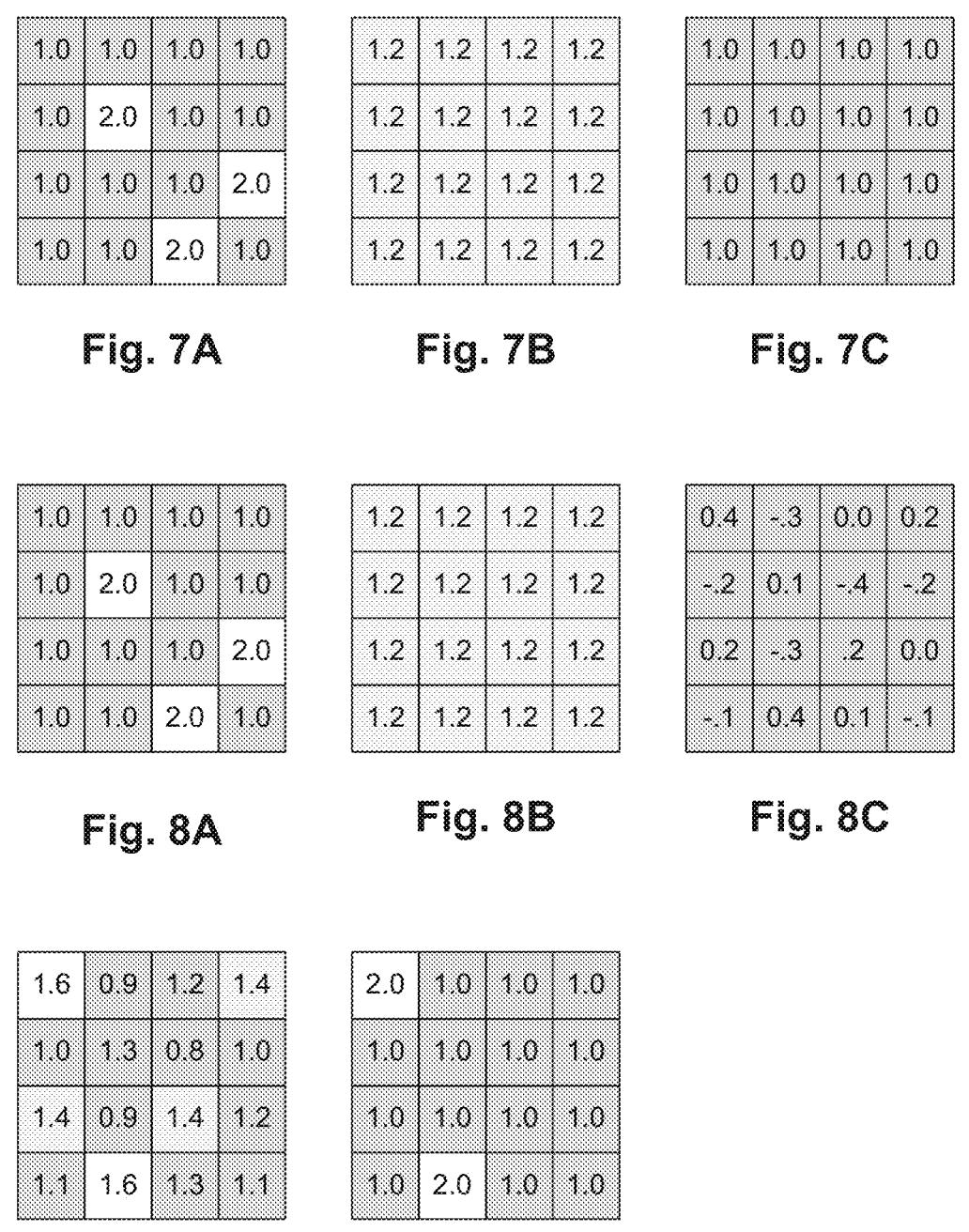

FIGS. 7A to 7C illustrates the normal effect of lossy compression upon pixel values in a block. The source block shown in FIG. 7A has mostly pixels of value 1, with a few of value 2. During lossy compression, information about the location of the value 2 pixels is lost, with an average value being retained for all pixels, as shown in FIG. 7B. In the final stage the pixel values must be rounded (quantized) to a whole value resulting in final block shown in FIG. 7C in which all pixels have the same value.

In contrast, in the current approach, the pixel values are modified using a modifier array, shown in FIG. 8C during decompression. To achieve this, the original pixel array of FIG. 8A is compressed as before, as shown in FIG. 8B. The resulting array is then combined with the modifier array of FIG. 8C, to create a modified pixel array, shown in FIG. 8D, with some pixel values increased and others decreased. After quantisation is performed, the final pixel array contains some pixel values that are different to other pixels in the array.

The effect of this on a boundary is shown in FIGS. 9A to 9D.

Figures 9A, 9B, 9C, 9D:
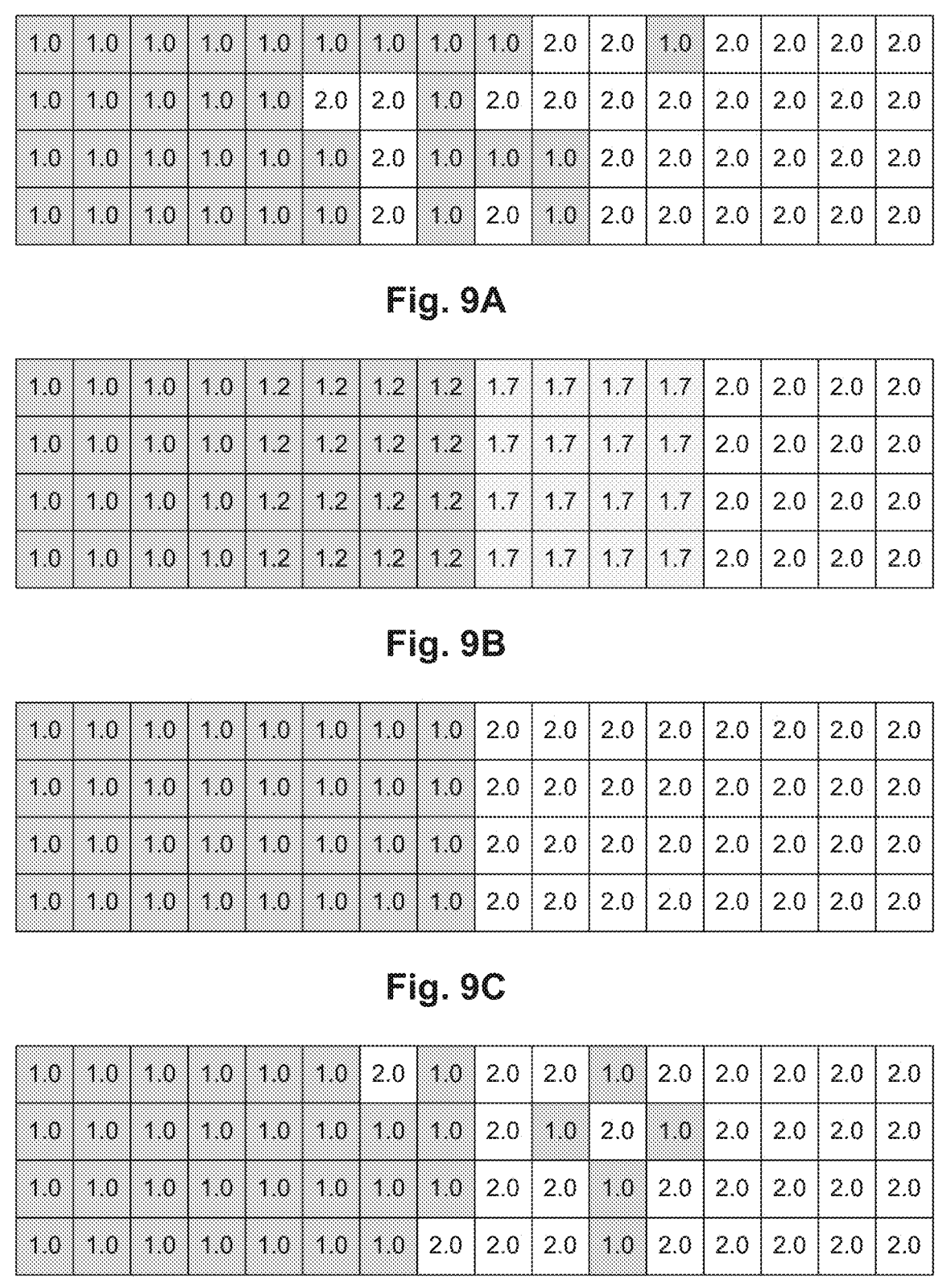

Specifically, in this example, a sequence of four pixel arrays spanning a boundary are shown in FIG. 9A. These are averaged during compression, resulting in the compressed arrays shown in FIG. 9B. Performing a traditional decompression approach, these are quantised, resulting in a stark boundary as shown in FIG. 9C. In contrast, applying the above described modification approach operates to break-up the boundary, as shown in FIG. 9D.

Accordingly, this approach can be used in conjunction with, or independently of the approach described previously, in order to mitigate banding resulting from image compression.

Figure 10A:
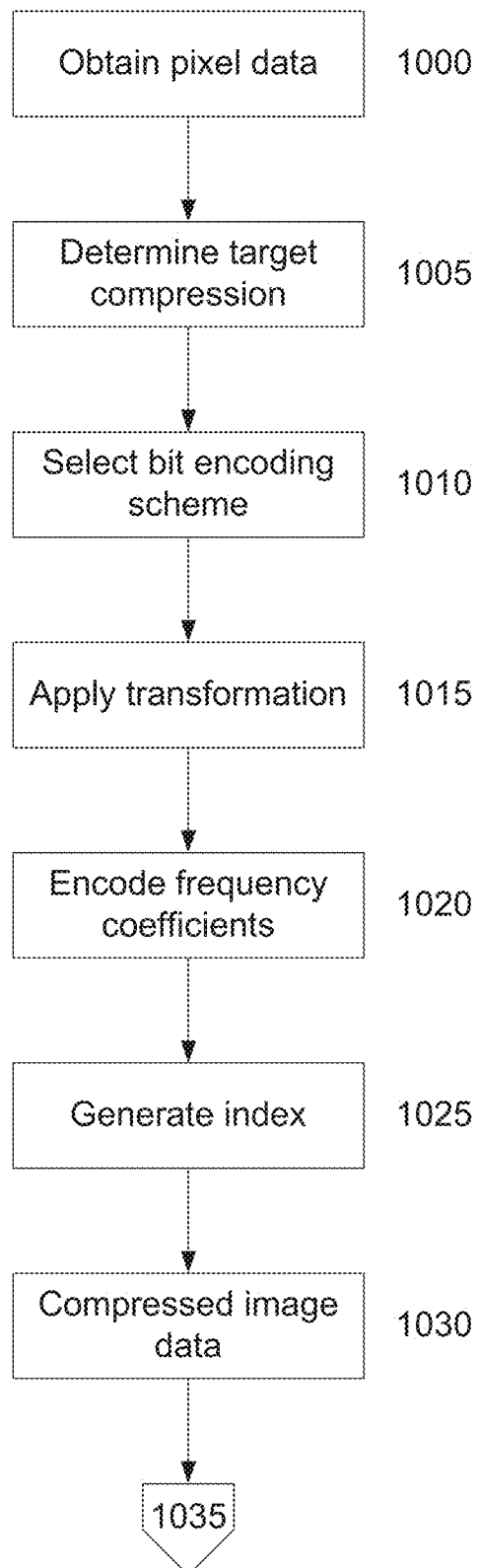
FIGS. 10A and 10B are a flowchart of a further example of a method for compressing and subsequently decompressing image data.
Figure 10B:
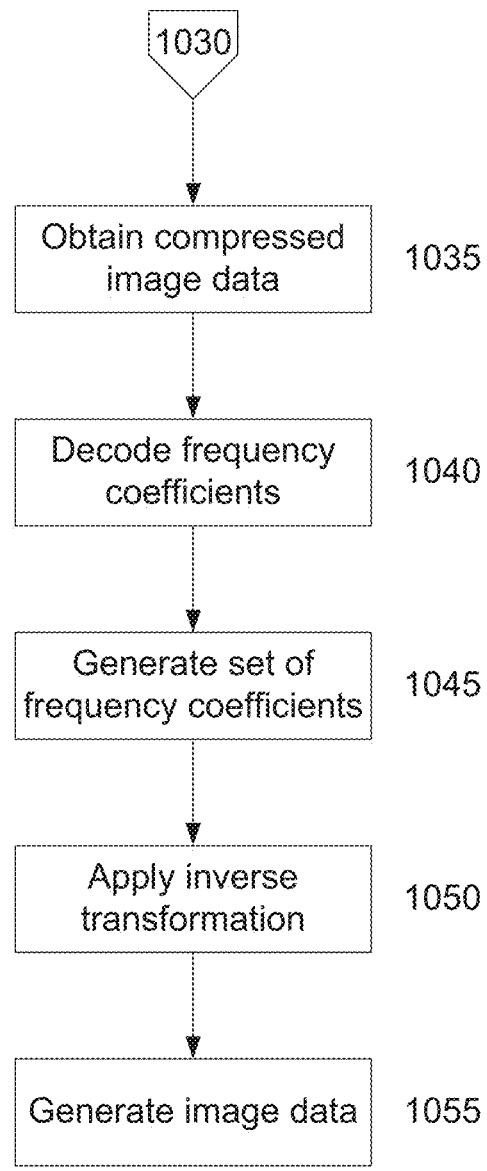
Figure 11A:
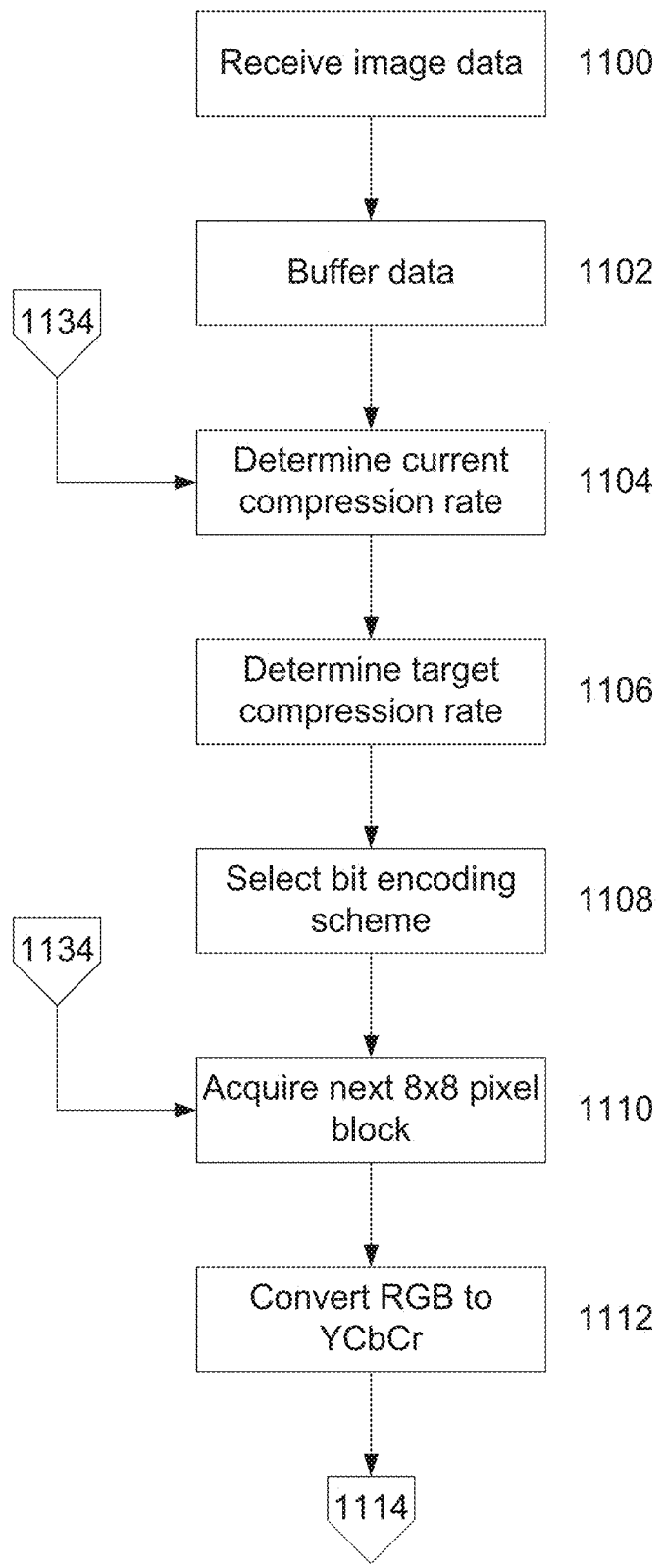
FIGS. 11A to 11D are a flowchart of a further specific example of a method for compressing and subsequently decompressing image data.
Figure 11B:
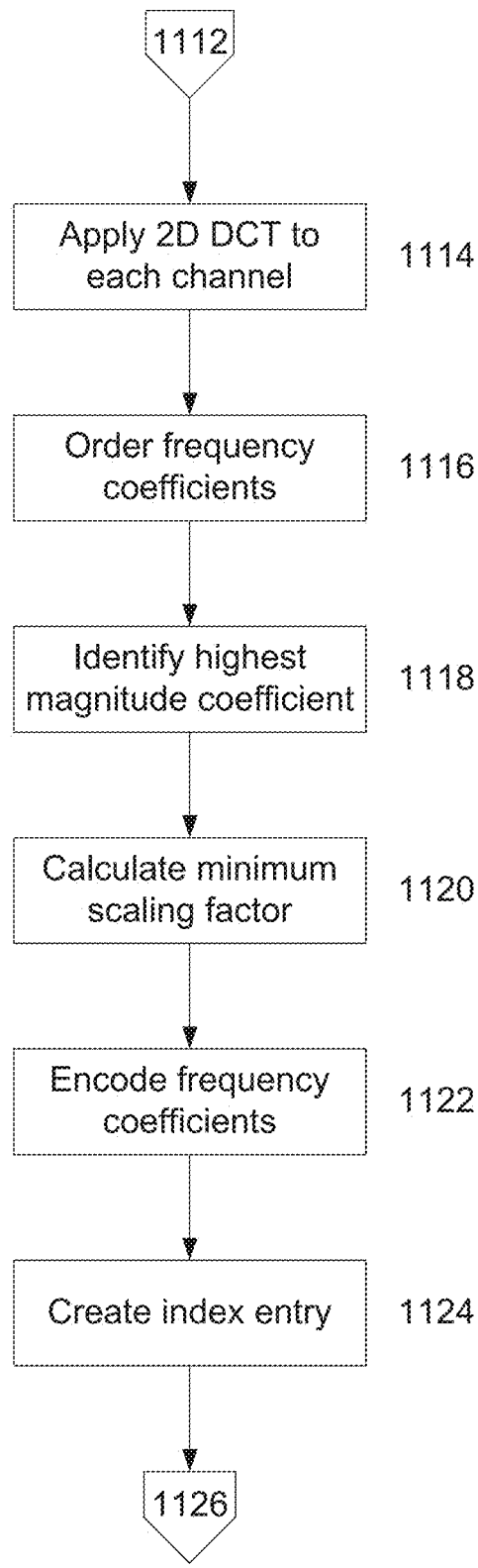
Figure 11C:
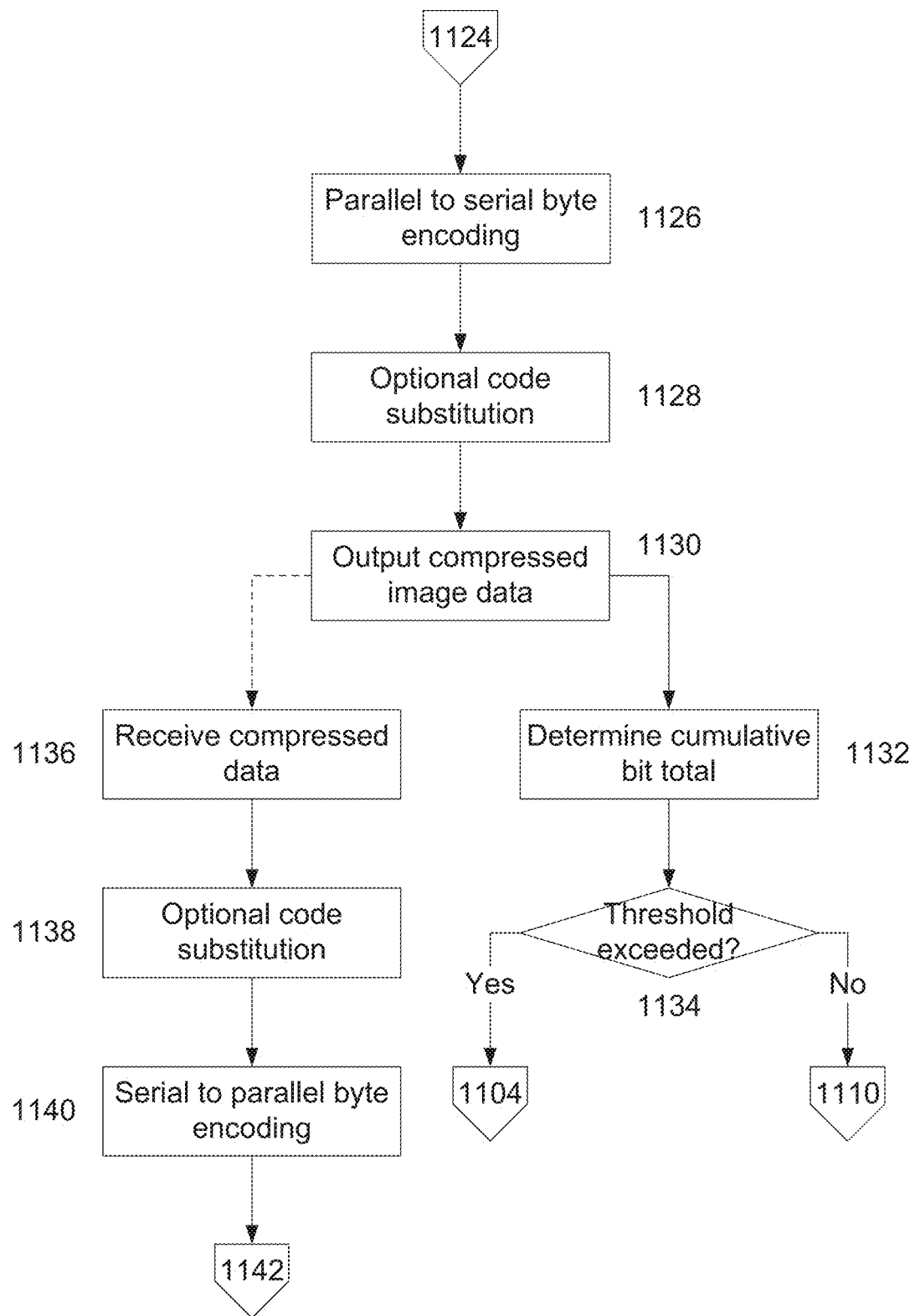
Figure 11D:
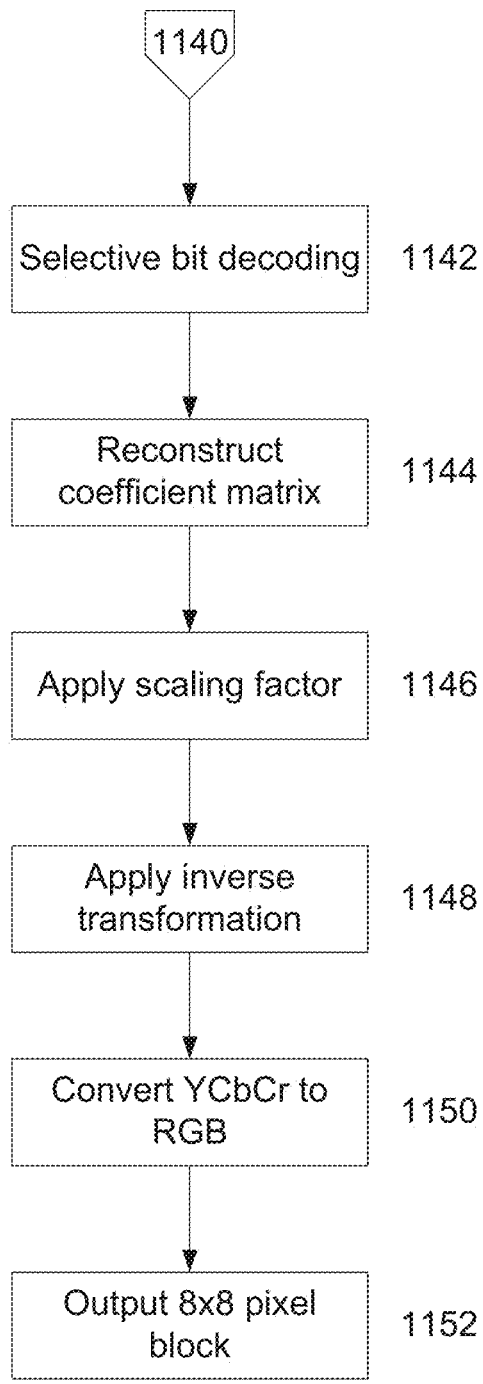

As previously described, in one example, the above described technique can be performed in conjunction with scaling of frequency coefficients, with this preferably being performed so that a degree of compression is adjusted dynamically for each pixel block. An example of this will now be described in more detail with reference to FIGS. 10A and 10B.

In this example, at step 1000, pixel data is obtained from image data, with the pixel data typically representing a pixel array within the one or more images. The pixel data can be obtained in any appropriate manner, as described above for example with respect to step 100.

At step 1005 a target degree of compression is determined. This is indicative of a degree of compression required and can be used together with information regarding compression of previous pixel blocks to select a bit encoding scheme at step 1010, which can then be used to encode one or more pixel blocks, as will be described in more detail below.

At step 1015 a transformation is applied to the pixel array to determine a set of frequency coefficients indicative of frequency components of the pixel array. This typically is achieved by performing a 2D DCT as previously described for example with respect to step 110.

At step 1020 frequency coefficients are encoded. The frequency coefficients can be encoded so that a subset of a frequency coefficients are selected so as to maximise the effectiveness of the frequency information that is encoded, typically by selecting frequency coefficients having the highest magnitude. Additionally, and/or alternatively, encoding can be performed by scaling the frequency coefficients. In this regard, typically a number of the bit encoding schemes operate by performing both scaling and selective encoding of frequency coefficients. However, it will also be appreciated that depending on the degree of compression required, in some examples, the bit encoding schemes may only perform scaling of frequency coefficients, or may only perform encoding of selected frequency coefficients, depending on the preferred implementation.

At step 1025, an index is generated which is at least partially indicative of the selected bit encoding scheme, and optionally the scaling factor, and/or frequency coefficients which have been selected and encoded. In this regard, it will be appreciated that the index can be generated in manner similar to that previously outlined.

At step 1030 compressed image data is generated with this then being provided as required, for example by transmitting the compressed image data to a decoding system, which receives the compressed image data at step 1035, and operates to decode frequency coefficients at step 1040.

To achieve this, the decoder will determine the index from the compressed image data and use this to identify the bit encoding scheme that was used during compression. This then allows the decoder to generate a set of frequency coefficients, and optionally apply a scaling factor to descale the frequency coefficients if required at step 1045. Following this an inverse 2D DCT transformation can be applied at step 1050 with this being used to generate image data at step 1055.

It will therefore be appreciated that the above described arrangement provides a mechanism in order to dynamically compress individual pixel arrays based on a target degree of compression array target, so that pixel blocks can be differentially encoded based on one of a number of bit encoding schemes, which allow one or more of frequency coefficient scaling, or selective frequency coefficient encoding to be performed, so as to maintain an overall target compression, whilst optimising resulting image quality.

A number of further features will now be described.

The bit encoding scheme can be selected in any one of a number of manners and typically this takes into account a cumulative bit total for a number of previous pixel arrays. In one particular example, this takes into account a cumulative bit total and a target degree of a compression or target bit rate for the image. Thus in this instance, a total number of bits for a set number of previous pixel arrays, such as 10, 50, 500, 1000, 5000, 10000, or the like, can be calculated, with compression for the current pixel array then being tailored to ensure an overall bit rate is maintained.

The target degree of compression can also be adjusted based on other factors such as a position of the pixel array within one or more images, display data received from a display device, communications link data indicative of operation of a wireless communications link, configuration data indicative of a configuration of a display device or content data indicative of the digital reality content associated with the one or more images, in a manner similar to that previously described.

It will be appreciated from this that this allows the degree of compression for individual and/or groups of pixel arrays to be adjusted depending both on an overall target bit rate, as well as of factors such as the location of the pixel array within the image, available communications bandwidth, or the like, ensuring sufficient overall compression is achieved by optimising the compression used on each pixel array.

In one particular example, a cumulative bit total is determined for a number of previous pixel arrays, if the cumulative bit total exceeds a cumulative bit total threshold, a degree of compression is determined for the number of previous pixel arrays, with the bit encoding scheme being selected using the degree of compression and the target degree of compression, although it will be appreciated that other approaches could be used.

Whilst the above described process can be performed solely by encoding the subset of frequency coefficients as previously described, additionally, and/or alternatively, this can be achieved by scaling frequency coefficients with a scaling factor. In one preferred example, both approaches are used in combination with frequency coefficients being scaled and then a selected subset of the scaled frequency coefficients being encoded, depending on the magnitude of the scaled coefficients.

In one particular example this approach involves identifying a highest magnitude frequency coefficient, calculating a minimum scaling factor required to reduce the highest magnitude frequency coefficient to a target number of bits and then scaling the frequency coefficients using either the minimum scaling factor, or a larger scaling factor. This can be used for example to ensure all frequency coefficients are reduced to a magnitude of seven bits or smaller, with the highest magnitude coefficients being selected to form the compressed image data, although it will be appreciated that the first coefficient in the coefficient matrix, which is typically referred to as the DC coefficient, can be excluded from this process, allowing the DC coefficient to be transmitted unscaled, for example as an eight, nine, ten or eleven bit number, depending on the preferred implementation. Retaining the DC component unscaled can significantly improve resulting image quality, for example by reducing the impact of banding.

In one particular example, the above process is achieved by selecting one of a number of bit encoding schemes with each bit encoding scheme defining available scaling factors and one or more bit thresholds. In this example, frequency coefficients are then scaled using one of the available scaling factors that is at least the minimum scaling factor, and then encoding the scaled frequency coefficients in accordance with the bit threshold, for example by only encoding frequency coefficients having more bits than the bit threshold and/or discarding scale frequency coefficients having less bits than the bit threshold.

Thus, it will be appreciated that in this example, the bit encoding schemes define a combination of a bit thresholds and scaling factors which can be used to achieve a different degree of compression. The bit encoding scheme used for any individual pixel array can then be selected based on the array target, which in turn depends on a cumulative bit total for a number of previous pixel arrays.

In one example, each bit encoding scheme defines a respective bit threshold for different colour channels, and in particular for luminance and chrominance channels. In general this includes a higher bit threshold for chrominance channels than the luminance channel so that more frequency coefficients are discarded for chrominance channels than the luminance channel. This helps preserve information within the image that is perceived by individuals viewing the image, thereby maintaining image quality. Additionally, as previously described, when converting colour channels and generating the frequency coefficients, the coefficients are generally processed using a higher level of precision, for example using 10 bits to encode an 8 bit coefficient, so that rounding inaccuracies are avoided.

Accordingly, in one example, the method includes applying a transformation to the pixel data, calculating the minimum scaling factor, selecting a bit encoding scheme, scaling the frequency coefficients and then encoding the subset of scaled frequency coefficients in accordance with the bit threshold for the respective colour channel.

In one preferred example, the approach involves selecting a bit encoding scheme from an ordered list bit encoding schemes, with the list being ordered to provide progressively increasing compression. This allows a initial bit encoding scheme selection to be made based on the required degree of compression, with the scheme selected being altered for different groups of blocks, depending on the compression required to meet the array target.

The progressive increase in compression is typically achieved by increasing the magnitude of the available scaling factors, reducing a lowest available scaling factor and progressively increasing bit thresholds. The scaling factors than can be used can be any one or more of one, two, four or eight, although it would be appreciated other factors could be selected as appropriate. Similarly the bit thresholds could be any one or more of one, two, three, four, five or six, although again other thresholds could be used depending on the particular implementation.

It will be appreciated that the above described technique can be performed utilising features and hardware similar to that described above with respective to FIGS. 1A to 10, and these features will not therefore be described in any further detail.

A more specific example of the coding approach will now be described with reference to FIGS. 11A to 11D and FIGS. 12A to 12E.

In this example, at step 1100 image data is received with this being buffered at step 1102 before a next 8×8 pixel block (array) is acquired at step 1110. It will be appreciated that these steps are substantially similar to those performed at steps 400 to 404 in the example of FIGS. 4A to 4D and these will not therefore be described in any further detail.

Prior to acquiring the pixel array, at step 1104 a current degree of compression for a number of previous pixel arrays is optionally determined, with this being performed for example after a set number of pixel arrays have been encoded, or when a cumulative bit total, which is a total number of bits used to encode a number of previous pixel blocks, reaches a threshold, as will be described in more detail below.

At step 1106 a target degree of compression is determined, which represents an average compression ratio that should be maintained for compression of the current image, or current part of an image. The target bit rate can be set based on a variety of factors, but most typically is set based on transmission capabilities of a wireless communications link between the encoder and decoder and in particular based on an available bandwidth, latency and/or required quality of service, but could also be based on a position of the current pixel array in the image, for example to compress peripheral parts of an image more than a central focal part of the image.

At step 1108, a bit encoding scheme is selected. In particular, the next bit encoding scheme is selected from an ordered list, with the scheme being selected to provide more or less compression than a previously selected scheme, based on whether the current degree of compression is above or below the target degree of compression. In this regard, the bit encoding scheme list typically includes a list of bit encoding schemes providing progressively higher compression such that schemes towards a top of the list have minimal scaling factor, whilst scaling factors increase for schemes later in the list. Accordingly, a next scheme can be selected by moving up or down the list as required.

An example of such a list is set out in Table 2 below. In this instance, assuming bit encoding scheme 8 or higher is selected, then a scaling parameter of 4 or 8 would be used in order to allow a desired scaling to be achieved.

TABLE 2

| Encoding Scheme | Bit Threshold | Scaling Factors |
|---|---|---|
| 1 | 0 | 1, 2, 4, 8 |
| 2 | 1 | 1, 2, 4, 8 |
| 3 | 2 | 1, 2, 4, 8 |
| 4 | 0 | 2, 4, 8 |
| 5 | 1 | 2, 4, 8 |
| 7 | 2 | 2, 4, 8 |
| 8 | 0 | 4, 8 |
| 9 | 1 | 4, 8 |

Once the bit encoding scheme is selected and the pixel array acquired, at step 1112 the RGB channels are converted to luminance and chrominance channels, with a 2D DCT being applied to each channel at step 1114, in a manner similar to that previously described with respect to steps 410 and 412.

At step 1116 frequency coefficients within each coefficient matrix are ordered with this being used to identify a highest magnitude frequency coefficient at step 1118. A minimum scaling parameter is then determined at step 1120 by calculating the scaling factor required in order to reduce the magnitude of the highest magnitude coefficient to below a set number. In particular, in one preferred example this is achieved to reduce the magnitude of the highest magnitude coefficient to below 127 so that this can be encoded using seven bits. It will be appreciated however that alternative numbers as 63 or lower could be used depending upon the preferred implementation.

At step 1122 the frequency coefficients are encoded, by first scaling the frequency coefficients and then selecting the scaled frequency coefficients for encoding, with this being used to create an index entry at step 1124. In steps 1126 to 1130, parallel to serial byte encoding and optional code substitution can be performed, allowing compressed image data to be output, in a manner similar to that described above with respect to steps 428 to 432.

At step 1132, a cumulative bit total for a number of previous pixel arrays is determined, with this being used to assess whether a cumulative bit total threshold has been exceeded at step 1134. If not, the process returns to step 1110 to acquire a next pixel array. Otherwise the process returns to step 1104, to determine the compression rate and select a bit encoding scheme as described above. Thus, it will be appreciated from this that a new bit encoding scheme is selected after a certain number of compressed bits have been created. At this point, the cumulative compression ratio of those blocks is reviewed and the bit encoding re-selected allowing this to be changed if required.

It will be appreciated that this allows a number of blocks to be encoded, with the bit encoding scheme being dynamically updated based on the total amount of compressed image data generated. Thus, for areas of the image where less compression is achieved, the bit encoding scheme may switch more rapidly, to help ensure that the scheme selected is optimised. In general, the cumulative bit total threshold is selected so that the bit encoding scheme changes several times within the size of a wireless packet, to control the bit rate that will be sent through the wireless system and ensure there are no peaks or great variations of compression ratios.

However, alternatively the bit encoding scheme could be reselected after a set number of blocks have been processed. This could include single blocks, although the system would typically be less stable and so typically a greater number of blocks would be used.

At step 1136 compressed image data is received by the decoder, with optional code substitution and serial to parallel byte encoding being performed at steps 1138 and 1140, in a manner similar to that described above with respect to steps 434 to 438.

At steps 1142 and 1144, selective bit decoding and reconstruction of the coefficient matrix is performed in manner similar to that described above with respect to steps 440 and 442, before the reconstructed frequency components are scaled using the scaling factor at step 1146.

Following this, an inverse transform can be applied to the frequency coefficients at step 1148, with the chrominance and luminance channels being converted to RGB channels at step 1150, and an 8×8 pixel block being output at step 1152, in a manner similar to that described above with respect to steps 444 to 448.

Example results of this approach are shown in FIGS. 12A to 12H.

Figure 12A:
FIG. 12A is an example of a compressed image.

In particular, FIG. 12A shows an example image including two image regions 1201, 1202, in the form of bands extending across the image.

Figure 12B:
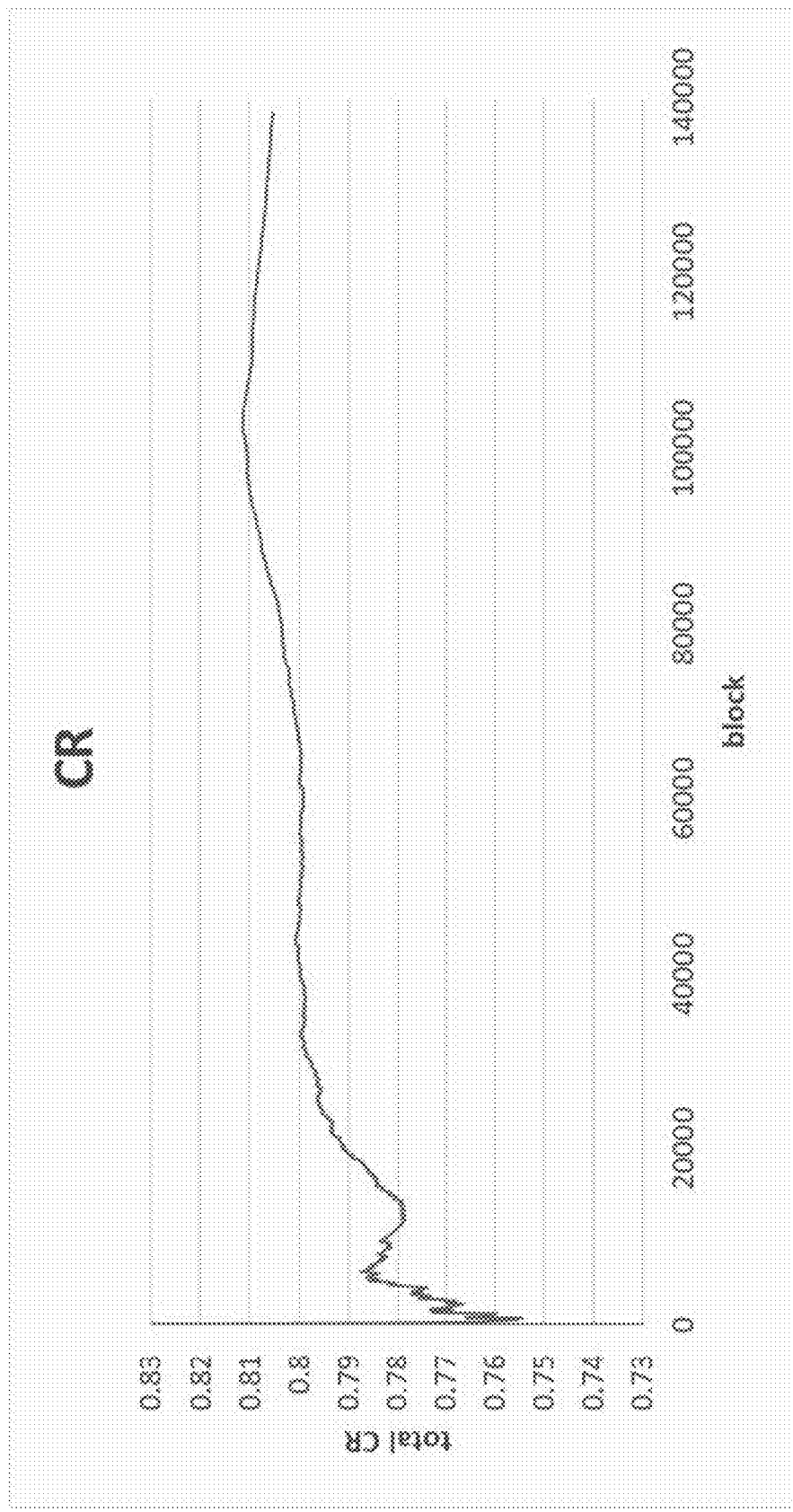
FIG. 12B is a graph illustrating an overall compression rate for compression of the image of FIG. 12A.
Figure 12C:
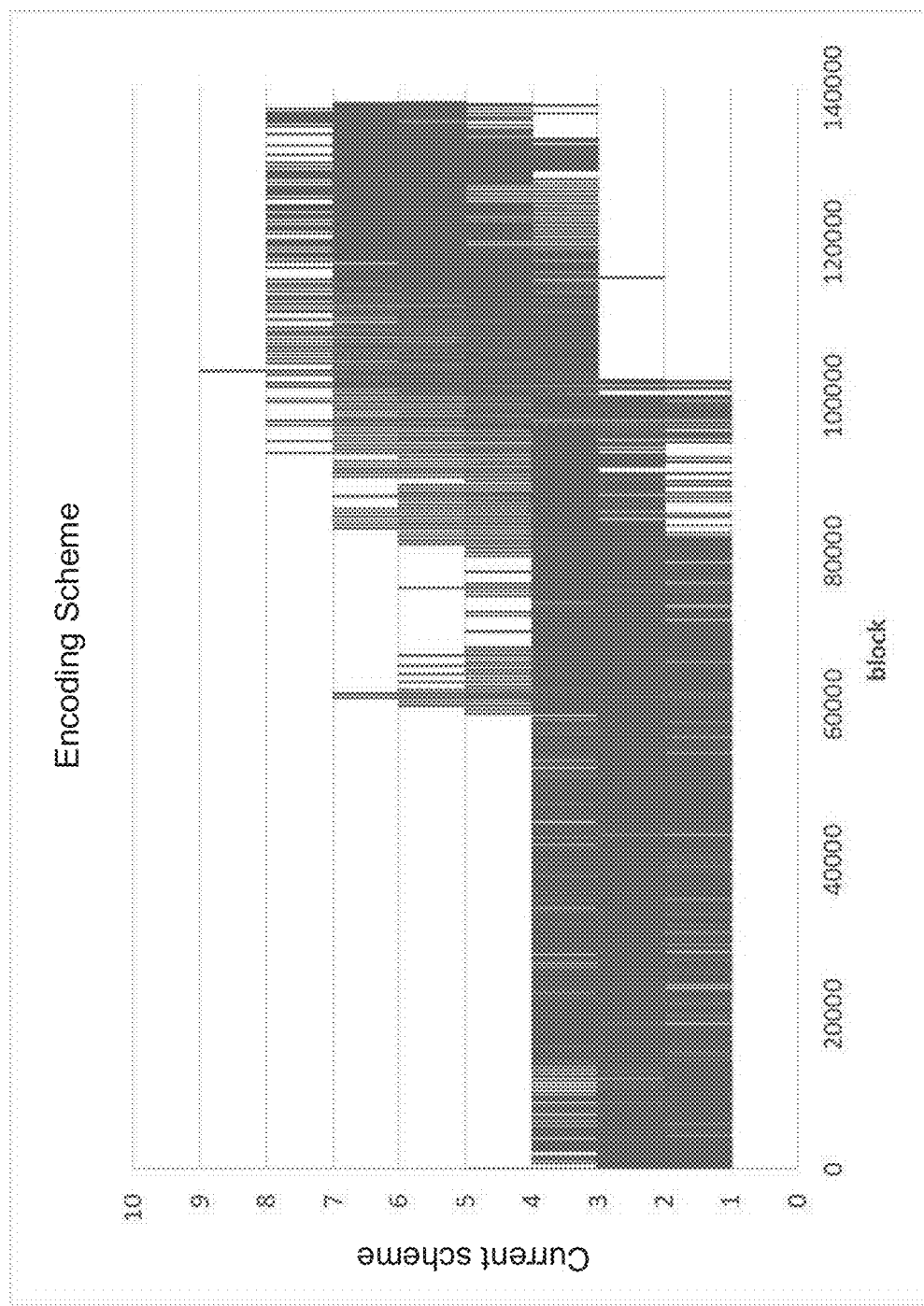
FIGS. 12C and 12D are graphs illustrating a selected bit encoding scheme and corresponding compression rate for compression of pixel blocks of the image of FIG. 12A.
Figure 12D:
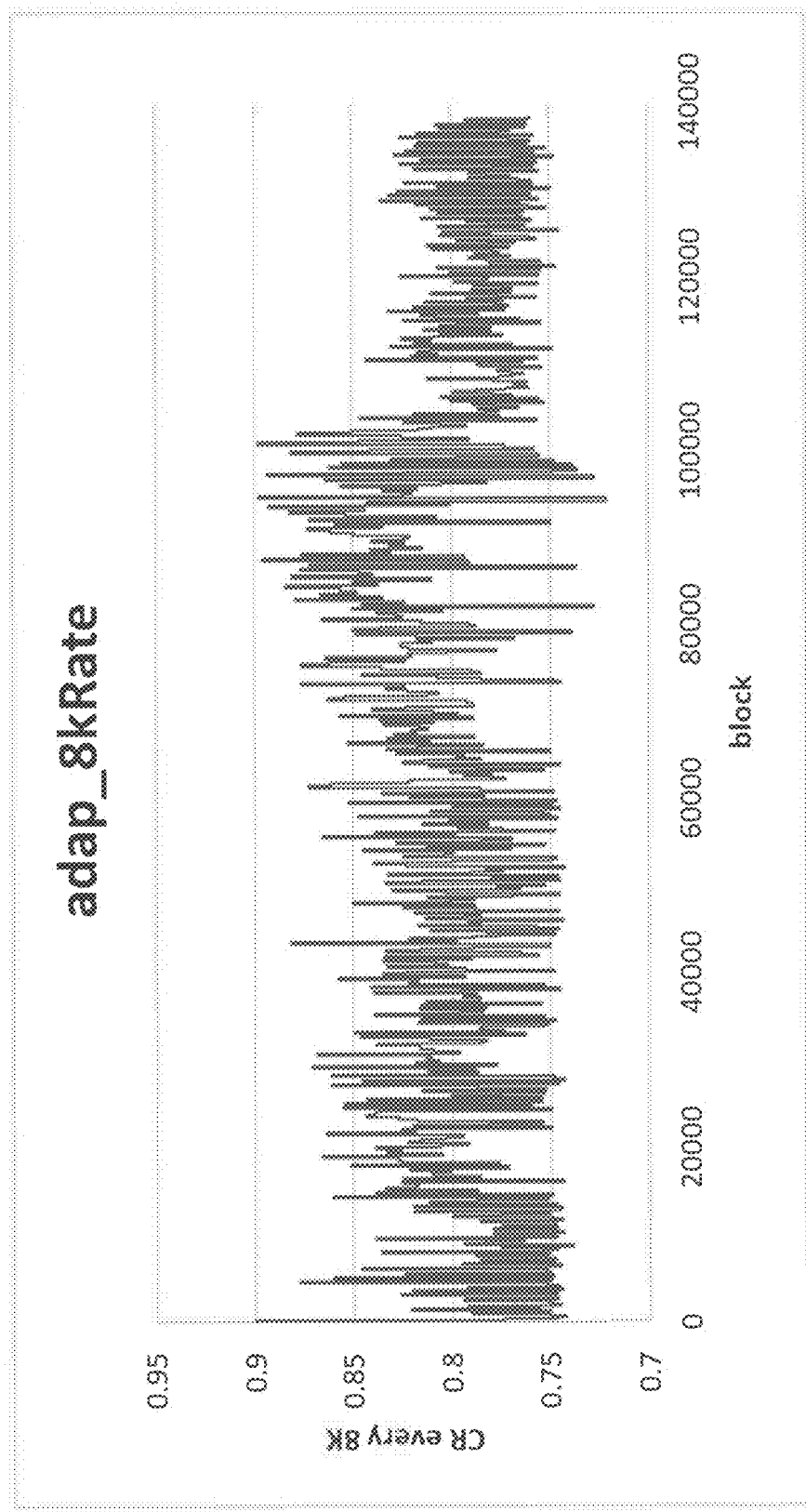
Figure 12E:
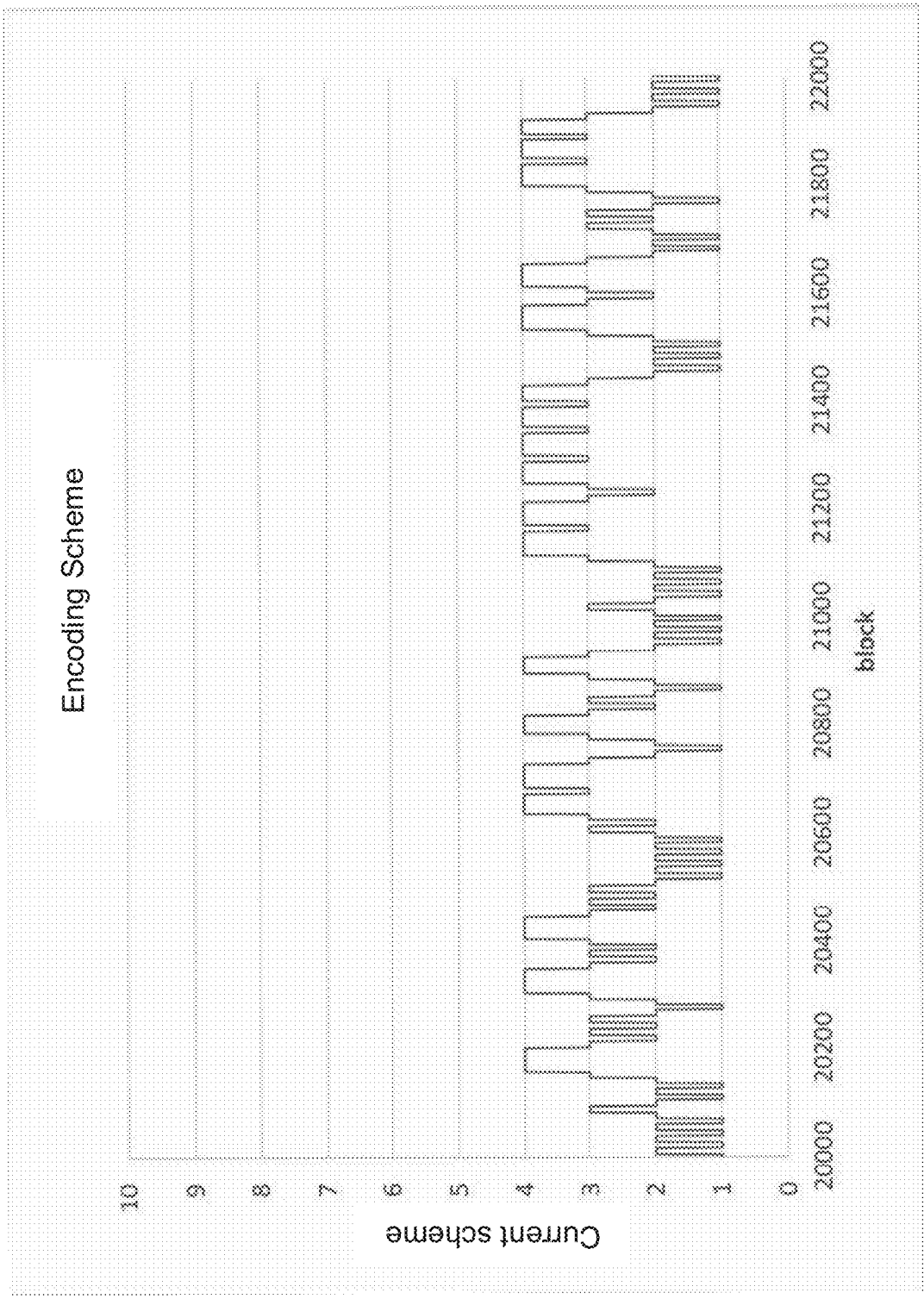
FIGS. 12E and 12F are graphs illustrating a selected bit encoding scheme and corresponding compression rate for compression of pixel blocks for a first portion of the image at FIG. 12A.
Figure 12F:
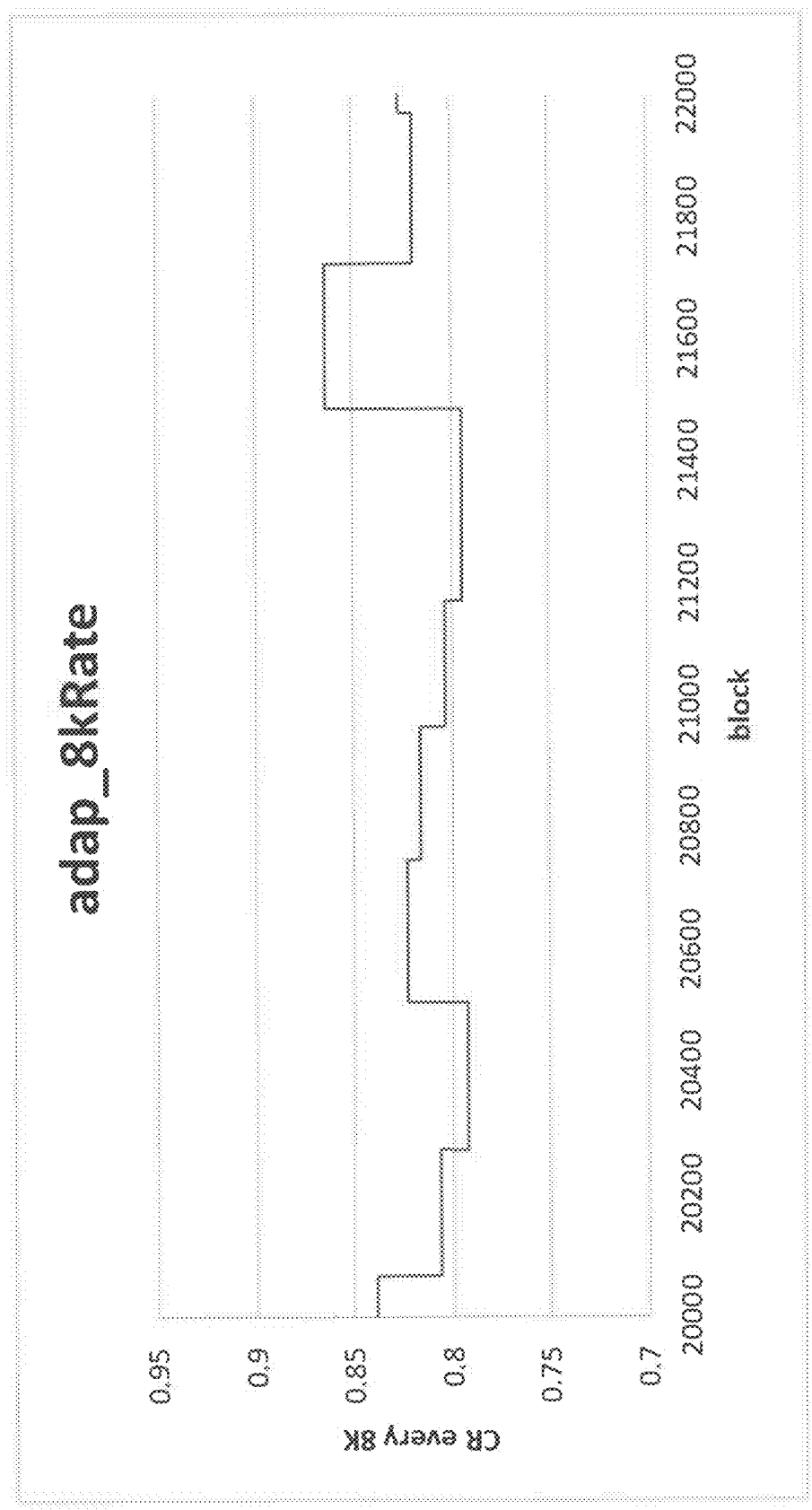
Figure 12G:
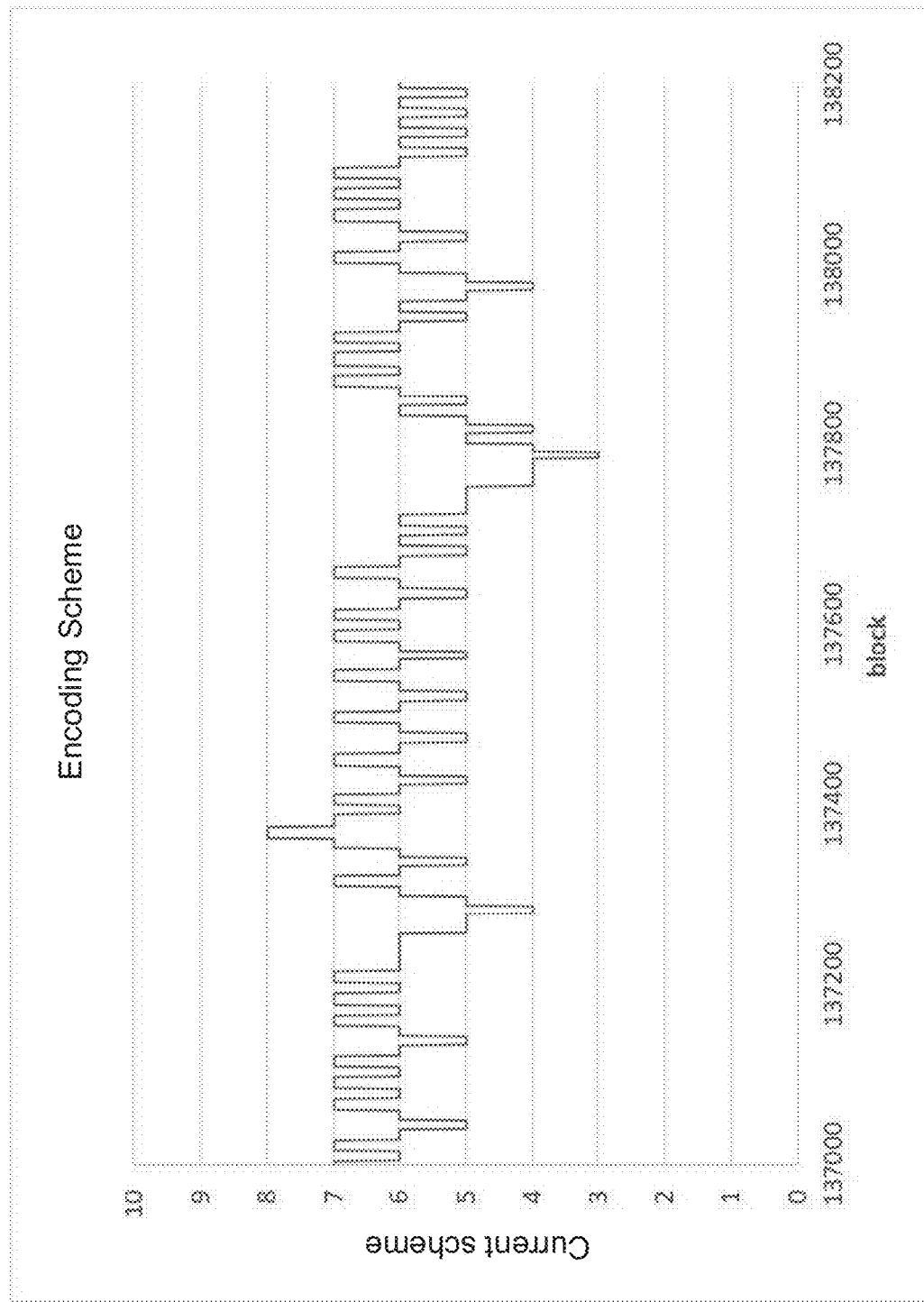
FIGS. 12G and 12H are graphs illustrating a selected bit encoding scheme and corresponding compression rate for compression of pixel blocks for a second portion of the image of FIG. 12A.
Figure 12H:
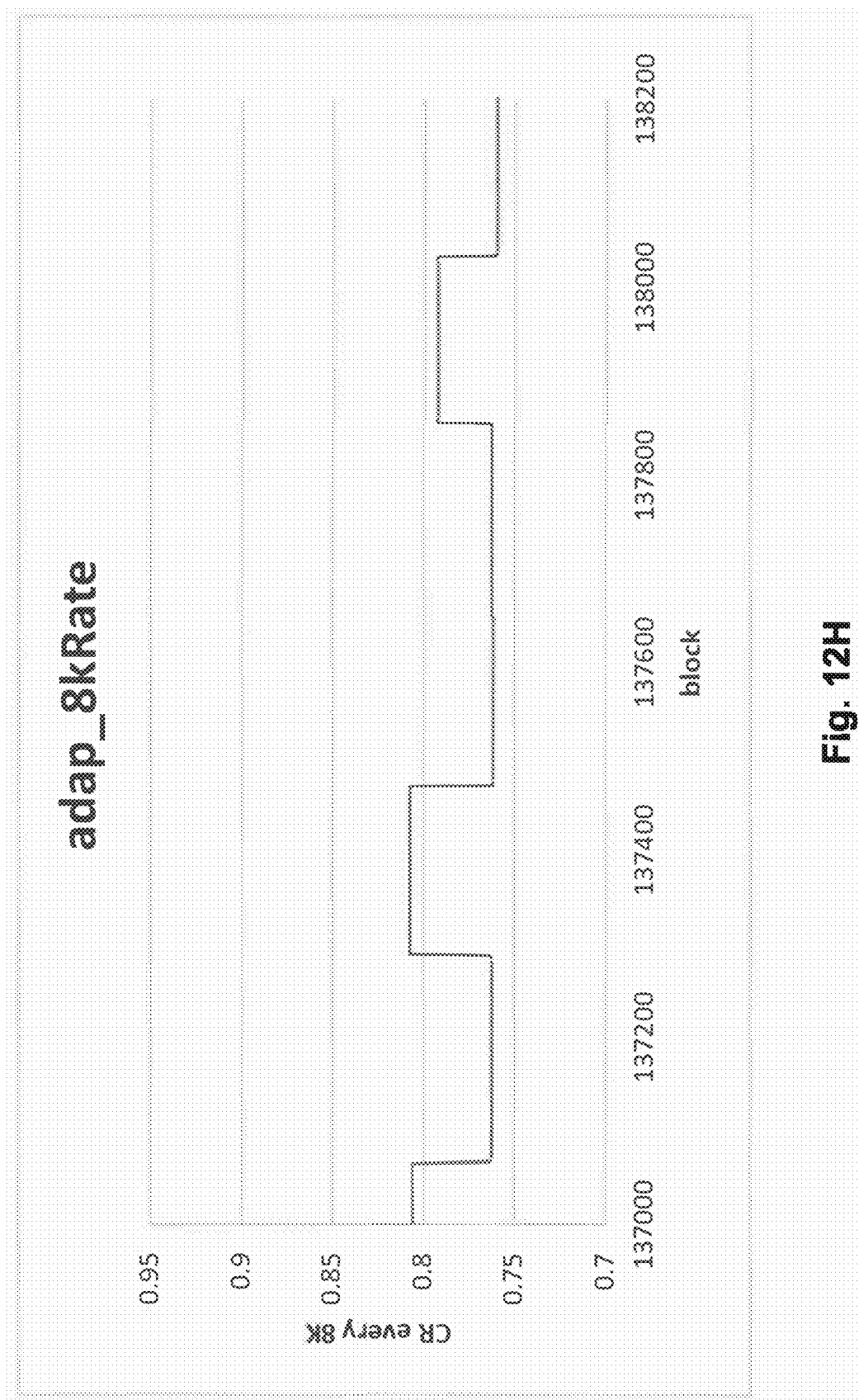

In FIG. 12B an overall compression ratio is shown as the image is progressively compressed for successive blocks throughout the entire image. In this regard, it is noticeable that initially the compression ratio is about 0.76 with the compression ratio gradually increasing and averaging out at approximately 0.805 as compression across the image progresses. Changes in the bit encoding scheme used are shown in FIG. 12C, with the resulting level of compression for each pixel block being shown in FIG. 12D.

This demonstrates shows how the bit encoding scheme changes as blocks are compressed, and highlights that bit encoding schemes 1 to 4 are preferentially used to encode the sky region of the image, whilst the compression for each pixel block remains constrained to a band of between 0.75 and 0.9.

Compression of the bands 1201, 1202 are shown in FIGS. 12E and 12F, and 12G and 12H respectively. In particular, this shows that the sky is preferentially compressed using bit encoding schemes 1 to 4 whilst the rocks are typically compressed using compression schemes 4 to 7.

In this particular example, bit encoding schemes 1 to 4 generally use less scaling, with compression being achieved by discarding frequency components if needed. The reason for this is that the sky region tends to be of a relatively constant colour and saturation meaning the frequency coefficient matrix is formed from frequency coefficients having a generally small value, but with values relatively constant across the entire matrix. Accordingly minimal scaling alone is sufficient to provide the necessary compression without requiring that frequency coefficients are omitted.

In contrast, in compressing the rock features in band 1202, there is a lot of variation in the image content, meaning there are high magnitude frequency coefficients such that scaling needs to be more aggressive.

By reducing scaling of regions where there is minimal change in colour across blocks, this significantly reduces banding artefacts that are obtained using more traditional compression techniques. Nevertheless, by dynamically adjusting the bit encoding scheme used, the system is able to maintain an overall desired degree of compression, whilst allowing different types of content to be compression in the most appropriate manner, thereby avoiding compression artefacts, and hence maintaining image quality.

Throughout all of the above examples, the first coefficient in the coefficient matrix, which is typically referred to as the DC coefficient, can be excluded from this process, allowing the DC coefficient to be transmitted as an eight, ten or twelve bit number, depending on the preferred implementation.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

It must be noted that, as used in the specification and the appended claims, the singular forms "a," "an," and "the" include plural referents unless the context clearly dictates otherwise. Thus, for example, reference to "a processing system" includes a plurality of processing systems. In this specification and in the claims that follow, reference will be made to a number of terms that shall be defined to have the following meanings unless a contrary intention is apparent.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method of compressing image data representing one or more images, the method including:
   a) obtaining pixel data from the image data, the pixel data representing a pixel array within the one or more images;
   b) selecting a bit encoding scheme, wherein each bit encoding scheme defines (i) available scaling factors and (ii) a bit threshold;
   c) applying a transformation to the pixel data to determine a set of frequency coefficients indicative of frequency coefficients of the pixel array;
   d) scaling the set of frequency coefficients using an available scaling factor that is at least a minimum scaling factor;
   e) encoding a selected subset of the set of frequency coefficients in accordance with the bit encoding scheme and the bit threshold, the subset being selected to preferentially encode frequency coefficients having a higher magnitude wherein the bit encoding scheme encodes the frequency coefficients by at least one of (i) encoding frequency coefficients having more bits than the bit threshold and (ii) discarding frequency coefficients having less bits than the bit threshold;
   f) generating an index indicative of the encoded frequency coefficients, wherein the index is indicative of the selected bit encoding scheme; and,
   g) generating compressed image data using the encoded frequency coefficients and the index.

2. A method according to claim 1, wherein the method includes:
   a) selecting frequency coefficients having n bits, where n is an integer initially set to a maximum number of bits; and,
   b) selecting frequency coefficients having progressively decreasing values of n bits until one or more encoding parameters are met wherein the one or more encoding parameters include at least one threshold and wherein the method includes encoding frequency coefficients until at least one of:
      i) a number of encoded frequency coefficients reaches a coefficient number threshold;
      ii) a number of bits of the encoded frequency coefficients reaches a bit threshold; and,
      iii) a total number of bits of the encoded frequency coefficients reaches a bit total threshold.

3. A method according to claim 1, wherein the method includes selecting frequency coefficients to achieve a target degree of compression and differentially compressing the image data so that different parts of the image are compressed using a different degree of compression.

4. A method according to claim 1, wherein the method includes selecting frequency coefficients based on at least one of:
   a) display data received from a display device, the display data being at least partially indicative of at least one of:
      i) operation of the display device;
      ii) use of the display device;
      iii) pose data indicative of a display device pose relative to the environment;

iv) movement data indicative of a display device movement relative to the environment;
v) input commands provided by a user;
vi) gaze data indicative of a user gaze; and,
vii) physiological data indicative of a physiological attribute of the user,
b) communications link data indicative of operation of a wireless communications link, wherein the communications link data is indicative of at least one of:
i) wireless communications link error metrics;
ii) wireless communications link quality of service;
iii) wireless communications link bandwidth; and,
iv) wireless communications link latency,
c) configuration data at least partially indicative of a configuration of a display device, wherein the configuration data is indicative of at least one of:
i) a display resolution;
ii) a display refresh rate;
iii) a display field of view; and,
iv) display lens attributes; and,
d) content data at least partially indicative of the digital reality content associated with the one or more images, wherein the content data includes at least one of:
i) pixel array content;
ii) image content;
iii) content of different parts of the image;
iv) an opacity of different parts of the image;
v) areas of interest within the image;
vi) locations of interest within the image;
vii) one or more cues associated with the image; and,
viii) one or more display objects within the image.

5. A method according to claim 1, wherein the index is indicative of:
a) a number of bits of each encoded frequency coefficient; and,
b) a location, the location being at least one of:
i) a location of each encoded frequency coefficient in a defined sequence; and,
ii) a location of each encoded frequency coefficient within the coefficient matrix.

6. A method according to claim 1, wherein the method includes at least one of:
a) generating the index by:
i) specifying a number of bits n;
ii) for each of the encoded frequency coefficients having the specified number of bits n, specifying the location of the encoded frequency coefficient; and,
iii) repeating steps a) and b) for progressively decreasing numbers of bits n; and,
b) determining an index code indicative of the index and generating the compressed image data using the index code.

7. A method according to claim 1, wherein the method includes:
a) encoding a number of pixel arrays using the selected bit encoding scheme; and,
b) selecting a next bit encoding scheme based on compression of the number of pixel arrays.

8. A method according to claim 1, wherein the method includes selecting the bit encoding scheme using at least one of:
a) a cumulative bit total for a number of previous pixel arrays;
b) a target bit rate;
c) a position of the pixel array within the one or more images;
d) display data received from a display device, the display data being at least partially indicative of at least one of:
i) operation of the display device;
ii) use of the display device; and,
e) communications link data indicative of operation of a wireless communications link;
f) configuration data at least partially indicative of a configuration of a display device;
g) content data at least partially indicative of the digital reality content associated with the one or more images.

9. A method according to claim 1, wherein the method includes:
a) determining a cumulative bit total for a number of previous pixel arrays;
b) if the cumulative bit total exceeds a cumulative bit total threshold:
i) determining a degree of compression for the number of previous pixel arrays; and,
ii) selecting the bit encoding scheme using the degree of compression and the target degree of compression.

10. A method according to claim 1, wherein the method includes:
a) identifying a highest magnitude frequency coefficient;
b) calculating a minimum scaling factor required to reduce the highest magnitude frequency coefficient to a target number of bits; and,
c) scaling the frequency coefficients using at least one of:
i) the minimum scaling factor; and,
ii) a scaling factor larger than the minimum scaling factor.

11. A method according to claim 1, wherein the method includes selecting a bit encoding scheme from an ordered list of bit encoding schemes, the list being ordered to provide progressively increasing compression and wherein the bit encoding schemes provide progressively increasing compression by at least one of:
a) progressively increasing the magnitude of the available scaling factors; and,
b) reducing a lowest available scaling factor; and,
c) progressively increasing the bit threshold.

12. A system for compressing image data representing one or more images, the system including one or more encoder processing devices that:
a) obtain pixel data from the image data, the pixel data representing an pixel array within the one or more images;
b) select a bit encoding scheme, wherein each bit encoding scheme defines (i) available scaling factors and (ii) a bit threshold;
c) apply a transformation to the pixel data to determine a set of frequency coefficients indicative of frequency coefficients of the pixel array;
d) scale the set of frequency coefficients using an available scaling factor that is at least a minimum scaling factor;
e) encode a selected subset of the set of frequency coefficients in accordance with the bit encoding scheme and the bit threshold, the subset being selected to preferentially encode frequency coefficients having a higher magnitude, wherein the bit encoding scheme encodes the frequency coefficients by at least one of (i) encoding frequency coefficients having more bits than the bit threshold and (ii) discarding frequency coefficients having less bits than the bit threshold; and, f) generate an index indicative of the encoded frequency coefficients, wherein the index is indicative of the selected bit encoding scheme; and, g) generate compressed image data using the encoded frequency coefficients and the index.

13. A system according to claim 12, wherein the system includes an encoder in wireless communication with a decoder allowing image data to be transferred between the encoder and decoder as compressed image data, wherein the decoder is at least one of coupled to and part of a wearable display device and wherein the encoder and decoder communicate to exchange at least one of:
   a) compressed image data;
   b) movement data indicative of movement of a display device;
   c) control data that is used at least in part to control the display device;
   d) input data indicative of user input commands;
   e) gaze data indicative of a point of gaze of an observer; and,
   f) sensor data from sensors associated with a wearable display device.

14. A method of decompressing compressed image data representing one or more images, the method including:
   a) obtaining compressed image data including encoded frequency coefficients and an index indicative of the encoded frequency coefficients, wherein the index is indicative of a selected bit encoding scheme that defines (i) a scaling factor that is at least a minimum scaling factor and (ii) a bit threshold, wherein the bit encoding scheme encodes the frequency coefficients by at least one of (i) encoding frequency coefficients having more bits than the bit threshold and (ii) discarding frequency coefficients having less bits than the bit threshold;
   b) decoding the encoded frequency coefficients to obtain a subset of frequency coefficients;
   c) generating a set of frequency coefficients using the subset of frequency coefficients and the index;
   d) scaling the set of frequency coefficients using the scaling factor; and,
   e) applying an inverse transformation to the set of frequency coefficients to determine pixel data representing a pixel array within the one or more images.

15. A method according to claim 14, wherein the index is indicative of:
   a) a number of bits of each encoded frequency coefficient; and,
   b) a location, the location being at least one of:
      i) a location of each encoded frequency coefficient in a defined sequence; and,
      ii) a location of each encoded frequency coefficients within the coefficient matrix.

16. A method according to claim 15, wherein the method includes:
   a) decoding each encoded frequency coefficient;
   b) determining the location of each frequency coefficient;
   c) adding the decoded frequency coefficient into at least one of the defined sequence and coefficient matrix in accordance with the location; and,
   d) adding null values into empty locations in at least one of the defined sequence and coefficient matrix.

17. A method according to claim 14, wherein the method includes:
   a) determining an index code from the compressed image data; and,
   b) determining the index from the index code.

* * * * *